United States Patent
Chiluvuri

(12) 
(10) Patent No.: US 10,949,171 B1
(45) Date of Patent: Mar. 16, 2021

(54) TOOLS, MECHANISMS, AND PROCESSES FOR TRANSFORMING MODULES FOR AN APPLICATION INTO PLUGGABLE MODULES

(71) Applicant: Raju V Chiluvuri, Hyderabad (IN)

(72) Inventor: Raju V Chiluvuri, Hyderabad (IN)

( * ) Notice: Subject to any disclaimer, the term of this patent is extended or adjusted under 35 U.S.C. 154(b) by 34 days.

(21) Appl. No.: 16/271,886

(22) Filed: Feb. 11, 2019

Related U.S. Application Data

(60) Provisional application No. 62/647,829, filed on Mar. 26, 2018.

(51) Int. Cl.
*G06F 8/30* (2018.01)
*G06F 8/73* (2018.01)

(52) U.S. Cl.
CPC .............. *G06F 8/311* (2013.01); *G06F 8/73* (2013.01)

(58) Field of Classification Search
CPC ... G06F 8/20; G06F 8/34; G06F 8/311; G06F 8/73
See application file for complete search history.

(56) References Cited

U.S. PATENT DOCUMENTS

| | | | | | |
|---|---|---|---|---|---|
| 6,134,581 | A * | 10/2000 | Ismael | ................ | H04L 41/0213 709/200 |
| 6,715,145 | B1 * | 3/2004 | Bowman-Amuah | ..... | G06F 8/20 718/100 |
| 6,742,015 | B1 * | 5/2004 | Bowman-Amuah | ..... | G06F 8/20 709/223 |
| 7,840,937 | B1 * | 11/2010 | Chiluvuri | .................. | G06F 8/36 717/106 |
| 8,392,877 | B1 * | 3/2013 | Chiluvuri | .................. | G06F 8/36 717/107 |
| 8,578,329 | B1 * | 11/2013 | Chiluvuri | .................. | G06F 8/36 717/107 |
| 9,058,177 | B2 * | 6/2015 | Chiluvuri | .................. | G06F 8/36 |
| 2014/0337816 | A1 * | 11/2014 | Chiluvuri | .................. | G06F 8/36 717/107 |

* cited by examiner

*Primary Examiner* — Marina Lee

(57) ABSTRACT

One of the useful things having proven track record for increasing manual productivity is a very specific kind of parts, which can be assembled and disassembled, particularly in the context of CBD/CBE (Component-Based Design, or Engineering) of physical products such as cars, computers, or cell-phones. Such very specific kind of parts (that are assembled and disassembled) are widely known as components, particularly in the context of the CBD/CBE of the physical products. It is desirable to build software applications by using software parts (or components) that can be plugged-in and unplugged, for example, by transforming (e.g. by designing or redesigning) certain existing kinds of software components or parts into a virtual pluggable module, which is designed to be plugged-in and unplugged. Creating and using such a new kind of pluggable modules for building software applications requires inventing enabling tools, mechanisms, processes, and/or methods to facilitate virtual plugging in and unplugging of each of said new kind of pluggable modules.

33 Claims, 29 Drawing Sheets

Sample Computing Device for Running Disclosed Invention

| A sample pseudo code for including and coupling two Modules |
|---|
| 1. // Code for instantiating and including an object for Module-1 |
| 2. PulggableModule Mod1 = new Mod_Buy_Tickets (ACi, 94089); |
| 3. ApplicationWindow.AddChild (Mod1, x_loc1, y_loc1, null); |
| 1. // Code for instantiating and including an object for Module-2 |
| 2. PulggableModule Mod2 =new Mod_Diapley_Theaters (ACi, 94089); |
| 3. ApplicationWindow.AddChild (Mod2, x_loc2, y_loc2, null); |
| 1. // Part of communication code created by an intelligent SRO/DoS |
| 2. // Linking Mod1 & Mod2 to allowing communication between them |
| 3. Mod2.BuyTickets (Mod1.DisplayAvailableTheaterSeats); |

Steps for Including 2 Modules in an Application — 620

621 — Create Code for including a 1st Module (e.g. Mod1): This code may comprise code for instantiating and initializing object instance for a module-class for Mod1 and assembling Mod1 as a subcomponent 622 — Create Code for including a 2nd Module (e.g. Mod2): This code may comprise code for instantiating and initializing object instance for a module-class for Mod2 and assembling Mod2 as a subcomponent 623 — Create communication code for each of the modules. For example, create communication code for facilitating communication between the1st module (e.g. Mod1) and the 2nd Module (e.g. Mod2), if Mod1 & Mod2 required to collaborate with each other.

FIG. 6b

Sample Communication Interface or Link Between 2 Modules

Code for Module-1: Listener-Module Or Service-Provider Module

1. // The code for a service provide module implements a function
2. // for each of the service provided by the service provider module
3. Function NameOfServiceFunction (Parameters, ...) {//Code ... };

1. // Registering eachService method implemented in module-1
2. // by using a unique Lookup Key, e.g: "Service-X of Module1",
3. SRO.registerService (Module1->NameOfServiceFunction,
4.       "Service-X of Module1",Version, InterfaceDescription);

↕ 710  712  711
723  721  720  722

1. // Variable in Module-2 for storing reference for Service Method
2. VAR RefForModule1Service = null;

1. // Find and Store reference for Service Method by using look-up-key
2. RefForModule1Service = SRO.getService ("Service of Module1",
3.       Version, InterfaceDescription);
4. If (RefForModule1Service == null) ServiceNotAvalableException();

1. // This reference saved in RefForModule1Servicecan be used
2. // anywhere in the code of module-2 for requesting the Service
3. RefForModule1Service (Parameters, ..., ...);

Code for Module-2: Caller-Module Or Service-Consumer Module

FIG. 7

Two Functions for Communication Code in Each Module for Registering/Looking-up Services

The code for each module-class comprises of a function that implements code for registering each of the services provided by the module (using a lookup-key), with the global SRO. An example embodiment, if the Module offers three services:

1. public int register_all_services_provided (SRO_Class SRO)
2. { // If this SCC offers 3-services, it registers each of the 3-services using a pre-defined Lookup-name
3.     SRO.RegisterService (SCC_ID,Interface1a,ServiceName1, ServiceMethod1);
4.     SRO.RegisterService (SCC_ID,Interface2a,ServiceName2, ServiceMethod2);
5.     SRO.RegisterService (SCC_ID,Interface3a,ServiceName3, ServiceMethod3);
6. } // "Interface1a" may be a version object/string (e.g. 02.07.09) of the interface of ServiceMethod1

— 912 —  — 920 —  — 910 —

The code for each module-class comprises of a function that implements code for lookup with SRO object for each of the services required by using respective lookup-key. An example embodiment, if the Module requires two services:

1. public int lookup_all_services_required (SRO_Class SRO)
2. { // If SCC needs 2-services, it looks-up for the 2-service-fucntions and saves them in local variables.
3.     Reference1=SRO.Service_LookUp (SCC_ID,Interface1, NameOfRequiredService1);
4.     Reference2=SRO.Service_LookUp (SCC_ID,Interface2, NameOfRequiredService2);
5. } //SCC is designed to use pre-defined/agreed and published interfaces of other SCCs.

Pseudo Code for Building an Application by Including Pluggable Modules

```
1.  Void GIS_Display(ACi, Canvas) {   // This assembles Pluggable Modules
2.  // ACi is an Object that comprises SRO & Application Context data
3.
4.  // Include pluggable module created by developer "A"
5.  PluggableModule CityMap = new CityMap_Module (ACi,ZipCode);
6.  Canvas.AddChild (CityMap, 0, 0, null);
7.
8.  /* Include pluggable module created by developer "D"
9.  //PluggableModule LandMarks=new CityLandmarks_Module(ACi, ZipCode)
10. //Canvas.AddChild (LandMarks, 0, 0, null);  */
11.
12. // Include pluggable module created by developer "B"
13. PluggableModule Ambulances = new CityER_Module(ACi, ZipCode);
14. this.canvas.AddChild(Ambulences,0,0, null); //Emergency Response
15.
16. // Include pluggable module created by developer "C"
17. PluggableModule AirTraffic= new CityATC_Module(ACi, AirportCode);
18. Canvas.AddChild (AirTraffic, 0, 0, null);
19.
20. Canvas.Dispaly(Parameters); // Display the GIS for City
21. }
```

Pseudo Code for Wrapper Class to make a legacy-class into pluggable module

1801

1. Class WrapperModule extends PluggableModule {
2. LegacyClass legObj = null;
3. InterfaceClass InterfaceObj;
4. public WrapperModule() {legObj = new LegacyClass();}

1800

1802

1. public int register_all_services_provided (SRO_Class SRO)
2. { // If it offers 3-services, it registers each of the services using a pre-defined Lookup-name
3. SRO.RegisterService (MOD_ID,Interface1a,ServiceName1, legObj.ServiceMethod1);
4. SRO.RegisterService(MOD_ID,Interface2a,ServiceName2, legObj.ServiceMethod2);
5. } // "Interface1a" may be a version object/string of the interface of ServiceMethod1

1803

1. public int lookup_all_services_required (SRO_Class SRO)
2. { //If it needs a service, it looks-up for each service and creates necessary communication code
3. InterfaceObj =SRO.Service_LookUp(SCC_ID, Interface1, NameOfRequiredService1);
4. legObj.setCallBack(InterfaceObj);
5. }//Module is designed to use pre-defined/agreed and published interfaces
6. } // End of Class

FIG.18

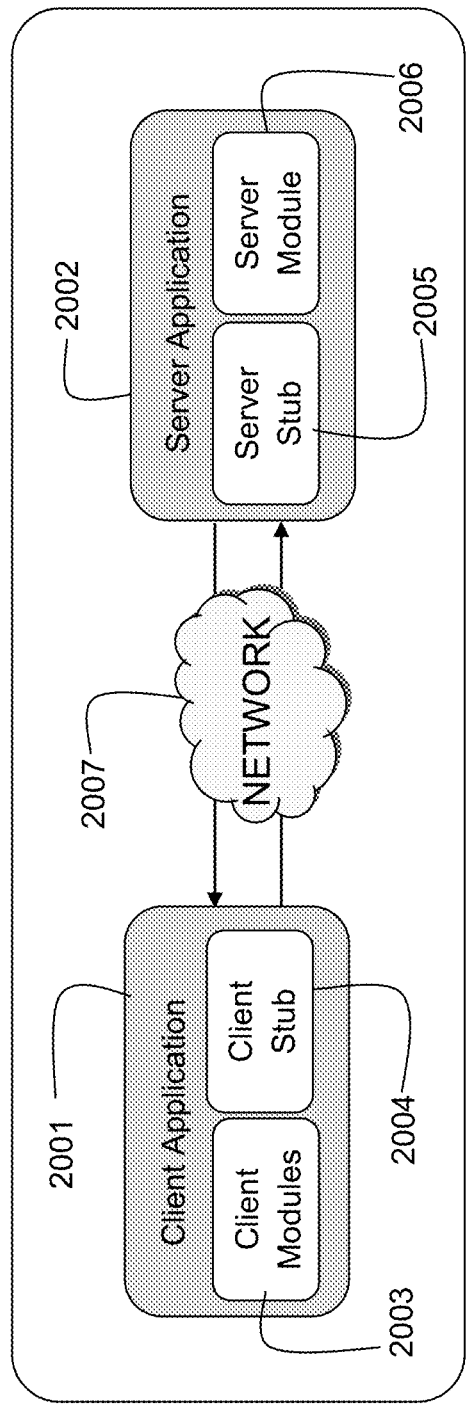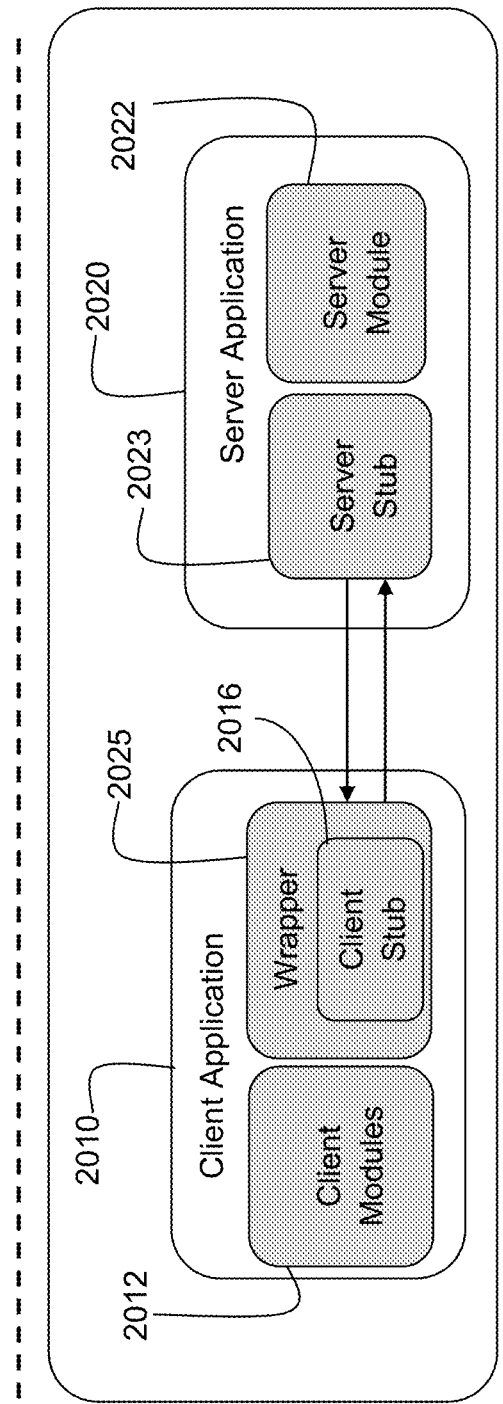
FIG. 20a
FIG. 20b

Arjun mechanism for extracting information for available/required services

Sample Communication Interface or Link Between 2 Modules

Code for Module-1: Listener/Service-Provider Module

1. // The code for a service provide module implements a function
2. // for each of the service provided by the service provider module
3. Function Module1FunctionForServiceX (Parameters, ...) {//Code ... };

1. // Registering eachService method implemented in module-1
2. // by using a unique Lookup Key, e.g: "Service-X of Module1",
3. SRO.registerService (Module1-> Module1FunctionForServiceX,
4.     "Service-X of Module1",Version, InterfaceDescription);

2322　2321　2320　　2310　2312　2311　2323

1. // Variable in Module-2 for storing the reference for Service Method
2. VAR RefForModule1ServiceX = null;
3. // Find and Store reference for Service Method by using look-up-key
4. RefForMod1ServiceX = SRO.getService ("Service-X of Module1", ...);

1. Function InterfaceForExternalService1 (Params1, ...) {
2. // Necessary *adopter* code for bridging gaps in *artificial dependencies*
3. RefForMod1ServiceX (Params2, ..., ...);   }

1. // This InterfaceForExternalService1 can be used anywhere in the
2. // code of module-2, which in turn requests service of module-1
3. InterfaceForExternalService1 (Parameters, ..., ...);

Code for Module-2: Caller/Service-Consumer Module

FIG. 23

Arjun mechanism for extracting information for available/required services

Information Included in a Module to Publish/Subscribe a Service

Listing-1: A First Module Publishing it's Service — 2610

```
1.  // Providing Necessary Description for an Interface for exporting a service
2.  #ExportArjunInterface: $[%
3.  <Interface Name='UniqLookupKey' Package='MyPackage' Version='1.4.4'>
4.      <Reference> NameOfTheServiceFunction</ Reference>
5.      <Parameters Count=6>
6.          <Type Index=1 Data='Height'> Integer </Type>
7.          <Type Index=2 Data='Weight'> Integer </Type>
8.          <Type Index=3> float </Type>
9.          <Type Index=4> String</Type>
10.         <Type Index=5> PS_CanvasClass </Type>
11.         <Type Index=6 optional='Yes'> CallBackClass </Type>
12.     < Parameters/>
13.     <Returns> Integer </Returns>
14.     < Node Path='Root/Node/SubNode' > NodeName </Node>
15. </Interface> %]$
```

Listing-2: A Second Module Subscribing a Required Service — 2620

```
1.  // Providing Necessary Description for the Interface to find required service
2.  Var ReferenceToMyService1 = #ImportArjunInterface: $[%
3.  <Interface Name='UniqLookupKey' Package='MyPackage' Version='1.4.4'>
4.      < Node Path='Root/Node/SubNode' > NodeName </Node>
5.      <Parameters Count=6>
6.          <Type Index=1 Data='Height'> Integer </Type>
7.          <Type Index=2 Data='Weight'> Integer </Type>
8.          <Type Index=3> float </Type>
9.          <Type Index=4> String</Type>
10.         <Type Index=5> PS_CanvasClass </Type>
11.         <Type Index=5 optional='Yes'> RefToCallBackFunction </Type>
12.     < Parameters/>
13.     <Returns> Integer </Returns>
14. </Interface> %]$
```

FIG. 26

TOOLS, MECHANISMS, AND PROCESSES FOR TRANSFORMING MODULES FOR AN APPLICATION INTO PLUGGABLE MODULES

CROSS-REFERENCE TO RELATED APPLICATIONS

This application claims priority from Provisional Patent Application Ser. No. 62/647,829, that was filed on Mar. 26, 2018; the entire contents of which are hereby incorporated herein by reference.

COPYRIGHT NOTICE AND USE PERMISSION

A portion of the disclosure of this patent document contains material that is subject to copyright protection. The copyright owner has no objection to the facsimile reproduction of the patent document or the patent disclosure by anyone, as it appears in the U.S. Patent and Trademark Office patent file or records, but otherwise reserves all copyright rights nevertheless. The following notice applies to the software and data, as described below and in the drawings, hereto: (C) Copyright 2018, Raju Chiluvuri, All Rights Reserved.

FIELD OF THE INVENTION

One of the most prominent problems in software engineering has been the question of how to program large and complex pieces of software. Many large projects involve several dozens of programmers working on large codebase comprising of millions of lines of code. In this kind of environment, it is difficult to keep track of what a given part of code does and particularly to keep track or comprehend dependencies (e.g. such as communication interfaces between two parts that communicate with each other) between various disparate parts spread across the codebase. For example, it is nearly impossible to know what sort of effect a small change to one part could have on other parts (and therefore requires extensive testing). To avoid such poorly planned scenarios (that is hard to document and to keep the documentation up to date with code that needs to be changed frequently to satisfy evolving needs), computer scientists began to organize around the concept of "modularization," which is the practice of breaking up code-base of large application into modules and organizing code based on the functionality or task it implements. In this way, code becomes reusable and easier to debug, document and manage. Modularization organizes code into modules. For example, organizing code based on task involves organizing the codebase into modules based on what each module does, where each module would have an exclusive codebase that can be developed and tested individually.

This invention relates to software development using a new kind of modules (e.g. components, objects, and other kinds of parts that include but are not limited to APIs, Libraries, and Packages) that are designed to be plugged-in (or pluggable). Where "API" is short for "Application Programming Interface". Particularly concerning development process for designing, developing software applications by employing tools and mechanisms such as software motherboard (figuratively speaking) having virtual sockets. For example, pluggable electric appliances such as TV, table lamp, and fan require electric sockets. The components for computers such as CPU, DRAM, Power Supply, CD Player, Network Card, and Hard Disk are plugged into appropriate (or respective) sockets provided in a PCB (Printed Circuit Board) such as the system-board or motherboard of the computer. Also, such PCBs may be used as cards to build container components such as network card, by plugging-in computer chips.

Likewise, "pluggable modules" for software programs (e.g. applications or products) require virtual system-board or motherboard having necessary mechanisms for plugging-in said "pluggable modules". For example, by automating various tasks or activities (being performed manually today) such as creating communication code for allowing collaboration between software modules (e.g. parts, objects, or components that include reusable or custom-designed software objects, software modules, or parts that include but are not limited to APIs, Libraries, or Packages) in each application and process for managing the communication interfaces and code between the modules, for example when each of the module is redesigned or replaced by a newer module (e.g. during maintenance and/or release of newer versions of the application).

The idea that software should be componentized (or modularized)—built from prefabricated components (e.g. modules or other kind of parts such as libraries, APIs or APIs for microservices)—first became prominent with Douglas McIlroy's address at the NATO conference on software engineering in Garmisch, Germany, 1968, titled "Mass-Produced Software Components". The conference set out to counter the software crisis by focusing on reuse (e.g. of components, modules or APIs for various kinds of parts). But in the context of countless physical products (e.g. cars, computers, cell-phones, TVs, airplanes, office equipment such as printers, machines, and factory machinery that are used every day) we use every day, components are parts that can be assembled (or plugged in) and disassembled (or unplugged).

Today, the software community uses the term "software components" in two completely different contexts and are two completely different things (or kinds): (i) using components or other kind of parts as parts to build a single executable (e.g. a single file comprising machine code); for example, by employing methods such as modular programming, or (ii) each executable (e.g. a single file comprising machine code) is referred to as a component in a distributed environment, where each of the executables running on different computers collaborate with each other using internet or intranet communication protocols for IPC (Inter Process Communications); for example, employing methods such as SoA (Service Oriented Architecture) or CORBA for facilitating communication between the components. The latter type (that uses IPC) is completely different from the former type (that don't use IPC), where the modules are part of a single compiled executable (so each module can directly call functions or methods of other modules, without any need for using IPC).

The main striking difference between the 2 different kinds of software components is: (1) components that use any mechanism and/or protocol (e.g. TCP/IP or sockets) for IPC, and (2) components that don't use any kind of IPC. This present disclosure and invention is only limited to the second kind (that don't use IPC), such as using modules, components, and other kinds of parts for modular programming, all of which are part of the executable and run on a computer, to build a single executable (e.g. using many objects as modules for building an application in OOP— "Object Oriented Programming"). The term "modular programming" has many similar descriptions, which vary slightly to moderately (or even considerably based on given context or perception of few discriminating connoisseurs of software engineering) from each other. Some of the popular descriptions are provided as Appendices/URLs to this disclosure. The Appendices/URLs are provided only as exemplary references and as background information for this disclosure. In this disclosure, the term module is used to refer to various kinds of software parts such as software components, objects, and other kinds of parts that include but are not limited to APIs, Libraries, or Packages, which are used in building each of the software applications (i.e. a software executable).

One of the descriptions says: Modular programming is a software design technique that emphasizes separating the functionality of a program into independent, interchangeable modules, such that each contains everything necessary to execute only one aspect of the desired functionality. A module interface expresses the elements that are provided and required by the module. The elements defined in the interface are detectable by other modules. The implementation contains the working code that corresponds to the elements declared in the interface. Modular programming is closely related to structured programming and object-oriented programming, all having the same goal of facilitating construction of large software programs and systems by decomposition into smaller pieces (i.e. modules), and all originating around the 1960s and early 1970s.

While usage of these terms has been historically inconsistent, "modular programming" today refers to high-level decomposition of the code of an entire program into pieces (i.e. modules), structured programming to the low-level code use of structured control flow, and object-oriented programming to the data use of objects, a kind of data structure. In Object-Oriented Programming (or "OOP"), the use of interfaces as an architectural pattern to construct modules is known as interface-based programming.

Each software application uses many reusable parts or components (e.g. API or class library for GUI-components) as well as custom-designed components such as object instances of classes or modules etc. The developers of applications compose and/or assemble various kinds of such components for building each of the applications. If these modules in an application need to collaborate with each other, then it is essential to create communication code to allow such collaboration. This invention discloses a novel kind of modules (e.g. that can be plugged in), tools, and mechanisms necessary for plugging in the modules, where the mechanisms and tools automate various tasks and activities of creating and managing the necessary communication code that can facilitate necessary collaboration between the modules.

There are two proven ways for increasing the productivity of software engineers. The first way is increasing "reuse"—increasing the degree of reuse reduces the cost and complexity by reducing the development (or implementation) of custom application code required for creating each of the software applications and maintenance of the custom application code. The complexity of designing and developing any product (that includes software products) can be decreased by decreasing the parts (or code) that must be custom-designed and developed (e.g. implemented or developed).

This can be accomplished by using pre-built reusable parts or components (e.g. Libraries or API for microservices), which are pre-built and tested by the vendors or suppliers of respective parts or components. Makers of almost every physical product (e.g. cars, computers, or factory machinery or machines) use reusable parts or pre-fabricated materials such as steel, plastic, metals, alloys, specialized materials such as silicon wafers to make computer chips, and nickel-cadmium or lead-acid to make batteries etc. In fact, every component such as a computer chip (e.g. CPU or DRAM), auto-engine, or auto battery is built by using such reusable parts. But the components such as CPU, DRAM, and auto-battery can also be plugged in or assembled.

Software engineering researchers have been doing research for maximizing reuse for past 50 years. Software researchers made substantial progress in reuse during past 50 years. Even after leveraging all the available technologies and mechanisms for maximizing reuse, developers of many software applications today are required to implement tens of thousands, to hundreds of thousands, to even millions of lines of custom application code. This custom code is infested by infamous spaghetti code and design. It is desirable to reduce spaghetti code and design. One of the main causes for spaghetti code is manually implementing communication code between various parts, components, or modules in each of the applications to allow collaboration between the modules or components.

The other proven way for addressing the complexity of implementation (or development) and maintenance of this custom code is "modularization"—increasing the degree of modularization reduces the cost and complexity of design, development, and maintenance (e.g. redesign to add more features while releasing upgrades or to keep up with evolving needs) of the custom code by reducing the infamous spaghetti code from the custom code that must be implemented for creating most of the large applications. This invention targets at increasing degree of modularization by automating various tasks for creating and managing communication code when assembling or composing various kinds of modules or components for building the application.

The internal code implemented within each of the modules or components should not be affected by other code implemented for the application if the component has to be disassembled to redesign or refine individually and be tested outside of the product, free from spaghetti code implemented for other parts of the application. The product can be free from spaghetti code or design if the product can be built by plugging in such components, where each component is free from spaghetti code. For example, about 50% of the application code can be free from spaghetti code if over 50% of the code for features and functionality of an application is implemented in modules or components that are of optimal size or complexity and are designed to be assembled (or plugged in) and disassembled (or unplugged).

A proven way for reducing this kind of complexity due to spaghetti code is increasing the degree of modularization. Today there is no known invention that is better than components for maximizing modularization in the context of physical products such as cars, computers, or factory machinery, where components are special kind of parts that can be composed or combined by employing a process or method known as assembling, and where each component can be separated by employing a process or method known as disassembling. In the context of such physical products, no part can be a component, if the part is not conducive to be assembled and disassembled. In the context of software, the term component does not imply a part that can be assembled and disassembled. This invention discloses mechanism for transforming modules into pluggable modules, which can be assembled (i.e. plugged in) and disassembled (i.e. unplugged). Components are the only kind of parts known to mankind that can be assembled (so that each of them can be disassembled to redesign and test individually, free from spaghetti code, any time in the future).

In the context of countless physical products (e.g. cars, computers, cell-phones, TVs, ACs, airplanes, office equipment such as printers, machines or machinery for factory) we use every day, only the kind of physical parts that can be disassembled and re-assembled are considered components. Any part that can't be disassembled and re-assembled is not considered a component, in the context of such physical products. Components are a very special kind of parts that can be assembled and disassembled. There may be a small portion of parts or components that could be an exception to this general rule. To give an analogy, the class of birds is a very special class of animals having wings that can fly using their wings. There could be a few obvious exceptions to this general rule such as ostrich or penguin, but such species of birds (that cannot fly by using their wings) are less than 1% of the total species of birds. In general, any animal not having wings that are not conducive for flying is not a bird. Likewise, any larger part that is not conducive for assembling is not a component.

In other words: The basic and/or striking difference between (i) specific kind of parts that are certainly components and (ii) the other kinds of parts that are certainly not components, in the context of engineering paradigm for designing and building of countless large products we know (e.g. such as cars, computers, cell-phones, TVs, ACs, equipment such as printers, airplanes, machines or machinery for factory to name a few): The components are the only kind of parts that are composed into the product by a process (or method) known as "assembling". None of the other kinds of parts are either designed or conducive to be "assembled". The ideal form of assembling for a component is making the component easily pluggable. So, it is desirable to invent mechanisms for plugging in modules or components.

Unfortunately, in the context of engineering paradigm for software products, software researchers defined many kinds of software components, where each kind of software components is defined as software parts either having a given set of useful properties (e.g. reusable or standardized for conducive to be reusable) or conforming to a so-called component model. No known kind of components for software exist today that are designed (or conducive) to be assembled or plugged in (so none of them can be a component).

The objective of this invention is to increase the degree of modularization by employing innovative tools, processes, and mechanisms, for example, to compose each module by employing a method equivalent or simpler compared to assembling. Earlier inventions of the applicant disclosed special kind of components, but there is a need for providing a bridge to fill a gap that is created between existing kind of software components (or modules) and a special kind of components that are equivalent to the physical components (by sharing nature and properties uniquely and universally shared by the physical components), where the nature and properties are disclosed in the earlier patents U.S. Pat. Nos. 8,392,877, 8,578,329, and 9,058,177 of the applicant of this patent disclosure.

BACKGROUND OF THE INVENTION

Dr. Douglas McIlroy's speech in '1968 NATO software engineering conference' on "Mass produced software components" is widely credited for launching today's 'software engineering' research for CBD/CBE (Component-Based Design, Engineering and Development or Building) for software (or 'CBSE'). Since then most of the software engineering research has been primarily focused on reusable components (e.g. API, Libraries or packages) for increasing reuse of code (e.g. provided as pre-built libraries or packages comprising modules or components). Ultimate dream is to build new/custom applications by assembling pre-build COTS (Commercial Off-The-Shelf) components (e.g. modules or parts) such as Libraries, APIs (Application Programming Interfaces), or Packages. The main focus of the research has been to invent components or modules having desirable properties such that they are non-context-specific, standardized, generic, highly flexible or configurable, for example (i) to be reusable in diverse kinds of applications and/or (ii) to make the component easy to reuse by being flexible to configure for each application.

The primary purpose or essential benefit of reusable parts is 'reuse'. But it is also possible to invent new kind of parts having useful benefits other than and/or in addition to the 'reuse'. In other words, new kind of parts can be invented which can be used for not only creating a large application but also maintaining the applications at lower cost and/or complexity. The new kind of components can be designed to serve a different but useful purpose by offering novel benefits. So the new kind of components or modules addresses problems that are not addressed by any other kind of software components/modules known today.

Summary for engineering paradigm for designing and building physical products (such as cars, computers, cell-phones, airplanes, TVs, ACs, equipment such as printers, machines or machinery for factory to name a few) in brief: Any large product (e.g. FIG. 28a) is partitioned or divided into multiple modules (e.g. FIG. 28b). Each of the modules is designed, created and tested individually. Once all the modules are created and tested individually, the product is built by employing a process (or a method) known as assembling (for composing or combining the modules). In order for composing or combining the modules by employing a method known as assembling each of the modules must be conducive to be assembled (or plugged-in, since plugging-in of a module is a simpler kind of assembling of the component).

Each such module that can be assembled (or plugged-in) is known as a component. In other words, components are very specific kind of parts or modules that can be assembled in the context of physical products. It is desirable to invent equivalent engineering paradigm for designing and building software products (or applications). This requires inventing mechanisms, tools and processes for composing multiple modules for budding each software product by employing a method that is equivalent to assembling. This also requires inventing modules that can be composed equivalent to the components by employing a method (i.e. each module must be designed to be composed by employing the method that is equivalent to assembling).

In the context of countless products we know such as cars, computers, cell-phones, TVs, bikes, ACs, equipment such as printers, airplanes, medical equipment such as MRI machines or CT-scan, machines or machinery for factory to name a few, the CBD/CBE (Component Based Design and/or Engineering) of each large or complex product comprises of following 3 steps: (i) the product is partitioned into self-contained parts known as components, (ii) each of the component is designed, built and tested individually, and (iii) the product is built by composing all the component employing a very simple and elegant method known as assembling, once all the components or modules are built and tested individually. In case of electronic products such as computers or cell-phones, each electronic module is assembled by plugging-in the module into a PCB-board such as motherboard or system-board etc.

Another perspective for Component-Based Design (CBD) and Component-Based Engineering (CBE) in the context of engineering paradigm for physical products: The physical CBD-products (e.g. automobiles, cell-phones or computers) are built using various kinds of parts such as (i) component-parts such as CPU, DRAM-card, car-engine, gearbox, and CD-player etc., and (ii) ingredient-parts or materials such as silicon, steel, cement, plastic, metals, and alloys, etc., where the CBD/CBE products imply products that are created by assembling the component-parts. The parts belonging to each of the two kinds have a different set of unique characteristics and primary purposes for serving different benefits. Some parts (e.g. most of the 'ingredient-parts') are ideally suited for 'reuse', while other parts such as components are designed for serving other useful purposes such as superior modularization.

In the context of physical products, component-parts are not a replacement or substitute for ingredient-parts, because each component-part is created by using ingredient-parts (i.e. materials such as silicon, steel, cement, plastic, metals and alloys). That is, using components/CBD or not using components/CBD might not have any effect on the mass of the materials used in the physical products. For example, there would be no difference in the material used between (i) a small physical product partitioned into three components or (ii) the same product built without any partitioning. Likewise, transforming few modules in an application into pluggable modules might not reduce the number of lines of code required to implement for the application. For example, today each building is not built by assembling components, but it won't reduce the net material used even if the building can be built by building each of the components individually and constructing the building by assembling components. The same amount of material is required in building all the components for the building.

Total cost and complexity of a product comprises of (i) cost of all the parts used for building the product and (ii) cost and complexity of composing all the parts for building the product. The purpose of pluggable modules (or components) is to increase the degree of modularization (or loose coupling) and reducing cost of composition. For example, each physical product (e.g. cars, computers, machinery, or airplanes) is modularized by partitioning into component-parts, where each of the basic component-part is built by composing ingredient-parts. Each of the large physical products comprises of many kinds of parts, where the many kinds of parts are composed, while other kinds of parts are assembled or plugged-in for building the product. Assembling of a part is possibly the simplest form of composing the part, and possibly the simplest form of assembling each part is plugging-in the part.

Although desirable, it is not necessary for the physical component-parts to be reusable, but some of the benefits for component-parts include, for example, their ease of replacement at any time in the future and (ii) the possibility to disassemble (or unplug) even a large component (e.g. jet-engine) having many sub-components as a unit and fix any problems and the possibility to reassemble the large component (after testing it individually outside of the product). In other words, the physical components are offering benefits (other than reuse), such as the ability for each component to be easily assembled for building the CBE-product. Also, the component can be easily disassembled as a unit for maintenance (e.g. redesigning or fixing any shortcomings) or to be replaced by a better component. This ability to easily replace a part (e.g. CPU, DRAM, or Hard Drive) is useful to extend the life of a product at lower cost.

For example, if a one-of-a-kind experimental spacecraft or jet fighter is built by assembling custom-designed components, it is likely that most of the large core components and coupling interfaces of the components are custom-designed. Even if the large core components are not reusable, each component is assembled such that they are simple predefined custom loosely-coupled interfaces, so that the component can be replaceable (i.e. easy to disassemble or reassemble as a unit). This property (i.e. ability to easily disassemble and re-assemble) of the physical components is desirable, because each component can be disassembled for redesigning and testing outside of the product, at any time in the future (e.g. to repair or to improve).

One of the ideal forms of assembling of the physical components is the ability to plug in (and unplug) each of the components, into sockets of a PCB (Printed Circuit Board) for example. For example, the components for computers such as CPU, DRAM, Power Supply, CD-Player, Network Card or Hard Disk are plugged into appropriate (or respective) sockets provided in the motherboards or system-board of the computer. Hence, it is desirable to make software modules (e.g. components or parts) having virtual interfaces of plugs/pins that are pluggable by inventing mechanisms and tools (e.g. software motherboard having virtual sockets) that are equivalent to computer motherboards, which have virtual sockets.

The earlier patents of the applicant U.S. Pat. Nos. 7,827,527 and 7,840,937 disclosed methods for creating reusable GUI classes (for a GUI API) which are capable of encapsulating large GUI components (that is using many reusable GUI classes for including GUI subcomponents) in a replaceable class. It is possible to invent a new kind of software components which are not necessarily 'reusable' but can serve other useful purposes or offer benefits that are not offered by any other known kind of software components. One of the essential benefits of the physical component-parts is that they either directly increase or indirectly allow the increase of the degree of these useful factors (i) division-of-labor, (ii) specialization and (iii) mechanization (i.e. automation in case of software development). These factors are hereafter referred to as the 3-CBE-factors.

The patents of the applicant U.S. Pat. Nos. 8,527,943, 8,392,877, 8,578,329, and 9,058,177 disclosed methods for partitioning (or identifying), creating and using Custom Designed RSCCs (Replaceable Self-Contained Components) for software applications, where the RSCCs are equivalent to functional components in physical products such as cars, computers, airplanes, ACs, printers, machines, or factory machinery. That is, each RSCC for software shares the unique characteristics (e.g. Replaceability and are Self-Contained) universally shared by functional components for physical products. Those patents of the applicant are hence providing background and are incorporated as references here in this disclosure. While the components for physical products are constrained by laws of nature, the applicant discovered that software offers a lot more flexibility for inventing pluggable modules that fall between ingredient-parts (that are perfect for reuse) and component-parts (that can be assembled and disassembled). Hence, it is not necessary for the modules disclosed in this application to be self-contained.

The development process of each software application (or software product) involves various activities or tasks such as (i) partitioning application into various modules, (ii) designing and developing each of the modules and (iii) including each of the custom-developed or reusable modules in the application by implementing necessary communication code for the module (to allow collaboration between the module and other parts of the application). The earlier patents of the applicant focused on modularization of each software application; for example, by disclosing methods for identifying self-contained modules having minimum number of communication dependencies and encapsulating each such module in a replaceable container. The communication code for each module can be minimized by minimizing the coupling dependencies of the module.

This application discloses a completely different activity such as creating and managing communication code between various kinds of modules or parts in the application. The development process of each software application (or software product) comprises steps such as including (or adding) each of the modules in the software application and creating communication code for each module to facilitate necessary collaboration or communication with other modules or parts in that application. The maintenance of each software application (or software product) comprises steps of changing or redesigning one or more modules in the software application and maintaining the communication code for each of the modules to accommodate changes made to various modules or other parts of the application. It is widely accepted that 80% of software engineering is activities such as maintenance for example to meet evolving needs, technologies or experience based on use-cases etc.

The useful aspects for increasing productivity when designing, engineering, and developing or building each of the software applications include (i) Modularization: Identifying better cohesive modules of optimal size having simpler and least number of dependencies, and (ii) Automating: Automating the creation and management (e.g. during maintenance) of the dependencies (i.e. communication code necessary to allow collaboration) between each of the modules and other modules or parts in the application. The earlier patents of the applicant focused on identifying better cohesive modules in each of the applications, where the modules are self-contained to minimize dependencies. Such better modularization of an application reduces and/or simplifies communication dependencies (i.e. communication code necessary to allow collaboration) between the modules in the application.

However, applications often use non self-contained modules. For example, most of the reusable modules (e.g. from third party sources) are likely neither self-contained nor cohesive. As another example, applications may create and use custom modules, which are neither self-contained nor cohesive. This patent application focuses on automating various activities or tasks necessary for the creation and management of communication dependencies (or dependencies in short) between the modules in the application, where the dependencies (e.g. necessary communication code) allow collaboration between each of the modules and other parts or modules in the application. The cost and complexity of creation and management of dependencies in an application can be reduced by automating various activities or tasks necessary for creation and management of communication dependencies (i.e. necessary communication code to allow collaboration between the modules, for example, by transforming large grained modules into pluggable modules).

According to some software research papers, up to 80% of software engineering effort is to deal with maintaining/ changing existing software; for example, to build a better/ newer version or to support new requirements, such as changing business needs or government regulations. This is especially true in the case of successful software and its need to be maintained or updated for many years of use. So, many software experts feel large software components (or modules) that can be easily adaptable to changing or evolving requirements (e.g. business needs) is as useful as the reusable components. So it is desirable to invent a new kind of components/modules and mechanisms which can be easily adaptable by redesigning its source code to satisfy evolving needs of its application.

Software engineering and design of software applications can benefit from experiences gained in the mature field or paradigm of industrial engineering for physical products. For example, many automobile designers are concerned with giving easy service-access to the parts that need frequent servicing or maintenance, to minimize the overall cost of ownership and to maximize satisfaction. For example, in the case of automobiles, it is desirable to easily replace parts that are prone to wear-and-tear (e.g. brake-pads or oil-filter). Likewise, in case of computers, parts (e.g. DRAM, CPU, or Hard Drive etc.) that can be upgraded to extend the usefulness or life of the computer. If a component requires little or no effort to detach (e.g. by a method known as disassemble or unplug) or re-attach (or re-assemble), such component is said to have the highest degree of service-access. It is desirable to have a high degree of 'service access' (or 'replaceability') to each part that requires frequent maintenance, or is likely to be upgraded (e.g. DRAM, Hard Drive, CD-player, or CPU) to satisfy owner's evolving or expanding needs (e.g. for new features or functionality).

The components having a high degree of autonomy (e.g. that can be unplugged and re-plugged in) offer certain benefits, which are proven to be very useful in design, development, and long-term maintenance from the experiences of industrial engineering. For example, by reducing total cost of ownership or higher return on investment by extending life. The benefits are: Increasing the degree of autonomy of a part increases (or indirectly allows increasing) the degree of (i) division-of-labor, (ii) specialization, and (iii) mechanization or automation.

When designing a new software application, most users don't know what they really want (particularly with certainty), or can't articulate what they want, but users (i.e. we all as human beings) are good at articulating what they like and what they don't like (when a solution is put in their hands and when they start using it). Also, certain professional users (e.g. thought leaders) are good at suggesting new features or improvements to the application they have been using. Also, engineering of any new product is constant improvements that often involves little-by-little refinement to overcome shortcomings.

The famous historian of engineering, Henry Petroski, suggested in his famous 1992 book "The Evolution of Useful Things": (1) Continual refinement is the usual rule (e.g. to get closer and closer to perfection), and (2) Engineers constantly find shortcomings in their designs and fix them little by little (e.g. to get closer and closer to perfection). It is desirable to minimize the cost of changing (e.g. redesigning) each of the components, parts, or modules in each large software application so that the software can be evolved easily for getting closer and closer to perfection. Minimizing the cost of fixing mistakes or shortcomings stimulates experimentation and innovation.

For example, each large physical product (e.g. cars, computers or cellphones) is evolved by evolving each of the components individually, where the component is a special kind of part that can be assembled and disassembled. Usually a part (e.g. steel, cement, alloys, paint, or metals used for making components) that can't be assembled and disassembled is not referred to as a component in the context of such large physical products (e.g. cars, airplanes, machines, machinery, or computers etc.). In this context, pluggable modules (or components) reduce complexity, cost, and time required for redesigning each of the pluggable modules (or components). Hence it is desirable to build each large software application by using software modules that can be unplugged (e.g. to redesign each module individually) and plugged in after testing the module individually outside of the product. The components having a high degree of autonomy is also very useful for building and maintaining software applications, since each of the (sub)components can be refined more autonomously for satisfying evolving needs, new technologies, or know-how (e.g. expertise and wisdom gained during/from creating previous versions and use cases in the field by end users).

Today's state-of-the-art design of each large physical product (e.g. car or PC) is a result of many decades of evolution by improving each of its components 'little by little' autonomously. For example, designers of most of the physical components (e.g. car-engine, Hard Drive, CPU, or DRAM) have been refining them, little by little for decades, autonomously outside of or away from respective physical products. The cost and complexity of redesigning and testing of a module (or any part) can be reduced if the module can be transformed into a pluggable module. To that effect, this invention discloses mechanisms, methods, and enabling tools for transforming modules into pluggable modules, according to an embodiment.

In brief, for example, modular programming of a software application includes using many kinds of modules such as reusable modules and custom-built modules for building a software application. For example, many reusable modules from third-party sources could be identified by the designer of the application for use in building the application. Many applications require implementing tens of thousands to hundreds of thousands of lines of custom code for each application, even after maximizing reuse in the application. Increasing the reuse (e.g. by finding more and more reusable modules from various sources or providers) reduces the custom code which must be implemented for building the application. It is also desirable to increase modularization by transforming modules into pluggable modules by employing novel mechanisms, processes, and tools.

The designers of the application partition the custom application code software by identifying multiple modules and other parts, according to an embodiment. Where each module is custom-engineered (e.g. design, develop, and test) individually for satisfying the unique needs of the application, according to an embodiment. Many custom modules are built by using reusable modules and parts. Once sufficient number of modules are custom-designed, developed, and tested individually, development steps or processes of the application today includes manually composing each of these modules into the application.

Today, the steps of manually composing each of the modules include manually implementing many lines of error-prone communication code to allow collaboration between the module and other parts or modules in the application, where the communication code results in hard-to-maintain or error-prone tight coupling (e.g. dependencies or spaghetti code) between each of the modules and other parts of the application. This communication code implemented for each of the module makes it harder to redesign the module, and so transforming the modules in an application into pluggable modules reduces the cost and complexity of each of the modules.

It is desirable to make each of the modules loosely coupled or pluggable by automating various tasks or activities for not only creation but also maintenance (or management) of this communication code (essential for allowing collaboration between each module and other parts of the application), in order to avoid communication code that creates error-prone dependencies for each module and tight couplings (e.g. hard-to-track dependencies or spaghetti code) in the code of the application.

A module (e.g. component, object, or other kind of part from library/APIs) included in an application is said to be an ideal pluggable module if the module is added to the application without manually implementing any communication code in the code for the application (by employing mechanism, tools for allowing communication between the module and other modules and parts in the application), according to an embodiment. According to another embodiment, specific tools, protocols, methods and/or mechanisms are employed to automate various tasks, (a) for creating and including the communication code in the code of the application and (b) for managing or maintaining the communication code and interfaces of the modules.

Wikipedia page for software architecture says: Software architecture refers to the high level structures of a software system and the discipline of creating such structures and systems. Each structure comprises software elements, relations among them, and properties of both elements and relations. The architecture of a software system is a metaphor, analogous to the architecture of a building. Software architecture is about making fundamental structural choices which are costly to change once implemented. But each large software application (or system) requires frequent changes (or redesigning), for example, to leverage evolving new technologies, or to satisfy changing needs of the users, to name a few.

The existing software engineering paradigm uses a metaphor, analogous to designing and construction of a building. The patent disclosures (by the applicant) uses engineering paradigm for designing and building large physical products (e.g. cars, airplanes, computers, machinery or equipment) as a metaphor or analogy, where the engineering paradigm designs and builds each of the physical product by "assembling" multiple components (or modules), where each of the components (or modules) can be designed, built and tested individually. The module that can be disassembled and re-assembled can be redesigned individually to make changes to the software system (or application).

SUMMARY OF THE INVENTION

Today there exists three major mature engineering paradigms, they are: (1) civil engineering paradigm for designing and constructing structures such as buildings, dams or large bridges etc., which use reusable parts such as cement, steel, wood and mechanical parts for plumbing, doors etc. (2) mechanical engineering paradigm for designing and building products such as cars, locomotives, factory equipment or airplanes etc., which partitions each product into components for designing and building each of the components individually and the product is built by assembling all the components, once all the mechanical components are built and tested individually. (3) electronic or computing engineering paradigm for designing and building products such as computers, cell phones, or LED-TVs etc., which partitions each product into electronic components for designing and building each of the components individually and the product is built by plugging in the electronic components into a motherboard (e.g. a PCB—Printed Circuit Board), once all the components are built and tested individually.

About 80% of the software engineering is changing existing software, for example, by redesigning each of the modules or components already created for building each software system. Any product built by employing civil engineering paradigm is hard to redesign, for example, comparable to a product built by employing electronic engineering. Existing software engineering paradigm is close to the civil engineering paradigm (as per wikipedia page for "software architecture" at the URL: https://en.wikipedia.org/wiki/Software_architecture), which uses reusable parts (but don't use kind of parts that can be assembled, where such kind of parts are known as components). The electronic engineering paradigm is one of the simplest model or paradigms for replacing or redesigning each of the components (or modules).

The electronic components communicate or collaborate with each other by exchanging data in the form of electric signals, where the electronic components are comparable (or analogues) to software components (or modules), since software components (or modules) communicate or collaborate with each other by exchanging data by calling each other's methods or functions. Inventing a new engineering paradigm for software that is equivalent (or analogues) to the electronic engineering paradigm requires inventing software motherboard that is equivalent (or analogues) to the electronic motherboard/PCB for facilitating collaboration between components (or modules).

Applicant's disclosures for earlier patents (e.g. U.S. Pat. Nos. 8,392,877, 8,578,329 and 9,058,177) disclosed specific kind of components referred to as SCC (Self-Contained Components) and RSCC (Replaceable Self-Contained Components), where each RSCC/SCC is functionally equivalent and/or analogues to mechanical, electronic or electro-mechanical component. Those inventions disclose methods for positively identifying SCC for partitioning each software system into multiple RSCCs. It is desirable to make other kinds of modules (that might not be RSCC/SCC) to be pluggable, by inventing necessary tools, methods and/or mechanisms. This application discloses inventions for software motherboard for plugging-in software components (or modules) to build an application, where the software motherboard provides functionality equivalent (or analogues) to electronic motherboard/PCB (e.g. for facilitating communication and/or collaboration between modules or components in an application).

Any large software application likely comprises of multiple modules (e.g. components, objects, and other kinds of parts that include but are not limited to APIs, Libraries or Packages), where some of the modules are custom-designed, while other modules are reusable modules from third party sources such as component vendors (e.g. COTS—Commercial Off The Shelf) or open-source community etc. For example, consider an application having many modules, where each of the modules collaborates or communicates with one or more other modules or parts of the application. If a module needs to communicate or collaborate with one or more modules for performing various tasks, the module must connect and communicate with appropriate modules or parts and interact with the modules by requesting necessary services (e.g. by calling the correct service function or method implemented in each of the modules) for fulfilling each of the tasks. Today, this task of one module in an application to connect and communicate with another module in the application is facilitated by manually including (i.e. implementing) communication code in the code for the application.

Today, in the prior art such communication or collaboration between any module and one or more other parts or modules of the application is facilitated by manually implementing code (henceforth referred to as "communication code"). In other words, the process of adding each module to an application comprises of two parts (i) implementing code for adding or including the module in the code for the application, and (ii) manually implementing necessary communication code (in the code of the application) to facilitate necessary communication and collaboration between this module and other parts in the application. Hence, to effectively remove (or replace) the module also requires removing (or changing) these two kinds of code (that includes communication code) implemented in the code for the application.

The implementation of the communication code (manually implemented to facilitate collaboration between each of the modules and other parts of the application) is often error prone and it is harder to maintain dependencies between the module and other parts of the application. Hence, it is desirable to minimize the cost and complexity of adding each of the modules to an application by minimizing communication code or even eliminating the requirement for manually implementing the communication code. This patent application discloses tools, processes, and mechanisms for eliminating the need for manually implementing the communication code. It is desirable to automate as many error-prone tasks as possible in creating and maintaining such communication code and inter-dependencies created by the communication code to allow collaboration between the modules or parts in the application.

One of the preferred embodiment employs a reusable global module (e.g. an Object in the case of an Object Oriented Program) named SRO/DoS (Service Registration Object)/(Directory of Services) which functions like a telecommunication switch and directory of services. Each module that provides a service registers its service (e.g. reference of a function or method that can be called to get the service) along with a unique key to lookup the service with SRO/DoS. Any other module that needs the service uses the lookup key to find required service from the SRO/DoS and requests or accesses the service.

This mechanism has three parts (i) a global module (e.g. SRO/DoS) that functions like a telecom switch (and directory of services) for each module to connect and collaborate with other modules or parts in the application, (ii) each module implements parts of the communication code to register each of its services with the SRO/DoS (if the module provides one or more services for other parts in the application) and (iii) each module implements parts of the communication code to find services it requires from the SRO/DoS (if the module requires to use one or more services, which are provided by other parts in the application). This mechanism eliminates the need for implementing communication code for such components that use SRO/DoS mechanism for communicating with each other.

In one of the preferred embodiments, the SRO/DoS maintains (i) a set of available services registered (in a list or hash-table to search) by each of the modules that provides the services (along with relevant or necessary information for each service provided or available) and (ii) another set (in a list or hash-table) of services requested by each of the modules that looks up the required services and uses the services (along with relevant or necessary information for each service). To help the SRO/DoS build these lists, (i) each of the modules in the application that provides one or more services registers each of the services (along with relevant or necessary information for each service provided and available) and (ii) each of the modules in the application that requires one or more services registers each of the required service (by providing additional relevant or necessary information for each required service).

The SRO/DoS creates (i) a first set of nodes comprising all the available services registered by modules that provide one or more services, and (ii) a second set of nodes comprising all the required services registered by modules that require one or more services. Each of the node in the first set comprises information such as a lookup-key and reference to a service-function. Using these nodes in the sets along with the information provided for each of the required and available services, it is possible to perform various tasks such as error checking, detecting unused services from the list (or first set) of available services and unavailable (or missing) services that are required from the list (or second set) of services required.

In another preferred embodiment, each of the modules in the application (i) registers each of the services provided by the module along with additional information such as description of the service provider interface to be used for requesting the service and (ii) registers each of the services required by the module with additional information such as description of the service consumer interface that is used for requesting the service. For example, if a service provider module provides a service function (or method) for requesting the service, the description for the service provider interface includes the number of parameters required to be passed to call the service function (or method) and the type of each of the parameters. This kind of information can be used to detect any broken or incompatible communication link (or interface) between any two modules. For example, module-A provides a service function-A, that requires passing 5 parameters, where the first 2 parameters are type integers, parameters 3 and 4 are type floats, and parameter 5 is type String. If a dozen modules or parts in the application require the service provided by the function-A, each must call the service function-A to access the service by passing the 5 parameters of their respective types.

If module-A and service provided by function-A is required to be redesigned to satisfy an evolving need in the future, it requires adding or inserting another parameter of type String at position 6. It is desirable to automate error prone tasks such as finding each of the dozen modules or parts in the application calling this service function-A and modifying the service consumer interfaces implemented for calling the service function in each of the modules accordingly by passing 6 parameters. It is desirable to automate such tasks for maintain the communication link or dependencies between as many modules as possible by providing the required information for each of the communication links (or interfaces), for example, for each of the (provided or required) services by the modules that register each of the (provided or required) services.

It is desirable to make the global SRO/DoS intelligent (e.g. designed to be more intelligent) for performing various tasks such as making various checks to detect possible software bugs, like incompatible interfaces. An example for incompatible interfaces between two modules is when parameters passed while requesting a service by calling the service function (i.e. in the code of the module that requires the service) don't match the parameters required by the service function (implemented in the module that provides the service). This kind of error checking and detecting is necessary only a few times during development (e.g. whenever the code of an application is being redesigned or changed) and testing phases. Such error checking is not necessary once the code changes and testing of an application is completed and no more changes are required for releasing the application version. If there are changes to the code, there is no possibility of injecting such errors once testing is completed and all the communication bugs are fixed. In one of the preferred embodiments, a flag is set in the SRO/DoS to turn off such time-consuming checks to detect possible errors (or software bugs).

Today, communication code is manually implemented to allow collaboration between any two modules or parts in an application. For example, assume that a module-Z in an application requires calling function-X of module-X to request service-X and requires calling another function-Y of module-Y to request service-Y. Today this kind of communication code is manually implemented in the code of the application to facilitate such collaboration between module-Z and module-X for accessing service-X, as well as code to allow communication between module-Z and module-Y for accessing service-Y. This kind of communication code injects dependencies between the modules or parts collaborating or communicating with each other. It is desirable to automate various tasks and activities performed to create and manage such communication code, interfaces, and dependencies between various modules in an application.

In another preferred embodiment, the extended SRO/DoS generates necessary communication code in one or more files, where the communication code (or instructions) can allow collaboration or interaction between the modules and other parts of the application. These files (that comprise of the generated communication code) could be made part of the application code and compiled with other files containing application code. For example, a module-Z requires services service-X of module-X and service-Y of module-Y, and then upon request, the SRO/DoS generates communication code that can allow collaboration between module-Z and module-X for requesting service-X, as well as communication code to allow collaboration between module-Z and module-Y for requesting service-Y. This communication code (i.e. created by the SRO/DoS) is made part of the code of the application, according to an embodiment.

In an alternative embodiment, the code for each of the modules comprises information for each of the required services and each of the services provided. That is, if a module provides one or more services, the code of the module comprises of detailed information for each of the services provided in a clearly delimited or marked block of code (or instructions), according to the embodiment. Likewise, if a module requires one or more services, the code of the module comprises detailed information for each of the required services in a clearly delimited or marked block of code (or instructions), according to the embodiment.

In an alternative embodiment, a mechanism (referred to by a given name Arjun) implemented within the compiler (used for compiling the application code) or preprocessor (that is designed to read parts of the source code of the application before or during compilation of the source code) is implemented to directly or indirectly get information for the services. The mechanism (i.e. referred to by a given name Arjun) uses the information included in the source code (e.g. by using pre-defined protocol and delimiters for marking few instructions or information) about the services for creating and/or including communication instructions (e.g. machine code) within the compiled code for the application, according to the embodiment. According to another embodiment, the preprocessor mechanism (i.e. referred to by a given name Arjun) uses the information about the services for generating communication code (e.g. source code), where the communication code can facilitate communication between the modules, when properly included in the source code of the application and compiled for building executable for the application.

The preprocessor mechanism (i.e. that is named Arjun) can be implemented as part of the compiler for programming languages such as Java, C # or C/C++ etc. The source code for each module/component comprises of necessary information for (i) each of the services required by this module from other modules or parts, and (ii) each of the services provided by this module for other modules or parts. In this kind of alternative embodiment, the compiler or preprocessor that may be implemented as part of the compiler uses this information from each of the modules for creating two lists for two sets (1) a list of all the available services and (2) a list of all the services required, and uses the information in the two lists for creating and including necessary communication code or instructions, which can facilitate collaboration between the modules.

In a brief overview of an embodiment, (1) if a module in an application provides one or more services for other modules/parts in the application, said module comprises instructions or code for publishing each of the services along with relevant or necessary information, and (2) if a module in an application requires one or more services provided by other modules in the application, it comprises information, instructions, or code for looking up and/or subscribing to each of the services. A mechanism and/or means is employed for gathering the information from each of the modules for creating two sets, for example as two lists (1) a list of all the available services from all such modules and (2) a list of all the services required by all such modules, and using the information in the lists either (1) for allowing collaboration between the modules or (2) creating communication code or instructions, which can be included in the code of the applications for allowing collaboration between the modules.

The main difference from prior art may be summarized as: Today, if a module is included in an application, this kind of communication code is manually implemented in the code of the application (i.e. to allow communication between the module and other parts). In an embodiment, this kind of communication code is generated by employing mechanisms and processes (e.g. referred to by a given name Arjun) for example, after making all possible checks to detect as many kinds of errors as possible (e.g. based on the available information about each Interface). In another embodiment, Arjun employs various processes or tools to generate efficient or optimal communication code to optimize collaboration between the modules.

In summary, each of the modules in an application (i) implements parts of the communication code to connect with the SRO/DoS for registering each of its services with the SRO/DoS and/or (ii) implements parts of the communication code to connect with the SRO/DoS to lookup of find each of the services it requires. In an embodiment, the SRO/DoS uses this kind of information provided (for services by the modules) for creating and managing dependencies or communication interfaces between the modules, where the communication interfaces between modules are essential to facilitate communication and/or collaboration between the modules. This discloser uses pseudo-code for illustrating general steps such as (i) registering each service with the SRO/DoS, (ii) finding or requesting each service with the SRO/DoS, or (iii) communication code or instructions created (e.g. by the SRO/DoS or Arjun/Preprocessor) to allow communication between any two modules. The precise implementation of these mechanisms and methods (or tools) vary from one language to the other such as Java, C #, VB, JavaScript, Python or C/C++ etc.

Therefore, it is desirable to invent methods, tools, and mechanisms to create and manage communication code between various modules and parts in an application, for example, for not only reducing the development complexity/cost of the communication code but also maintaining the communication code more efficiently and effectively by automating many tasks. Also, various mechanisms and/or tools may be used to create obvious variations or different versions for certain contexts to increase certain kinds of benefits (e.g. based on context or specific needs) or to satisfy certain individual preferences.

Additional features and advantages of the invention will be apparent by reading the following detailed description of the invention and the accompanying drawings.

BRIEF DESCRIPTION OF THE DRAWINGS

Various embodiments are described herein with reference to the drawings, wherein:

FIG. 6a shows including 2 modules and communication code for coupling the modules for collaborating with each other and FIG. 6b shows a simple flow chart for including two modules in a application, according to an embodiment;

FIG. 7 illustrates a communication link (or communication code) between two modules within a software application, according to one embodiment;

FIG. 9 shows pseudo-code implementation for two functions in a module where (i) the pseudo-code of first function illustrates registration of all the services of the module and (ii) the pseudo-code of second illustrates looking up of the reference of functions to call for required services of the module, according to an embodiment;

FIG. 15 shows pseudo-code for assembling three components (or modules) such as ATC (Air Traffic Control System) for a city, monitoring of Ambulances of ER (Emergency Response) for a city, and a map for the city, according to one embodiment;

FIG. 18 shows pseudo-code for a wrapper class for a reusable legacy class or stub for a remote component, according to one embodiment;

FIG. 20 shows wrapper for client stub for making client-stub pluggable, where pseudo-code is illustrated in FIG. 18, according to one embodiment;

FIG. 23 show sample code for implementing an interface function for getting a required service, according to one embodiment;

FIG. 26 shows two code blocks, where the first code block 2610 comprises pseudo-code listing for publishing a service by a module that provides the service and the second code block 2620 comprises pseudo-code listing for subscribing a service by module that requires the service, according to an embodiment;

FIG. 28b shows another product that is partitioned into pluggable modules, according to an embodiment;

Figure 1:
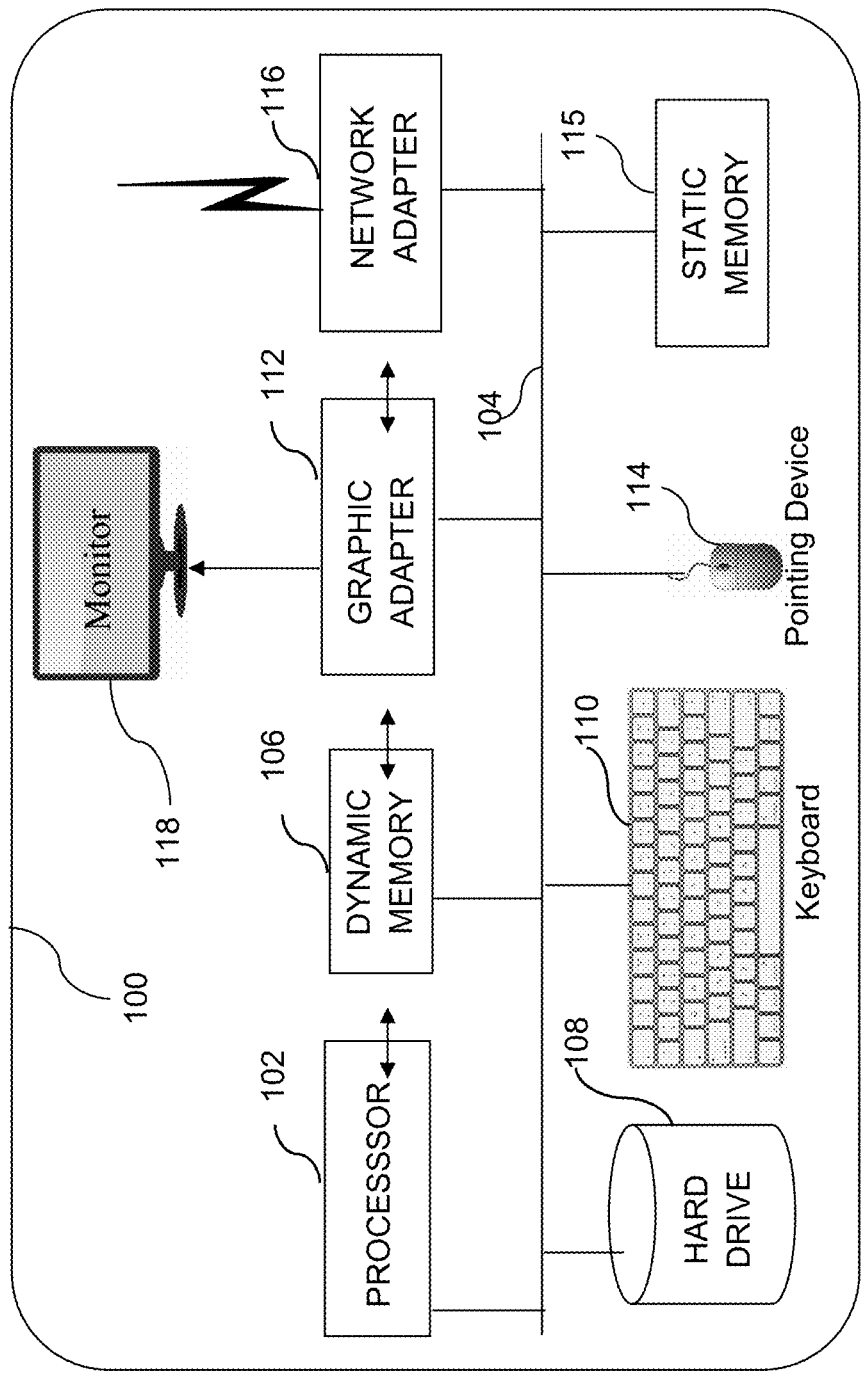
FIG. 1 shows an exemplary computing system or hardware for implementing the method of software development according to the present invention, according to one embodiment.

The drawings described herein are for illustration purposes only and are not intended to limit the scope of the present disclosure in any way.

DETAILED DESCRIPTION OF THE INVENTION

Section-A: Definitions for Terminology in the Context of this Disclosure

Following definitions are applied in the construction of the disclosure and attendant claims.

A software "application" or "product" is a software program or set of cooperating programs that enables a user of a computer system to accomplish some task or set of tasks. It includes applications run on a platform such as a computer, computing device (e.g. cell phone or server), browser, activeX viewer, Adobe Flash Player or virtual machine (e.g., Java Virtual Machine). It means the entire document and referenced files are sent to the platform where the application is executed.

"Extensible Markup Language" (XML) is a specification for designing formats for text data that allows for text objects to be organized into hierarchies (i.e., XML documents). XML allows web developers to create customized tags that offer flexibility in organizing and presenting information.

A "browser" means any HTML-rendering application. It can be a part of the computer operating system if it is integrated with the operating system (OS). A "viewer" means a platform that runs applications written in an appropriate language such as Scalable Vector Graphics, XAML, or Flash. Viewer can be part of the browser if it is integrated with the browser. It can be part of the computer OS if it is integrated with the OS.

A "network connection" means any kind of IP network or equivalents, including Internet, Intranet, private network, LAN, WAN, and wireless network and any combinations thereof that allow two connected computers or computing devices (e.g., cellular phones or palm-tops) to exchange data according to an IP protocol or equivalent. It also includes the loop-back of a computer when a server and a client reside in the same computer.

A "Module" or "Component" in a software application is an instance such as an Object in Object Oriented Programming, an independent "Part" or "Component" in an API, Library or Package (that comprises a set of modules). A "Module", in programming languages such as Modula-2, contains all the business logic to support a specific set of related functions and/or features of the application. Many applications use Object instances of graphical components to simulate or model real system and interactions of real objects. In this patent disclosure, "module" broadly refers to a unit of software code (implementing one or more source code files) being cohesive to a higher degree and comprising implementation of many functions (or methods) and necessary data in variables for providing a certain predefined set of features and/or a set of predefined functionalities having higher degree of synergy. The software code for a "module" is implemented in one or more source code files, where the source code files comprise of code for no other modules. The source code for a module also comprises implementation of "Interfaces" (described below), where the interfaces are useful for creating couplings (or connecting) with other modules or parts, where each coupling allows the module to interact, collaborate, or communicate with another module or parts.

"Communication code" or "Coupling code" between a module and another module or parts, is few lines of application code or instructions to allow collaboration or data exchange between the module and the other module or parts. Usually one of the modules in the application initiates the communication upon an event such as mouse clicks, keyboard or touch screen events, arrival of data, function call from another module, timer trigger, and change of state or data. The responsive actions in the other module or part include change of state, display or return data, return response, or initiate a communication with another module. These lists of events and responsive actions are not exhaustive. While the communication (e.g. using a communication interface) may pass data from one module to another module or part, the passing of data may not be required in rare cases. In an embodiment, communication code for a module is implemented in the application for allowing interaction or collaboration between this module and other parts or modules in the application. For example, Communication code includes any code or instructions in an application by which an event in one module causes a response or reaction from a second module.

An "Interface", "Coupling Interface", or "Communication Interface" of a software module or component: An interface is a pre-agreed protocol or pre-defined mechanism implemented in a module, which is useful for other parts to connect with the module for communicating or collaborating with the module. In another perspective, an interface of a module is a "port", through which other parts or modules connect and communicate with said module. For example, a "port" (e.g. interface) of a module is a gateway for entry-point and/or exit-point for data (e.g. information, notifications or signals etc.), so other modules or parts can exchange data thorough the port (or interface). Alternatively, two modules, each having an interface, can be coupled (or connected) by implementing communication code to connect the interfaces (or "ports") for allowing communication or collaboration between the modules through respective interfaces (or "ports").

A module can have multiple interfaces, where each interface is provided to serve a given purpose and different interfaces are implemented for serving different purposes. For example, if two different modules (e.g. things or entities) are required to collaborate or communicate with each other, the two modules can be coupled by using appropriate interfaces implemented in respective modules for allowing collaboration between them, such as communicating with each other by exchanging data or interacting with each other by exchanging notifications of signals. In the specific context of this disclosure, a "Coupling Interface" or "Communication Interface" of a module includes a function or an object, where the function (or object) can be called for communicating with the module. That is, other modules or parts can communicate, interact or collaborate with the module by calling the function (or using the object) by properly passing information through parameters of the function.

In the context of a software application comprising a set of modules that communicate with each other: For example, in an embodiment, an interface between a first module and a second module is a function (or method), where the first module implements a function (or method) and the second module calls the function (or method) to interact, communicate (e.g. to send data, to request data, or to exchange data) or collaborate with the first module. The definition of such a function includes definitions of parameters for the function, where the parameters are used, for example, for sending data, for getting data, and/or for exchanging data. Each such interface function is designed to have multiple parameters, where each parameter is of a given type (e.g. Integer, String, Float or Object). It is not necessary that such a function must have parameters. Also such a function may return an Object, which contains necessary data. The two modules use the parameters to pass data, to get data, or exchange data etc.

In another embodiment, an interface between first module and second module is an object instance of a class definition, where the first module implements the class (and uses object instance of the class) and the second module gets a reference of the object and uses the object instance to interact, communicate, or collaborate with the first module. In an embodiment, the second module is designed to use the interface implemented by the first module. That is, in case a function is used for a communication link, then the second module must call the function by passing the correct number of parameters and the type of each parameter must match.

For example, if the first parameter type of a service function is String, then the caller module must call the service function by passing a String type variable as the first parameter, and so on.

An "Interface" is generally summarized as (i) a point where two things (e.g. systems, objects, modules or organizations, etc.) meet/connect for interacting with each other. An "Interface of a Thing" is generally summarized as a port (e.g. dock for attaching or socket for plugging in) for other things to connect for interacting with the thing. For example, an "Interface of a Module" is a function (or method) for other modules or parts to connect with for interacting with the module, according to one embodiment. In yet another embodiment, an "Interface of a Module" is an object (i.e. an instance of Class definition) for other modules or parts to connect with for interacting with the module.

Examples for kinds of "Interface" or "Communication Interface" include (i) "Service provider interface" of a module—A function, method, or object implemented in a module for providing a service, where the function (or object) can be used for requesting or accessing the service of the module, (ii) Listener interface—A function, method, or object implemented in a module to provide for interacting or collaborating with the module, where the function (or object) can be used for interacting or collaborating with the module, or (iii) Interface for other kinds of things such as registering a Callback—A function (or object) is provided for registering an external Callback function (or object) and optionally one or more kinds of events, where the Callback function (or object) is called up on a given kind of events. If the Callback function (or object) is implemented in another module, then the two modules interact with each other by using the Callback function. This disclosure refers to each of such kinds of interfaces of a module loosely refer to as "Service provider interface".

A "Service consumer interface" of a first module is a function (or object) implemented in the first module (or service consumer module) for requesting and/or getting a service (provided by another module), where the function (or object) is designed to directly or indirectly call a service-function (or use a service-object) implemented in a second module for requesting (or getting) the service, where the second module (or service provider module) can provide the service and the service-function (or service-object) which is implemented in the second module (or service provider module) for providing the service. Likewise, "Caller interface"—A function, method or object implemented in a first module for interacting or collaborating with a second module, where the function (or object) can be used for allowing interaction or collaboration between the first module and the second module. The interface function (or object) in the first module is implemented to interact with the second module by directly or indirectly calling a service-function or listener-function implemented in the second module.

Each "Service consumer interface" or "Caller interface" is in general or often (but not necessarily always) designed to use a given, existing, known or pre-defined "service provider interface" or "listener interface"; for example, to couple a "Service consumer interface" with "service provider interface" by implementing communication code. So coupling of any two modules usually means including communication code for facilitating collaboration between the two modules. However, alternatively, "Service provider interface" or "Listener interface" are sometimes designed to match a given, existing, known or pre-defined "service consumer interface" or "caller interface"; for example, to couple a newly implemented "Service provider interface" with "service consumer interface" by implementing communication code. The interfaces used in each of the modules for coupling the modules are referred to as coupling interfaces.

A "Coupling Interface", "Communication Interface", or "Interface" of a first module is the mechanism (e.g. a port) useful for allowing connection of a second module with the first module for communication or collaboration between said first module and the second module, where the communication includes passing information, exchanging information, or notifying events. Each module (i) if the module requires one or more services provide by other modules, the module implements an interface for requesting (e.g. inward or input) each of the required services, and (ii) if the module provides one or more services for other modules, the module implements an interface to access (e.g. outward or output) each service by other modules. It is required to implement coupling or communication code for connecting two components/modules for allowing the two components to collaborate with each other, where one component implements interface for providing a service and the other component usually (but not always) implements complementary or compatible interface for consuming the service. If the interfaces are slightly incompatible, sometimes it is possible to implement the communication code to bridge the gaps between the interfaces.

Creating "Communication Code (or Instructions)" for coupling a first module and a second module for allowing collaboration or interaction/communication between the first and second modules include (i) Creating few instructions (or code) for connecting the first module with an interface of second module, or (ii) Creating few instructions (or code) for connecting the interface of first module with the interface of the second module.

A basic "Service Registration Object" (or SRO) or "Directory of Services" (or DoS) is a software module (or mechanism implemented in software) that can be included in an application comprising multiple modules, wherein each module in a first set of the modules provides one or more services for a second set of modules that require service, and each module in the second set of modules consumes one or more services provided by the first set of modules. Each module that provides one or more services can register each of the services with the SRO/DoS, where registering a service with SRO/DoS includes (or comprises of) inputting the reference of a service-function (or service-object) along with a unique lookup key (e.g. by using a service-registration function implemented in SRO/DoS). Each of the services is registered with the SRO/DoS by providing (i) a unique lookup key (or combination of lookup keys) and (ii) a reference to the function or object that can be called/used for requesting the service. The reference along with its unique lookup key (or combination of lookup keys) to a list (or hash table), according to an embodiment. According to this embodiment, the SRO/DoS also provide service-lookup function for allowing other modules to find the reference to the service function or object by passing its unique lookup key to service-lookup function. Any other module or part in the application can find a service registered with the SRO/DoS by using the unique lookup key (or combination of lookup keys) associated with the service.

"Arjun" or Preprocessor (e.g. to a compiler) for creating communication code for modules in an application: A set of pre-defined steps or processes, Mechanisms employed for publishing and subscription of Coupling Interfaces (e.g. necessary information and code/instructions for each interface for each available or required service) of each of the modules and Software Implemented Tools for using the information for Creation, Validation, and/or Administration of communication code for coupling the modules in an application (e.g. to facilitate collaboration between the modules in the application). All such activities and tools are henceforth loosely referred to by given name 'Arjun'. That is, Arjun is a name given to all the tasks or activities for creating and maintaining communication code for allowing communication between modules. If any two different modules in an application require to collaborate or communicate with each other, then it is required to include few lines of communication code (or instructions) in the application to allow collaboration or communication between the two modules by using the interfaces implemented in each of the modules, in an embodiment. This kind of communication code to allow collaboration or communication between any two modules creates a coupling and dependency between the two modules. If an application comprises multiple modules and the modules collaborate with each other, it is required to implement communication code to allow the modules to collaborate with each other. The goal of Arjun/Preprocessor is to automate various tasks and activities for creating and maintaining said communication code.

A "Lookup Key" (or "a combination of one or more lookup keys") is used for registering/finding an available/required service: Each available service (e.g. provided by a module) is registered with SRO/Arjun by using a lookup key (or a combination of one or more lookup keys), for example, for finding the service (e.g. by another module that requires the service) using the lookup key. Often each lookup key is a unique name, string, number or ID. But a lookup key can also be a combination of one or more names, strings, number or ids, which together uniquely identify a specific service, or a service provided by a specific instance of a class-implementation of a module (or component). For example, multiple instances for a module that provides a service, may be included in multiple sub-systems, where an additional key may be used for identifying specific instance of the module in respective sub-system. Hence a combination of one or more lookup keys (e.g. names, strings, numbers or IDs) may be used for finding a service provided by a module instance in a given sub-system. Hence, lookup keys for finding a service can be a combination of one or more lookup keys comprising names, strings. Numbers or IDs, for example to find a service provided by an instance in a given sub-system.

Each "Lookup Key" (or combination of one or more lookup keys) is used for finding a required service from available services (e.g. by comparing for matching lookup-key for a required service with the lookup-key for each available service). Each available service is registered (e.g. by a module that provides the service) with the SRO/Arjun using a combination of one or more lookup keys. Each required service (e.g. by a module that requires the service) is found from the SRO/Arjun using a combination of one or more lookup keys. If a module provides a service, the module registers or publishes the service with SRO/Arjun using a combination of one or more lookup keys. Another module requiring the service can find the service from SRO/Arjun by using the combination of one or more lookup keys.

The lookup keys are used only to facilitate communication between two different parts or modules, where one part/module provides a service and another part/module requires the service (e.g. by comparing for matching the lookup key for a required service and the lookup key for an available service). For example, if a module requires a service, the module looks up for the required service from the mechanism comprising SRO/DoS using a combination of one or more lookup keys. The SRO/Arjun can't find a required service using a combination of one or more lookup keys, if no service is registered using the combination of one or more lookup keys (e.g. by another module that provides the service). The lookup keys are useful for connecting (or facilitating communication between) each module that requires a service with another module that provides the required service, for example, by matching a lookup-key used for registering an available service and lookup-key used for finding a required service. The mechanism comprising SRO/Arjun can't find a required service using a lookup key, if no service is registered using the lookup key (e.g. by another module that provides the service).

A "Pluggable Module" and/or "Ideal Pluggable Module" is a module that is capable of or suitable for being plugged in (and can be unplugged easily). In other words, a pluggable module implies a module that can be plugged in (and can be unplugged easily). Likewise, assemblable module implies a module that can be assembled (and can be disassembled easily). For an exemplary embodiment: If code for an ideal pluggable module of an application is implemented in a Class definition, in OOP (Object Oriented Programming), the pluggable module can be included in the application by including an object instance of the Class-definition. If this module needs to collaborate with other parts of the application, there is no need to manually implement additional communication code for allowing said collaboration. In the context of the claims of this invention, any module that uses SRO/DoS or Arjun for facilitating collaboration between said module and other parts (including other modules) of the application is a pluggable module even in case communication code is implemented manually for creating a few couplings for this module. For example, if a module module-X uses SRO/Arjun for creating a few couplings (where each coupling allows communication between module-X and another part or module) and communication code is implemented manually for creating other couplings (where each coupling allows communication between module-X and another part or module), then module-X is a pluggable module, but not an ideal pluggable module.

An ideal pluggable software module means a software module that doesn't require implementing any communication code manually when the module is included in a software application. That is, when an ideal pluggable module is included in an application, there is no need for implementing any more communication in the code of the application. According to an embodiment, the code for a pluggable module or component comprises of necessary information for its interfaces and dependencies (e.g. required services) and employs a process (or recipe), mechanisms, and automation tools such as SRO/DoS either for creating necessary communication code or for accessing necessary services. Hence, it is possible to eliminate the requirement for implementing any additional communication code for such ideal pluggable modules when a module is added to an application. Likewise, if the pluggable module provides one or more services for other modules or parts, the code for pluggable module comprises of necessary information about the services and employs a process (or recipe), mechanisms, and automation tools such as the SRO/DoS either for creating necessary communication code or for accessing each of the services.

"Exclusive files" of a module (or component) used in an application: A file is considered an exclusive file of a module (or component), if the file contains only the code implemented for the module (or component), which includes interfaces or part of the communication that is implemented for the module. An exclusive file of a module (or component) must not contain any other code, for any other module or part of the application for example. If one or more files are implemented for a utility class/module and the utility class/module is created and used exclusively by the module (or component), then all the files implemented for the utility are also exclusive files of the module (or component). Likewise, files containing other resources (e.g. image, scripts, style-sheets or configuration files) are also 'exclusive files' of the module (or component), if the resources are exclusively used by the module (or component). The set of files comprising an 'exclusive file' of the module (or component) is considered 'exclusive code base' (or 'code base') of the module (or component).

"Non-exclusive files": A file is considered a non-exclusive file for a Module if the file contains code for the Module and as well as code for other parts or modules of the application. For example, a file is not an exclusive file for any module if the file contains code for more than one module. If one or more files are implemented for a utility class/module and the utility class/module is used non-exclusively by the Module, then all the files for the utility are also non-exclusive files of the Module. Likewise, files containing other resources (e.g. image, scripts, style-sheets, or configuration files) are also 'non-exclusive files' of the Module if the resources are non-exclusively used by the Module (i.e. if other parts of application are also using the utility class/module or resources).

"Elastic Coupling Interface" or "Elastic Interface" is a coupling of communication interface that allows certain degree of flexibility. For example, a coupling interface for providing a service by a service provider module offers certain degree of adaptability and/or configurability. The SRO/Arjun-mechanism uses this kind of configurability and/or adaptability of one or both interfaces (e.g. "service provider interface" and "service consumer interfaces") for creating communication code to allow collaboration or interacting between the service-provider modules and service-consumer module. For example, in an embodiment, a rule-based and/or expert system may be used for creating the communication code to allow collaboration between modules if there is a certain degree of incompatibility between the service provider interfaces and service consumer interface. For example, most electric appliances (e.g. cell-phones or tablets) can handle input power voltages between 115V-DC to 230V-DC and frequency between 50 Hz to 60 Hz.

The "Coupling Adapter" of "Communication Adapter" for connecting incompatible interfaces: If there is an incompatibility (e.g. in voltage or pin configuration) between electric socket (service provider) in a foreign country and plug (service consumer) of an electric appliance (e.g. laptop or cell-phone), an electric adapter can be used to bridge the gaps. The need for power is a real dependency but the 115V-AC and flat/round pins of the plug are artificial dependencies. The adapters can be used to bridge or fill the gaps in the artificial dependencies. Likewise, if there is a gap between service-provider interface of a first module that provides a service and service-consumer interface of a service-consumer module that needs said service, it is desirable to generate communication code to bridge the gaps (i.e. in artificial dependencies) to connect or couple such incompatible interfaces, according to an embodiment. If the 2 modules (i.e. first module and second module) are created by two different component vendors, and each module defines a different interface, it is desirable for the SRO/Arjun-mechanism to facilitate creation of communication code that can bridge the gaps in the interfaces (if it is possible or practical to bridge the gaps).

According to webpage of Wikipedia.org, in the context of computer programming, the term "Cohesion (Computer Science)" refers to the degree to which the elements inside a module belong together. In one sense, it is a measure of the strength of relationship between the methods and data of a class and some unifying purpose or concept served by that class. In another sense, it is a measure of the strength of relationship between the class's methods and the data itself. Cohesion is an ordinal type of measurement and is usually described as "high cohesion" or "low cohesion". Modules with high cohesion tend to be preferable, because high cohesion is associated with several desirable traits of software including robustness, reliability, reusability, and understandability. In contrast, low cohesion is associated with undesirable traits such as being difficult to maintain, test, reuse, or even to understand. "Cohesion" is often contrasted with "coupling", which is a different concept. High cohesion often correlates with low coupling, and vice versa. In other words, for example, increasing the degree of cohesion of a module likely reduces the degree of coupling (e.g. by simplifying the communication code required for the module).

In the context of the modules (or components), "Optimal Size" (e.g. number of lines of code) or "Optimal Complexity" stands for the complexity not being too high (for redesigning the module, for example) and the size (or lines of code) not being too low. According to an exemplary embodiment, a team of software designers or architects may define optimal complexity of a module to imply that the module can be understood, redesigned, and tested individually by an ordinary, skilled new programmer in about a week's time and have at least 1500 lines of code. Here, a new programmer implies an experienced programmer that has not made any earlier contribution to the module and/or has not seen the code of the module earlier). Often, "Optimal Size" and "Optimal Complexity" are used interchangeable to mean same thing. The meaning of "Optimal Size" and "Optimal Complexity" are subjective and can be defined to suit skills, talent of experience of a given team and/or circumstances.

Some of the desirable traits for each of the modules or components include optimal complexity and higher degree of Cohesion. For example, it is desirable to partition any large software application into modules that are closer to optimal size and optimal complexity, while having a higher degree of Cohesion, according to an embodiment. This disclosure is not recommending any pre-defined values for optimal size (e.g. in lines of code) or optimal complexity (i.e. number of days) of a module but, according to a preferred embodiment, encourages every team that is designing and building a large application to define such values based on relevant factors such as skills of the programmers and/or to suit the software being designed and developed.

Section-B: Object-Oriented Programming & Modular Programming

Computer programming of a software product or application is a process that leads from an original formulation of a computing problem to "executable computer programs" (i.e. machine code that runs on computing platform). Programming involves activities such as analysis, design, development by understanding, generating algorithms, verification of requirements of algorithms including their correctness and resources consumption (e.g. for designs such as Modular design or Object-Oriented Design), and implementation (commonly referred to as coding) of modules and other parts in a target programming language. Source code is written in one or more programming languages. In an embodiment, the source code is compiled for creating machine code (i.e. executable). The process of programming thus often requires expertise in many different subjects, including knowledge of the application domain, specialized algorithms, and formal logic. Related activities include software development tasks such as testing, debugging, maintaining the source code, implementation of the build system, and management of derived artifacts such as machine code (i.e. executable that is run on computing platform) of computer programs.

Object-Oriented Programming (OOP) languages (e.g. Java, C # or C++ etc.), support a concept called classes. A class is a module of code implemented in one or more files that generally contains (1) a set of data variables to store data and references to other objects, (2) a set of methods or functions to operate on the data, (3) methods for providing access to the services defined in classes, (4) methods for setting and changing the objects' data (popularly known as set methods), and (5) methods for reading objects' data (popularly known as get methods). This list is not exhaustive.

Object-oriented programming techniques involve the definition, creation, use, and destruction of "objects". These objects are entities comprising data elements or attributes and methods or functions which manipulate the data elements. Objects can be created, used, and deleted as if they were a single item. The attributes and methods enable objects to model virtually any real-world entity in terms of its characteristics, which can be represented by the data elements, and its behavior, which can be represented by its data manipulation functions. Objects are defined by "classes", which act as templates that instruct the compiler how to construct the actual objects. A class may, for example, specify the number and type of data variables and the way of manipulating the data. When an object-oriented program is compiled, the class code is compiled into the program, but no objects exist. An object instance is created by the program at runtime by calling a special function called a constructor, which uses the corresponding class definition and additional information, such as arguments provided during object creation, to construct the object. Object creation is also referred to as object instantiation. When an object is created at runtime, memory is allotted and data structures are created. The objects may be used by using their data and invoking their functions and are destroyed by calling a special function called destructor.

Class may support a rich set of methods to initialize the data variables and also to read the variables. Also, it supports methods, which can be used to request (or access) the services of the object, which is an instance of the class. For example, a sample drawing-class for a pie chart, which draws a pie chart, may contain variables: an array of floats, an array of strings, and a title string. The class may support methods to initialize these variables and a service method that draws the pie chart using the data. Users can instantiate a pie chart object and initialize the data using the supported methods; and then use the service method to draw the pie chart. Also, the class may support other methods such as service methods to register callbacks. If any external component interested in the user selection/clicks on the chart, they could use appropriate service method to register a callback to be notified on the event.

The major benefits of object-oriented programming techniques arise out of three basic principles; encapsulation, polymorphism, and inheritance. More specifically, objects can be designed to hide, or encapsulate, all, or a portion of, the internal data structure and the internal functions. A program developer can define objects in which all or some of the attributes and all or some of the related functions are considered "private" or for use only by the object itself. Other data or functions can be declared "public" or available for use by other objects. Access to private variables inside an object by other objects can be controlled by defining its public functions for accessing the object's private data. The public functions form a controlled and consistent interface between the private data and the "outside" world. Any attempt to write program code that directly accesses the private variables causes the compiler to generate an error during program compilation, where the error stops the compilation process and prevents the program from being run.

Inheritance allows software developers to easily reuse preexisting program source code and to avoid creating software from scratch. It allows a software developer to declare classes and their instantiated objects as related to each other. When a class is designated as a subclass of the base class, the subclass "inherits" and has access to all of the public functions of its base class just as if the functions were declared in the subclass. Alternatively, a subclass can override some or all of its inherited functions or modify some or all of its inherited functions merely by defining a new function with the same form. Overriding or modification of a function in the subclass does not alter the function in the base class. The creation of a new class by selectively modifying the functions of another class allows the software developers to easily customize existing code to meet their particular needs.

Moreover, many components are essentially objects that conform to an object model such as Microsoft's Component Object Model. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most of the object-oriented languages, including the C++ programming language, do not specify true object modules, but merely specify syntax and semantics of a basic object implementation without specifying the rules that unify object systems.

The following is taken from wikipedia.org for modular programming by making a few changes to reflect the context of this disclosure: Modular programming is a software design technique that emphasizes separating the functionality of a program into independent, interchangeable modules, such that each contains everything necessary to execute only one aspect (e.g. smaller features or functionality) of the desired functionality. A module interface expresses the elements that are (a) provided by the module for other modules (or parts) and (b) required by the module from other modules (or parts). The elements defined in the interface are detectable and coupled to other modules by creating communication code. The code implemented in the modules comprises of the working code (e.g. referred to as application or business logic; and presentation logic in case of GUI components) that corresponds to the elements declared in the interface (e.g. for providing services and requesting services).

Modular programming is closely related to structured programming and object-oriented programming, all having the same goal of facilitating construction of large software programs (e.g. applications or products) and systems by decomposition into smaller pieces, where the small pieces are referred to as modules. While, historically, usage of these terms has been inconsistent, today "modular programming" refers to high-level decomposition of the code of an entire program into pieces (e.g. preferably having higher degree of cohesion): structured programming to the low-level code use of structured control flow, and object-oriented programming to the data use of objects, a kind of data structure. In object-oriented programming, the use of interfaces as an architectural pattern to construct modules is known as interface-based programming.

The term assembly (as in .NET languages like C #, F # or Visual Basic .NET) or package (as in Dart, Go or Java) is sometimes used instead of module. In other implementations, this is a distinct concept; in Python a package is a collection of modules, while in the upcoming Java 9 the introduction of the new module concept (a collection of packages with enhanced access control) is planned. A component is a similar concept, but typically refers to a higher level; a component is a piece of a whole system, while a module is a piece of an individual program.

Section-C: The System for Application Development

FIG. 1 shows a computing device 100 that runs an application comprising of an embodiment of the invention being disclosed in this application, where the computing device or hardware platform includes a processor (CPU) 102, a persistent storage (e.g. hard-drive or flash memory) 108 and/or static memory 115, dynamic memory (volatile storage) 106, one or more input device such as a keyboard 110 and a pointing device (mouse) 114 (or a touch screen not shown), output device such as monitor 118 connected to a graphic adapter 112, and a network adapter 116. All are connected through a printed circuit board (e.g. systemboard) 104. The printed circuit board 104 includes a path (e.g. wires) that permits communication among the components of the computing device 100. The keyboard 110 and the pointing device 114 are used to provide inputs. The graphics adapter 112 generates display signals (e.g., in RGB format) to monitor 118 based on data/instructions received from processor (CPU) 102. The network adapter 116 provides connectivity to a network (e.g., using Internet Protocol), and is used to communicate with other systems connected to the network. A specific example of a suitable hardware platform includes (but is not limited to) PC/Laptop/Tablet running Microsoft Windows 10, Server running Linux, Apple iPhone running iOS 8, or Samsung Galaxy S5 running Android. But it is to be understood that the teachings herein can be modified for other presently known or future hardware platforms or commuting devices. In an embodiment, the software described below is "stored in the persistent storage 108 or static memory 115 and runs on the CPU 102 at runtime, making use of the dynamic memory (volatile storage) 106 as needed.

The system (FIG. 3) for web application development in accordance with the present invention comprises of a client computer 300 running an operating system (not shown) and a web browser 305, a server computer 310, and a network connection 315 between the client computer 300 and the server computer 310 so that the client computer 300 and the server computer 310 can exchange data according to an Internet communication protocol such as Hypertext Transfer Protocol (HTTP), TCP/IP or File Transfer Protocol (FTP). The network connection 315 includes, but is not limited to, an Ethernet, a wireless local area network (WLAN), or a wide area network (WAN), a WIFI communication network e.g., the wireless high-speed internet, or a combination of networks, a cellular service such as a 4G (e.g., LTE, mobile WiMAX) or 5G cellular data service. The network connection 315 provides a web interface employing transmission control protocol, hypertext transfer protocol, simple object access protocol or any other internet communication protocol. The server computer 310 hosts a web application server 320, which runs Servlet or JSP and/or has a Common Gateway Interface (CGI) 323. The server computer 310 may optionally run a database server or similar database application having access to data sources 325. The database server provides database services to the web application server 320 via the common Gateway Interface (CGI) 323. The web browser 305 uses a URL (the virtual address of the server) to locate the web application server 320 and to request a web page. If the URL points to a static web page, the server computer 310 returns the page in appropriate code. If the URL points to an executable such as CGI or JSP/ASP program, the request will cause the server computer 310 to run the executable, which creates a web page dynamically. The web application server 320 is used for dispatching static HTML files 322.

The client computer 300 (as well as server computer 310) includes a central processing unit (CPU), a random-access memory (RAM) for temporary storage of information, and a read-only memory (ROM) for permanent storage of information. A bus, which is controlled by a bus controller, interconnects the components of the computer system. Secondary storage may be provided by diskette, CD ROM, hard drive, flash memory cards (by serial or USB or other connections), and tape drive. The diskette drive, CD ROM, and hard disk are connected to the bus by respective controllers, and the RAM is controlled by a memory controller. An interrupt controller is used for receiving and processing various interruption signals from any of the system components. The client computer 300 also includes a communication adapter that allows the system to be interconnected to a local area network (LAN) or a wide area network (WAN) schematically illustrated by the bus and network connection.

Operation of both the client computer 300 and the server computer 310 is generally controlled and coordinated by operating system software, such as the Microsoft Windows 95, 98, 2000, ME, XP and NT from Microsoft Corp., Redmond, Wash., Sun OS/2, and Apple OS 10 from Apple Computer Systems, Inc. Cupertino, Calif., and Linux from RedHat Inc, Durham, N.C. The operating system controls allocation of system resources and performs tasks of processing, scheduling, memory management, networking, and input/output services. The operating system resident in system memory and running on CPU coordinates the operation of the other elements of the computer. The present invention can be implemented with any of the commercially available operating systems including OS/2, UNIX, Windows 95, 98, 2000, ME, XP, Vista, NT, and DOS.

The server computer 310, as is well known in the art, is a computer that is connected to the client computer 300 through Intranet, local network, WAN, or wireless in accordance to an Internet Protocol (IP). The server computer 310 generally has similar components of the client computer 300 even though some of the components such as floppy disk, CD ROM drive and display may be dispensed with. The server computer 310 is capable of sending web applications to the client computer 300 in HTML format. HTML is a markup system used to create web pages that are portable from platform to platform. To send a web page, the two computers use the Internet HTTP, which specifies how information is exchanged between the client and the server. HTTP is an application that is designed to conform to International Standard ISO 8879—Standard Generalized Markup Language. HTML and HTTP standards are maintained by an Industry Consortium; the World Wide Web Consortium (W3C) jointly hosted by the Massachusetts Institute of Technology Laboratory for Computer Science (MIT/LCS) in the United States, the Institut National de Recherche en Informatique (INRIA) in Europe, and the Keio University Shonan Fujisawa Campus in Asia.

The system described above is just one exemplary embodiment of a suitable software development environment and is not intended to suggest any limitation as to the scope of use or functionality of the invention. Neither should the client computer 300 and the server computer 310 be interpreted as having any dependency or requirement relating to any one or a combination of components used in the present invention. The invention may be practiced on cell phones and palm devices that run browser-like application such as Web Browsers, SVG viewer, or Adobe's flash players. Since the platform supports Application Peripherals Interface, the invention can be used to control other hardware devices.

In software development environment, the server computer 310 and the client computer 300 may reside in the same computer unit. This is especially straightforward in systems running operating systems such as Windows NT, Windows XP, Unix, and Linux. In such a system, a web server application can be launched for hosting websites. At the same time, a web client can also be launched so that the client can access the web server through loopback. In this situation, the ordinary network connection is unnecessary. This system is ideal for software development using the technique of the present invention.

Figure 2:
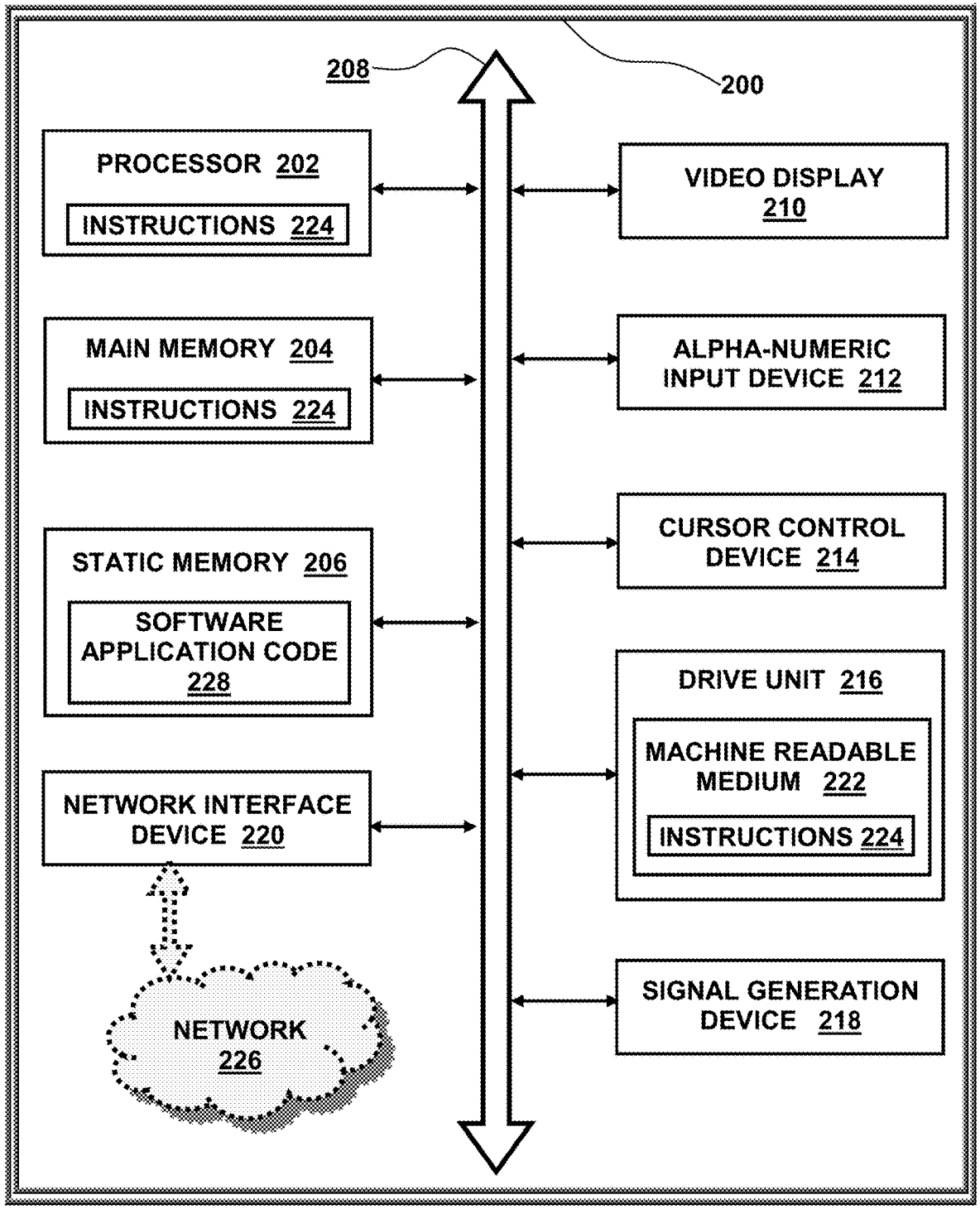
FIG. 2 shows an exemplary computing device for implementing the method of software development using new kinds of modules and mechanisms for creating and managing communication code according to the present invention, according to one embodiment.

Moreover, if the web browser 305 is merged into the operating system, the system might be reduced to one single standalone computer even though the details in operating such a system depend on how the system is implemented. Therefore, the system for application development is intended to cover both a single computer with a browser and a single computer without an independent browser. In this situation, the client computer 300 or server computer 310 should be construed as a logical computer as illustrated in FIG. 1 or FIG. 2. In the system where a browser is merged into the operating system, browser shall mean the part of the component of the operating system that performs browser's functions. A computer-readable storage medium having code for a software application (or product) comprising of instructions thereon which, when executed by a computing platform (e.g. FIG. 1, FIG. 2 or FIG. 3), results in execution of methods, mechanisms, and/or tools described in this patent application.

One of the sample contexts for using or practicing mechanisms, tools, and methods disclosed in this patent application: Any large software application or product comprises of a large set of features and functionalities. According to an embodiment, the designers or architects of a large software application (or product) partition the application into modules; for example, by identifying multiple modules where each of the modules comprises of one or more features having a certain degree of cohesion. For example, one of the preferred embodiments requires identifying modules having a higher degree of cohesion and of optimal size or complexity. The steps for building the application include (a) finding multiple reusable modules (or other kind of reusable parts such as APIs or libraries) that implemented required features and functionality, (b) implementing remaining features and functionality in multiple modules (or other kinds of parts implemented in the code of the application), (c) implement necessary code in the code being implemented for the application for properly including each of the modules (where modules are also referred to as components), and (d) creating or implementing necessary communication code for the modules in the code being implemented for the application, where the communication code is designed to facilitate necessary collaboration and/or interactions between each of the modules and other modules or parts of the application.

Section-D: Communication or Collaborate Between 2 Modules in an Application

In any software application (or product) comprising of multiple components or modules, it is essential for a large subset of the components (or modules) in the application to collaborate or communicate with each other. In other words, each of the components in the application collaborates or communicates with multiple other parts or components in the application. Any two components or modules in an application communicate or collaborate with each other by calling each other's functions (or using functions in interface objects). In other words, a first component in an application communicates with a second component in the application by calling a function implemented in the second component. It is required to create communication code for allowing such communication or collaboration between any two components in the application.

Today, the only known way for allowing such collaboration between any two components in an application is by implementing necessary communication code manually in the code of the application (i.e. outside of the code for the components), where the communication code creates hard-to-comprehend dependencies for each of the components. It is desirable to eliminate the need for manually implementing and maintaining the communication code for each of the components (or modules) in the code of the application (e.g. outside of the code for the components) where the communication code is essential for allowing each component to collaborate with other parts or components in the application.

Is it possible to automate various tasks for implementing and/or maintaining the communication code in the code of the application (i.e. that is outside of the code for the components)? To answer this question, it is desirable to understand how any two parts (e.g. modules or components) communicate with other parts. A first part (e.g. a first module or component) communicates with each of the other parts (e.g. a second module or component) by calling a function implemented in the second component or module. Other modules in an application collaborate with a first module in the application by calling a function implemented in the first module.

It is required to implement necessary communication code in the code of the application for allowing collaboration (e.g. for calling each other's functions) between a first component (or module) and a second component (or module) after implementing the necessary code for including the first component and the second component in the application. In other words, the source code for the application comprises of code for including and/or using the components (or modules) as well as communication code (e.g. code for calling each other's functions) for allowing collaboration between the components (or modules).

The need for manually implementing communication code in the code for the application for each of the components can be eliminated, for example, by (i) implementing within each component code the instructions to publish functions that are implemented within the component and required by other parts and (ii) implementing within each component code the instructions to find or subscribe to functions that are implemented in other components and required by the component. The functions implemented in a component that is used (e.g. by calling the functions) from other parts of the application such as components (or modules) are generally, or loosely referred to as service functions (or services) in this disclosure.

It is desirable to automate tasks for creating and maintaining communication code for allowing collaboration between the components included in an application by inventing mechanisms and tools, for example, for automatically creating communication code. For example, one kind of mechanisms include: (i) If a component provides one or more service functions for other components, the component comprises of a mechanism to publish each of the service functions by using a unique lookup key, and (ii) If a component requires one or more service functions that are implemented in other components, the component comprises of a mechanism to subscribe to or find each of the service functions by using a unique lookup key. Then, a tool is implemented for allowing communication between the components by coupling (a) each of the functions that is subscribed to (e.g. by using a lookup key) by a first part (e.g. a module), and (b) the function (e.g. by using the lookup key) that is published by a second part (e.g. a module).

Section-E: Using a SRO or DoS for Allowing Collaboration Between any Two Modules The figures (FIG. 4 and FIG. 5) illustrate how a global 'Service Registration Object' (or 'SRO') or Directory of Service (DoS) is used for allowing collaboration between any two modules in an application comprising of multiple modules (e.g. modules that provide service 401, 402, 403, and modules that consume service 405, 406, 407), according to an embodiment that uses Object Oriented Programming (or OOP). The application includes an SRO 414 as a global and/or shared object, where the names of the object and service-functions (i) for registering services and (ii) for looking up services, are defined and published in advance for usage in the code of the modules (e.g. 401 to 407). If a module provides a service, the module registers the service with the SRO using the service method of SRO for registering a service. If a module requires a service, the module finds the service from the SRO using the service method of SRO for finding a service. The code in each of the modules is designed and implemented to use the respective functions of the SRO in order to facilitate communication between modules with each other. Any part or module may access the SRO in the application either (i) for registering a service along with a lookup key assigned to (or pre-defined to associate with) the service in order for other modules or parts to lookup and request the service, or (ii) for looking up a required service (e.g. by each of the modules) using the pre-defined lookup name of the service provided by other modules or parts.

Figure 4:
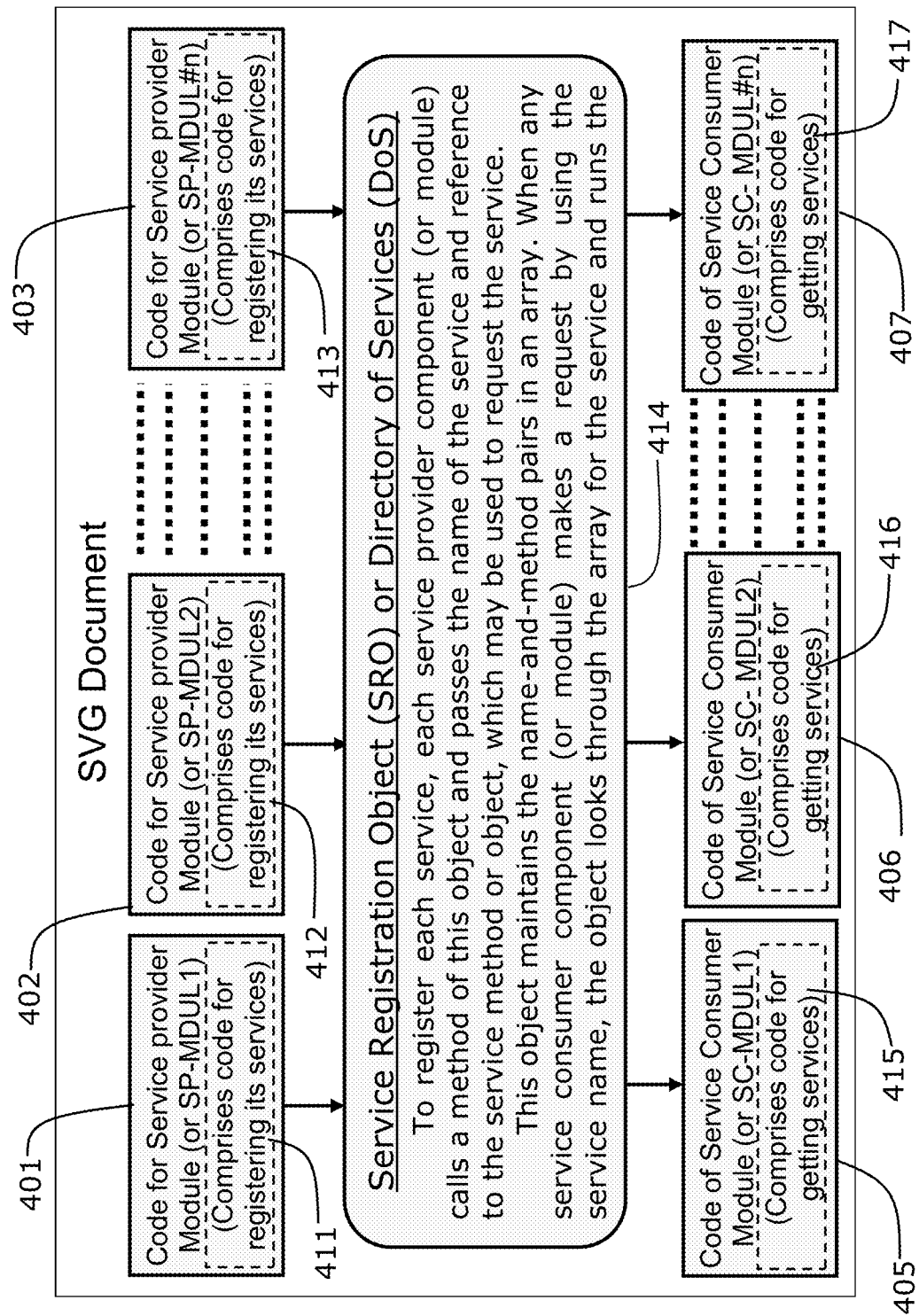
FIG. 4 shows a simple depiction of modules in an application for registering service names (i.e. a lookup key or a set of lookup keys) and services with a global Service Registration Object ('SRO') or Directory of Services ('DoS') in an application; and service-consuming components lookup for the services from the registration object and access the services, according to one embodiment.
Figure 5:
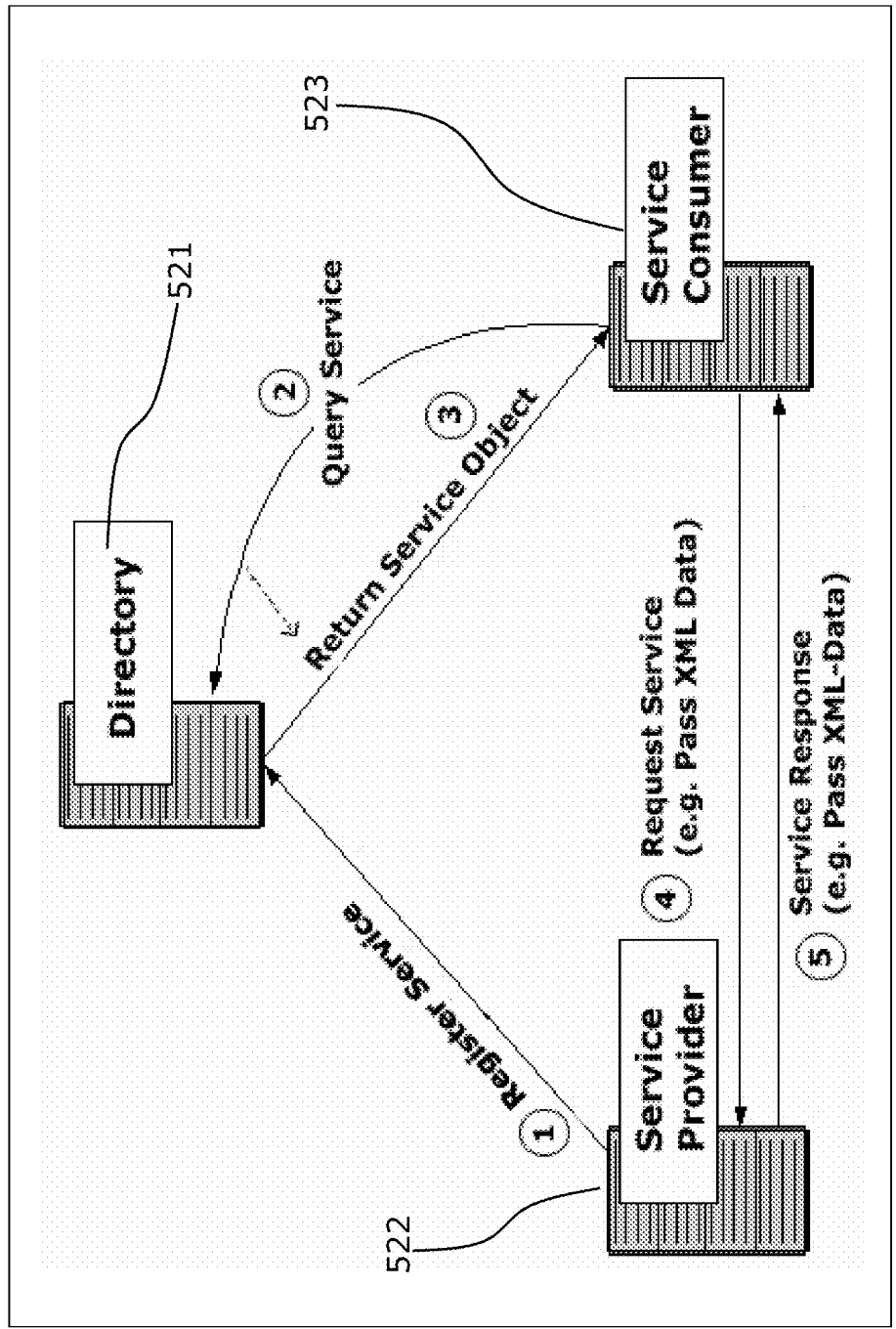
FIG. 5 shows steps for registering a service with a directory-of-services object (or Service Registration Object) and for looking up a service from the directory-of-services object (or 'DoS') and accessing the service, according to one embodiment.

In one of the embodiments, each application instantiates and initializes a shared global object of SRO 414 and makes it available globally, so that each of the modules in the application can access the SRO (i) for registering each of its services along with a lookup key associated with the service and/or (ii) to lookup each of the services it requires by using the associated lookup key. The method illustrated in FIG. 4 and FIG. 5 is a publish-and-subscribe method for directory of services. Registering each of the services implies registering a reference to a function/method (or object), where the reference can be used to call the function (or use the object) for getting the service. Each variable or function has an address in memory and an address is use for using the variables of functions. A variable can point to the address of a function, where the variable is referred to as a reference to the function and the function can be called by using the reference stored in the variable.

According to one embodiment FIG. 4 shows the code structure of an application where plural modules ((401, 402, 403) and (405, 406, 407)) are coupled through a global SRO ("Service Registration Object") 414. Each of the modules that provides one or more services 401, 402, and 403 for other modules comprises of the code (e.g. 411, 412, and 413 respectively) for registering each of its services by calling the SRO's function for registering services and passing a pre-assigned lookup key of the service and a reference to the service function/method (e.g. a pair comprising of lookup-key-of-service and service-function/method). The SRO saves the pair in a list (e.g. an array or hash-table) in the registration object 414. Each of the service-consuming modules 405, 406, and 407 comprises of the code (e.g. 415, 416, and 417 respectively) for looking up each of the registered services from the service registration object 414 by calling the service lookup function of the SRO 414 and also comprises of necessary code for getting the service.

To be specific, each module (e.g. 401) that provides a service comprises of necessary code (e.g. 411) to register the service. If the module (e.g. 402) provides one or more services, the module comprises of necessary code (e.g. 412) to register each of the services using a lookup key. Likewise, each module (e.g. 405) that consumes a service comprises of necessary code (e.g. 415) for looking up the service using the lookup key associated with the service. If a module (e.g. 406) requires one or more services, the module comprises of necessary code (e.g. 416) for looking up each service using the lookup key associated with the service and the code for getting the service. Each module (e.g. 403) that provides a service comprises of necessary code (e.g. 413) to register the service. If the module (e.g. 413) provides one or more services, the module 413 comprises of necessary code (e.g. 413) to register each of the services using a lookup key. Likewise, each module (e.g. 407) that consumes a service comprises of necessary code (e.g. 417) for looking up the service using the lookup key associated with the service. If a module (e.g. 417) requires one or more services, the module comprises of necessary code (e.g. 417) for looking up each service using the lookup key associated with the service and the code for getting the service.

Although it is not shown in FIG. 4, it is not uncommon for a module to provide one or more services for other modules and also consume one or more services provided by other modules. If a module provides one or more services for other modules and consumes one or more services of other modules, then the module comprises of necessary code to register its services and lookup required services. After a service of a service-providing-module is registered with the SRO 414, any service-consuming module can lookup the service by calling the lookup function of SRO 414 using respective pre-assigned or associated lookup key.

FIG. 5 is a block diagram for illustrating the publishing-and-subscribing method or mechanism to couple any two modules in an application for facilitating communication between the two modules. The service-provider 522 (e.g. a module or component) registers (or publishes) a lookup key (e.g. a name) for service and a reference of the service function (or object) with the SRO (Service Registration Object), which acts as 521 Directory of Services (or DoS) by saving a reference of the service-function and associated lookup key. The service-consumer module 523 queries the SRO/DoS 521 for the service-function (or object) using the lookup key associated with the service. The SRO/DoS 521 returns a reference to the service-function (or object, if object is used for providing a service). The service-consumer 523 (e.g. a module or component) uses the reference to the service-function/object to request the service of service-provider 522, which processes the service request and sends a response. For example, SRO/DoS 521 creates a list of nodes, where each node (e.g. data record or structure having variable, where each variable can store data or information) stores or comprises of information related to a service such as lookup key for the service and reference to service function (or method), according to an embodiment. The node for each service may comprise of additional information such as communication interface and interface version etc.

According to an embodiment in OOP (Object Oriented Programming), a class 'service_register_class' is implemented so that it supports (i) at least one method to register each of the services and (ii) at least one method for lookup to get a service, if the service associated with the lookup key has already been registered. Using this simple mechanism, any component or module can register each of its service by using a pre-defined lookup key. If any other component or module needs the service, the component looks up the service using the pre-defined lookup key.

According to an embodiment, this name of the global service registration object can be agreed upon at the beginning of the design phase of the application and reserved so that the component code of plural subcomponents are implemented to register their services (e.g. using the global object for the SRO/DoS). For example, the following one-line pseudo-code illustrates including an object instance of class definition for SRO/DoS.

var MyApp_SRO=new service_register_class( );

According to another embodiment, a global or shared object ACi is created and shared with each of the modules, where ACi is an object that stores Application Context Information. The object for MyApp_SRO may be a stored global/shared object such as an ACi, where ACi is a global object that is passed and shared by each module. This ACi object is used to share data related to the application context and various global resources such as global objects, resource-files or DB-connections etc. For example, the following one-line pseudo-code illustrates saving an object instance of class definition for SRO/DoS in ACi.

Figure 17:
FIG. 17 shows a shopping cart application, where multiple modules (i.e. shopping items) communicate by calling service method of an Invoice table (of Shopping Cart module) in an application, according to one embodiment.

10. ACi.MyApp_SRO=new service_register_class( );

The module contains required communication code for registering each service with the 'SRO' with the pre-assigned name (i.e. given lookup key) of the service. For example, the following statement is used to register a service:

20. ACi.MyApp_SRO.add_service ("Shopping Cart", shopping_cart_service);

"Shopping Cart" is a lookup key and shopping_cart_service is a reference to a shopping cart service function (or object). Any module that needs this service must know the lookup name (e.g. "Shopping Cart"), and must implement the following to find or request the service:

1. Var add_to_invoice=ACi.MyApp_SRO.find_service ("Shopping Cart");
2. If (add_to_invoice !=null)
3. add_to_invoice (xml_data, callback_function);

The line-1 above calls a function, which looks through the DoS (e.g., for lookup key "Shopping Cart"), and registration object returns reference to the service, shopping_cart_service, if the lookup key is found. Line-3 calls the function by passing the xml_data (i.e. data encoded in XML format) and callback_function as parameters to the function. The service-providing component uses data in xml_data to process the request (i.e., add the item to the cart/invoice). The shopping cart component saves the reference to the function "callback_function" and notifies the service requester (i.e., the subcomponent for shopping item) by calling the callback function if the shopping item is deleted from the shopping cart later. FIG. 17 (described later) illustrates a sample shopping-cart application.

In one of the example embodiments, developers of both service-provider module and service-consumer module agree to a lookup key or name (e.g., "Shopping Cart") for each service in advance. To accomplish more complex and multi-faceted inter-component communication, the application code of service-provider module, can register a service-object (instead of a service-function) containing plural methods and variables. In response to a request, the lookup service returns reference of the service-object, which contains service methods (or functions) and variables. The requesting component then gets the service methods or callback functions, the values in the variables, and invokes appropriate actions of the services of the servicing component.

Section-F: Creating Communication Between Modules and Other Parts of an Application In a preferred embodiment of this invention for OOP (Object Oriented Programming), the process or steps include identifying multiple modules in an application where each module (i) provides one or more services for other modules or parts of the application and (ii) consumes one or more services provided by other modules or parts of the application. In method-1 or mechanism-1 according to an embodiment, each module is designed to use a 'Service Registration Object' or SRO to allow communication between the module and external parts or other modules in the application. In this mechanism, the code for the module comprises of (i) implementing part of the communication code for registering a service-function and lookup key of the service for finding the service from the SRO for each of the services offered by the module and (ii) implementing parts of the communication code to lookup using a service name and request each of the services required by the module.

In the above method (or mechanism) for coupling modules, an application or container component instantiates and initializes object instances of multiple modules (i.e. each module is implemented by a class where its object instance is a module) for including multiple modules in the application. However, it is not necessary for the application to implement any more communication code for the modules (i.e. to allow collaboration between the modules), since each module already comprises of part of the communication code to publish or lookup services with SRO. Hence, removing a module doesn't require removing any communication code.

A module is referred to as an ideal pluggable module if the module requires manually implementing no communication code in the application. Of course, each module comprises of parts of the communication code. The communication code employs a mechanism to use SRO/DoS for allowing communication between the modules in the application. In this mechanism, according to an embodiment, each module implements a service-interface for providing its service or requesting a service of another module, where the service-interface can be a service-function or service-object.

For example, to access or request a given service of a module-X by another module-Y, module-Y requires calling the service-function of module-X by passing proper data and parameters to the service-function. If a service-object is used for the service-interface in module-X, module-Y requires using the service-object properly for requesting the service. Module-Y requires implementing code to get the reference for the service function of module-X from SRO/DoS and implement the code to call the service function by properly passing data through the parameters.

Properly plugging in each module in an application (or container component) mainly comprises of two parts (1) Instantiating and initializing an object instance of the module-class for including and using the respective module in the application (or container component), where the initialized object instance is the module, and (2) properly coupling the module with other parts of the application (in order to collaborate with other modules and parts in the application) for the module to perform its operations, where the operations include, for example, (i) the module offering any services that are required by the other parts and/or (ii) the module requiring any services offered by the other parts in order to properly perform its operations in the application.

According an embodiment, two components in an application collaborate with each other through a communication mechanism implemented for coupling interfaces of the two components. For example, when one component provides a service and the other component requires the service (or consumes the service). The component that provides a service implements an interface for providing the service, which is referred to as a "provider interface". The component that consumes the service uses the interface to consume the required service, which is referred to as a "consumer interface". It is also required for the application to comprise of a mechanism to allow collaboration between the components. For example, by implementing parts of communication code for coupling the 'provider interface' and 'consumer interface' to allow collaboration between the components.

There can be other kinds of interfaces. For example, two components in an application collaborate with each other through a communication interface where a first component sends some data or a notification of an event and a second component processes the data or event (and may return results or responses to the first component through the interface). The first component that provides data or events implements an interface for providing the data or event. The second component that processes the data or event implements an interface.

To make it fit the general model, one interface may be referred to as a 'listener interface' (or 'provider interface') and the other interface may be referred to as a 'caller interface' (or 'consumer interface'). In this context, 'provider interface' might not provide a service and 'consumer interface' might not consume a service. The two interfaces in the first and second component respectively can be designed to properly complement each other to allow proper collaboration between the two coupled components, by exchanging events or data (e.g. results or response), for example. To speak in broader terms, a first module-X provides a function-X for other modules to communicate with module-X. Another module-Y can communicate or collaborate with module-X by properly passing parameters for function-X and calling function-X. In this disclosure, function-X is generally referred to as service function of module-X. In general, function-X may be facilitating collaboration between module-X and module-Y.

Therefore, if two components (or modules) in an application are required to collaborate with each other, each component must implement an interface where the two interfaces in the two components can be designed to properly complement each other (for coupling by implementing communication code) to allow proper collaboration between the components, according to an embodiment. It is also required for the application to comprise of a mechanism to allow collaboration between the components, by implementing communication code to couple the two interfaces of the two components to allow collaboration between the components, for example. According to an embodiment, a method for allowing collaboration between two modules in an application requires (1) a first module-X implementing a provider-interface (e.g. a part for communication code) by implementing a service function, and the code to register the service function with SRO/DoS and (2) a second module-Y to implement code to obtain a reference of the service function and consumer-interface (e.g. other part for communication code) to call the service function (e.g. using its reference stored in a local variable) by passing data properly in the parameters of the service function.

FIG. 6a and FIG. 6b illustrate steps 600 and 620 for including 2 modules in an application in OOP (Object Oriented Programming) without using SRO/DoS mechanism, according to an embodiment. The first step for including each module in an application comprises of including an instance of an object by using a class designed and implemented for providing functionality or features of the module. The second step comprises of creating communication code for the module for allowing collaboration between the module and other parts of the application. Step 601/621 of FIG. 6a/6b includes a module Mod1 and assembles the module as sub-component to a container component. Another step 602/622 of FIG. 6a/6b includes a module Mod2 and assembles the module as sub-component to a container component. Final step 603/623 of FIG. 6a/6b implements communication code for the modules to allow collaboration between the modules and other parts/modules in the application. For example, necessary communication code 603 is implemented if Mod1 and Mod2 are required to collaborate with each other.

FIG. 7 illustrates a simple mechanism for allowing collaboration between two modules (e.g. a first module Module-1 710 and a second module Module-2 720) by using SRO/DoS mechanism, according to an embodiment. The code implemented for first module (i.e. Module-1) 710 comprises implementation for a service-function 711 for each of the services provided by the module. Any other module that requires this service is required to call this service-function 711 by passing parameters properly, where the parameters comprise of information for exchanging data between the modules. This first module Module-1 710 also comprises of code 712 for registering the service function (e.g. Module1→Module1ServiceFunction) with the SRO/DoS by using a unique pre-defined lookup key (e.g. "Service-X of Module1"). The code implemented for second module (i.e. Module-2) 720 defines a variable 721 RefForModule1Service to store the reference of a service function to request a service required by the Module-2 720. The code implemented for second module (i.e. Module-2)

720 also comprises of code-block 722 for finding the reference for the service-function (at line 2 of code block 722) by using SRO/DoS and stores the reference in the variable (declared in 721). The code-block 723 for module-2 calls the service-function (by using the variable 721 that has reference for the service-function 711) for requesting the service.

A communication interface between a first service-provider module (e.g. module-1 710 in FIG. 7) and a second service-consumer module (e.g. module-2 720 in FIG. 7) has two parts. For example, if a service-provider module-1 implements a service function 711 Module1ServiceFunction, and if the function 711 requires 3 parameters of types String, Integer, and Integer respectively, where this part of interface is referred to as "service-provider interface" (i.e. a part of the interface implemented in the service-provider). Any module 720 (e.g. module-2) that requires this service must call this function Module1ServiceFunction by passing the 3 parameters. According to an embodiment, this service function is called in 720 module-2 (that requires the service) by using a reference stored in a variable 721 RefForModule1Service and using the reference 723 for requesting the service by passing three parameters of types String, Integer, and Integer respectively, where this part of interface is referred to as "service-consumer interface". Here, the "service-provider interface" and "service-consumer interfaces" are complimentary part of the interfaces for coupling the two modules so they can collaborate with each other. A communication coupling (or coupling/link in short) between any two modules requires two complementary interface parts "service-provider interface" (a first part) and "service-consumer interfaces" (and a second part), according to an embodiment.

The main difference between prior-art and the invention disclosed in this patent is illustrated by FIG. 6a and FIG. 7, according to an embodiment: In prior-art, communication code 603 to allow collaboration between any two modules is manually implemented outside of the modules. According to one embodiment of this invention, parts of the communication code (e.g. 712, 721 and 722) are implemented within the code for each of the modules by using a mechanism such as SRO/DoS 414 or 800 in FIG. 8. Hence, there is no need for implementing any communication code for each of the modules in the code of the application (outside of the modules) if the module is a pluggable module (e.g. 601 or 602).

Figure 8:
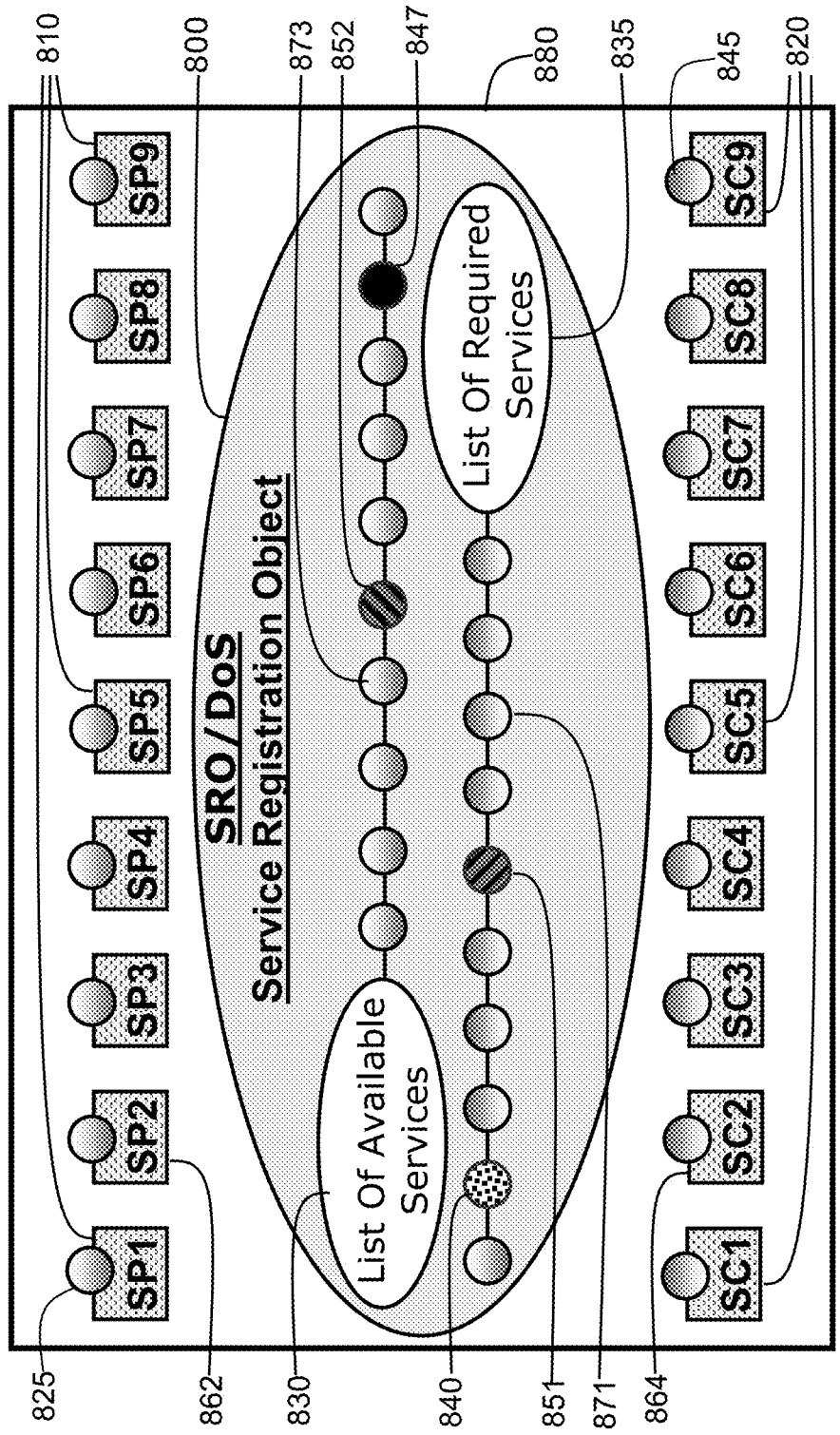
FIG. 8 shows a first set of modules that provide services and a second set of modules that require services, SRO/DoS comprising two lists, where (i) a list comprising necessary information for all the required services for all the modules and/or parts, and (ii) another list comprising necessary information for all the services provided by all the modules and/or parts, wherein the SRO/DoS uses the information in the lists for creating, managing dependencies, and validating communication interfaces of modules in an application, according to one embodiment.

Section-G: A Mechanism for Managing and Validating Dependencies Between the Modules An application can be created by plugging in many modules as shown in FIG. 8, according to an embodiment. Plural Modules 810 (SP1, SP2, SP3, SP4, SP5, SP6, SP7, SP8, and SP9) offer one or more services for other modules, components, or parts. Likewise, plural modules 820 (SC1, SC2, SC3, SC4, SC5, SC6, SC7, SC8, and SC9) depend on one or more services offered by other modules (e.g. 810). Each of the modules in the application uses mechanism comprising SRO/DoS 800 for collaborating with the other. For example, if one of the modules is removed (or replaced), it is desirable to detect what kind of impact it would have. It is thus desirable to have a tool for automatically detecting broken dependencies (or incompatible interfaces, when a module is replaced) between any two modules. During the initialization of the application, each of the modules registers each of its services with the Service Registration Object ("SRO") 800. Likewise, each of the modules registers each of the required services that the modules require (or depends on) with the SRO. That is, if a module SC3 requires a service provided by another module (e.g. SP5 or SP7), then SC3 registers the required service by using a unique lookup key associated with said service.

In an embodiment in OOP, each pluggable module in an application registers itself with SRO (e.g. 800) when the module is being constructed or instantiated. The SRO builds a list of all the registered pluggable modules. The SRO 800 goes through the list of registered pluggable-modules and calls its abstract function 'register-all-services-provided' 912 in code listing 910 and builds a list 830 of all the available services. Every module in the list of registered pluggable modules that provides one or more services registers each of its services with the SRO. Then the SRO 800 goes through the list of registered pluggable modules again and calls its abstract function 'lookup_all_services_required' 921 in code listing 920 and builds a list 840 of all required services. Every module in the list of registered pluggable modules that requires one or more services registers each of the required services with the SRO. Each pluggable module saves the reference for each external service function in a local variable as shown at line 3 and 4 in code listing 920 of function 921, and calls the service function (by using the variable, which has the reference for the service function, whenever it needs to request the service).

The SRO 800 builds a list 830 for set of all available services and a list 840 for set of all required services, according to an embodiment. After the initialization of the application, the SRO 800 compares the two lists, matches each of the required services in the list 840 with the available services in the list 830, and creates a diagnostic report showing all mismatches. The SRO 800 also detects errors and/or possible errors or warnings such as (i) a service 835 required by a module 864 is not available, (ii) an available service 847 provided by a module 862 is not used, and (iii) an interface for available service 852 and the interface used for requesting the service 851 are not compatible (e.g. a mismatch in number of parameters or mismatch in the type of one or more parameters). Missing services and incompatible services are considered dependency or interface problems. Those problems may arise after one of the service-provider interfaces in a service-providing module 862/SP2 is updated while service-consumer interfaces in one of the dependent modules is not updated accordingly. The unused services are removed during the cleanup (e.g. refactoring) of the application code, according to one embodiment. In general, unused services is not an error, because a module (e.g. from a component vendor) may provide multiple services but only a subset of the services provided are needed in an application. In such cases, only warning or information messages are created.

The SRO 800 is used to facilitate communication between two components (or pluggable modules). For example a service-providing module 862/SP2 provides a service and a service-consuming component 864/SC2 requires the service. Service-providing component (862/SP2) registers a service function using a predefined service lookup key (e.g. such as name "Shopping Cart Type3") with the SRO 800. Service-consuming component 864/SC2 calls the SRO's lookup method for finding the service function by using the predefined service lookup name (i.e. "Shopping Cart Type3"). The name of the service and service provider interface of the service function must be defined in advance of designing the two components (862/SP2 and 864/SC2) so that the service-consumer components are implemented to communicate with each other properly (by passing the right number of parameters and the right type of parameters).

Similarly, the service providing module 825/SP1 provides a service and the service consuming component SC1 requires the service. The service-providing module 825/SP1 registers a service function using a predefined service lookup key (e.g. such as name "shopping cart type3") with the SRO 800. Service-consuming component SC1 calls the SRO's lookup method for finding the service function by using the predefined service lookup name (i.e. "Shopping Cart Type3").

According to an embodiment, the interface of a service function comprises of service version, type of the object returned by the service function, number of parameters, and content type of each parameter of the service function. The service-providing component 862/SP2 is designed to include additional information about the interface 852 and a unique ID for the component (e.g. its Class name) when registering service function with SRO 800. The service-consuming component 864/SC2 is designed to include additional information about the interface 851 and a unique ID for the component when it calls SRO's method for lookup or at the time of initialization. The SRO 800 is designed to store all this information for each of the required or available services in a node and use the additional information in nodes 851 and 852 to detect incompatible communication interface (e.g. if one of the two modules is redesigned and the other component is not updated accordingly). According to an embodiment, the additional information describing each service-provider interface and each service-consumer interface includes the number of parameters and the type of each of the parameters etc.

Each module may offer one or more services and also consume one or more services of other components. The sets of services in the two lists of SRO 800, a set of available services in list 830, and a set of required services in list 840, can be used for building tools or utilities such as (a) an utility for finding all the other components that depend on a given service of a component; or (b) a utility for graphically displaying (e.g. for documentation) each component as a node in a network map and connection lines between the components as dependencies (the image is referred to as a component dependency map). Each of the components or nodes on the map may be a hot-link (i.e. like an Hyper-text link) for opening a new window that displays services that the component provides or consumes and a list of components that consume or provide each of the services. The SRO 800 may create a file containing the lists 830 and 840 upon exiting the application or on a given event such as clicking on a designated button. A tool is built to read the lists from the file to display the component dependency map (e.g. creating visual representation or documentation), according to an embodiment. According to another embodiment, a tool is built to read the lists from the file to generate communication code for the modules, where the communication code can allow communication between the modules. This is an effective tool for creating documentation for interfaces and/or dependencies between the modules and for each of the modules.

An application may implement two service registration objects, DoS1 and SRO2. Here, DoS1 (FIG. 4, FIG. 5) is for facilitating communication between each of the service-consuming components and each of the service-providing components in the application like the method discussed above. The second SRO2 is for managing dependencies between service-consuming components and service-providing components by building the lists. To allow for managing dependencies, each of the pluggable modules in the application also separately registers (i) each of the services it offers along with information about the communication interface and (ii) each of the services it needs along with information about the communication interface with the SRO2 (FIG. 8).

The SRO2 uses the information about the communication interfaces for managing dependencies by (i) detecting incompatible communication interface between any two components or (ii) finding all the communication interfaces of a component. This second SRO/SRO2 is different in that it has storage space for accepting information about communication interfaces for each service entry and a method for adding service with interface information. In addition, this second SRO also has the code necessary for finding all communication interfaces for a component, the code for comparing whether a required service is missing from the available services list, and the code for comparing whether the communication interface of a requested service is same as the communication interface of an available service.

If it is required to increase performance by eliminating overhead costs of service registrations and service lookups needed for using SRO 800, it is possible to design the lists 830 and 840 for getting information for the service interfaces from service-providing modules and service-consuming modules in an application. Then it is possible to design the SRO 800 to create dependency maps or communication code, according to one embodiment. The dependency maps are used for generating necessary communication code for some of the modules, where the communication code is included in the source code of the application to allow collaboration between the components, according to an embodiment. In one exemplary embodiment the communication code comprises of instructions for getting reference for service function from service-providing modules and inputting the reference of the service function into service-consuming modules (Ref to 603 of FIG. 6*a*).

FIG. 8 illustrates a sample generic tool (i.e. SRO 800) for creating and managing the coupling for each of the modules and between the modules in an application. It is also possible to use domain specific methods and tools for creating and/or managing couplings between the modules in an application belonging to a given domain. Such domain-specific tools can be more efficient, for example, by leveraging the knowledge of each domain. For example, if it is possible to enumerate multiple essential services of a given domain at the time of design, a fixed or pre-defined location can be assigned to each of the services in a global array of services for storing respective service objects (and other information) for each of the services. For example, a domain-specific tool for compilers can directly index each of the services to process each kind of expression (e.g. while-loop-block, for-loop-block or if-block).

| 10. | #define | WHILE_EXPRESSION | 7 |
| 20. | #define | FOR_EXPRESSION | 8 |
| 30. | #define | IF_EXPRESSION | 9 |

According to an embodiment, for example, it is possible to pre-define a fixed location to save a service object (or service function) for each of the essential services of the applications in the domain as above. Then, service objects for each of the services can be stored at pre-defined locations in a global array (or a shared object) to store services. In this case, the global array or list for storing available services acts as SRO/DoS (where each available service is stored at a location using a predefined index as a lookup-key) and the index acts as lookup-key to find a required service by another module that requires the service. For example:

10. Global_Service_Array[WHILE_EXPRESSION].
Service_Version=X.21;
20. Global_Service_Array[WHILE_EXPRESSION].
Service_Object=Service_Object_To_Compile_
WhileLoop;

This service can be accessed from anywhere in the application by using the pre-defined location (i.e. index) and the global array (or object passed through shared object instance of AC_info). The application can use SRO 800 or other kinds of global/shared objects for registering other miscellaneous services to facilitate communications between modules and parts in the application. Any application can use multiple global/shared tools (e.g. objects or arrays) and/or methods to facilitate and/or manage couplings between various modules and parts in the application. In another embodiment, the reference functions are stored in a Global_Service_Array dynamically by either the compiler or the code generated by SRO/DoS. Each data node in the sets or lists 830 and 840 comprises of necessary information for generating communication code. According to an embodiment, the SRO/DoS 800 traverses the list 840 and generates communication code between each module that requires a service and the module that provides the service. For example, if module SP2/862 registers 873 a service required 871 by SC2/864 and module SP2/862 can provide and registers the service 873, which is required by SC2/864. The SRO/DoS uses the information in nodes 871 and 873 for generating necessary communication code to allow collaboration between the modules SC2/864 and SP2/862.

According to another embodiment, a mechanism comprising pre-processor (e.g. refer to as Arjun that is described below), is used to create communication code that constructs the array of services by storing or registering each of the services at a index-location determined using an algorithm and pre-defined rules (e.g. for finding each required service at an index-location that can be determined using the algorithm and pre-defined rules). That is, each service is stored at an index-location determined by employing combination of set of pre-defined rules and set of algorithms. The service can be accessed by another module that requires the service using an index that is calculated by using same combination of set of pre-defined rules and set of algorithms. Certain information or knowledge about each service is used as seed/key for applying the set of pre-defined rules and set of algorithms for calculating the index (i) to store the service and (ii) to find the service. The communication code is created on or before compile time of the application. The Array of services acts as the SRO (an Object for Registering Services) and the indexes are used as lookup-keys at run-time for accessing services.

FIG. 9 shows pseudo-code for an example embodiment of a pluggable module which comprises of implementation of two functions: (1) code section 910 comprises implementation of a function 912 'register_all_services_provided' and (2) code section 920 comprises implementation of another function 921 'lookup_all_services_required'. These two functions are implemented in the construction code of class definition for each pluggable module, according to an embodiment in OOP. Here, function 912 'register_all_services_provided' registers each of the services provided by the module with SRO/DoS 800. And function 921 'lookup_all_services_required' looks up all the services required by the module. If this module offers three services, then this function 912 registers each of the services by making a call to register each service. For example, line-5 in 910 registers a service provided by this module with the SRO/DoS. If this module requires two services offered by other modules, then this function 921 looks up each of the services (e.g. making a call to get the reference to the function that can be called to get the service). For example, line-3 in 920 looks up for a service required by this module from the SRO/DoS and stores the reference of the service function in a local variable "Reference1".

Figure 12:
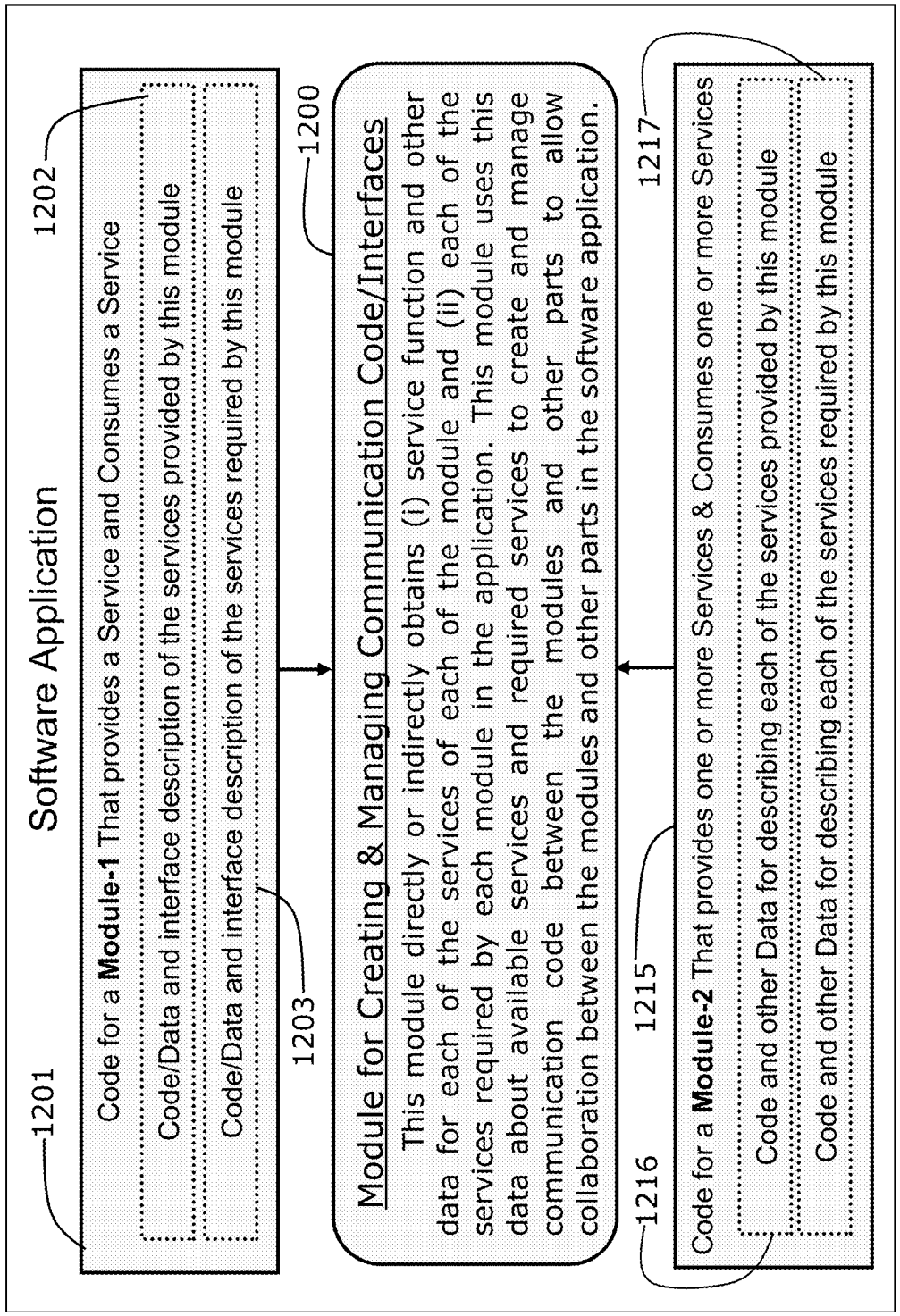
FIG. 12 shows modules, where each module comprises of necessary information about services required and services provided, where the information is used for creating necessary communication code and managing the communication code (e.g. by detecting broken communication code), according to one embodiment.

FIG. 12 shows two modules (i.e. 1201/Module-1 and 1215/Module-2), where Module-1/1201 provides a service and consumes a service. So, (i) it comprises of code and/or information 1202 for the service provided by Module-1/1201, and (ii) it comprises code/or and information 1203 for the service required by Module-1/1201. Furthermore, 1215/Module-2 provides one or more services and consumes one or more services. So (a) it comprises of code and information 1216 for each of the services provided by Module-2/1215, and (b) it comprises of code and information 1217 for one or more services required by Module-2/1215. According to an embodiment, a mechanism 1200 is designed for (1) getting the data or information for each of the required services for building a list of required services (e.g. 840) and (2) getting the data or information for each of the available services for building a list of available services (e.g. 830). The mechanism 1200 is also designed to generate communication code to allow communication or collaboration between a module that requires a service and another module that provides the service by using the lists (e.g. 840 and 830), according to an embodiment.

Figure 10:
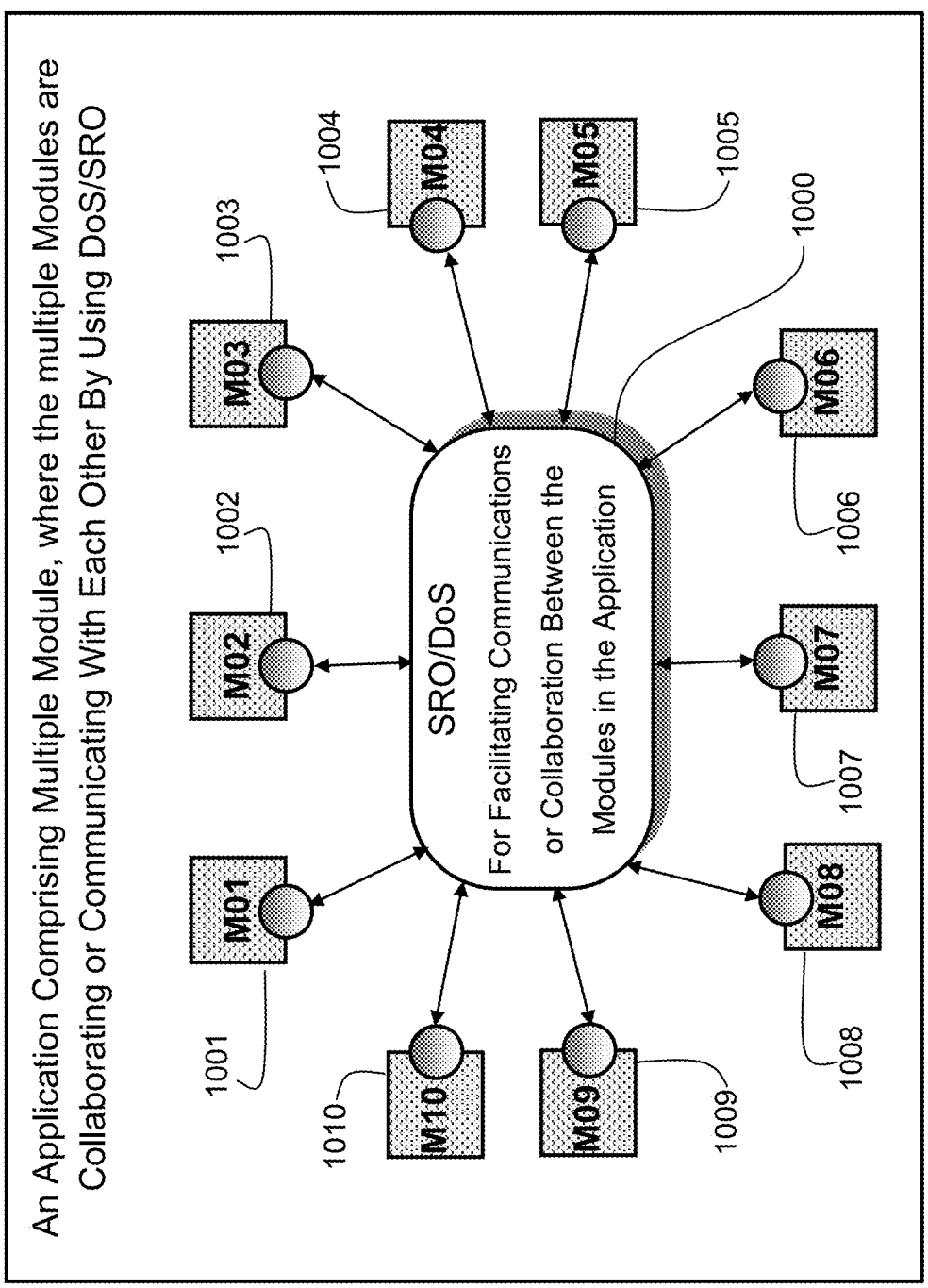
FIG. 10 illustrates a sample application comprising multiple modules, where the multiple modules are collaborating or communicating with each other by using DoS/SRO, according to one embodiment.

FIG. 10 shows 10 pluggable modules (e.g. 1001, 1002, 1003, 1004, 1005, 1006, 1007, 1008, 1009 and 1010) in an application collaborating with each other by using SRO/DoS 1000, according to an embodiment. For example, a module (e.g. M09/1009) in an application may provide one or more services for other modules (e.g. M07/1007, M05/1005 and M03/1003) in the application and consume one or more service provided by other modules (e.g. M04/1004 and M01/1001). According to an embodiment, the module (e.g. M09/1009) registers each of the services (provided by the module M09/1009) with SRO/DoS 1000 along with necessary information for generating communication code. If module M07/1007 uses the service, then M07/1007 registers the required service with SRO/DoS 1000 along with necessary information for generating communication code. The SRO/DoS 1000 uses this information provided by the modules M09/1009 and M07/1007 to generate few lines of communication code or instructions to allow collaboration between the modules M07/1007 and M09/1009, according to an embodiment. That is, SRO/DoS 1000 is designed to generate few lines of communication code for creating each coupling link between a module that provides a service and another module that requires said service. For example, a module (e.g. M02/1002) in an application may provide one or more services for other modules (e.g. M06/1006, M08/1008, and M10/1010) in the application and consume one or more service provided by other modules (e.g. M04/1004 and M01/1001). According to an embodiment, the module (e.g. M02/1002) registers each of the services (provided by the module M02/1002) with SRO/DoS 1000 along with necessary information for generating communication code.

Figure 11:
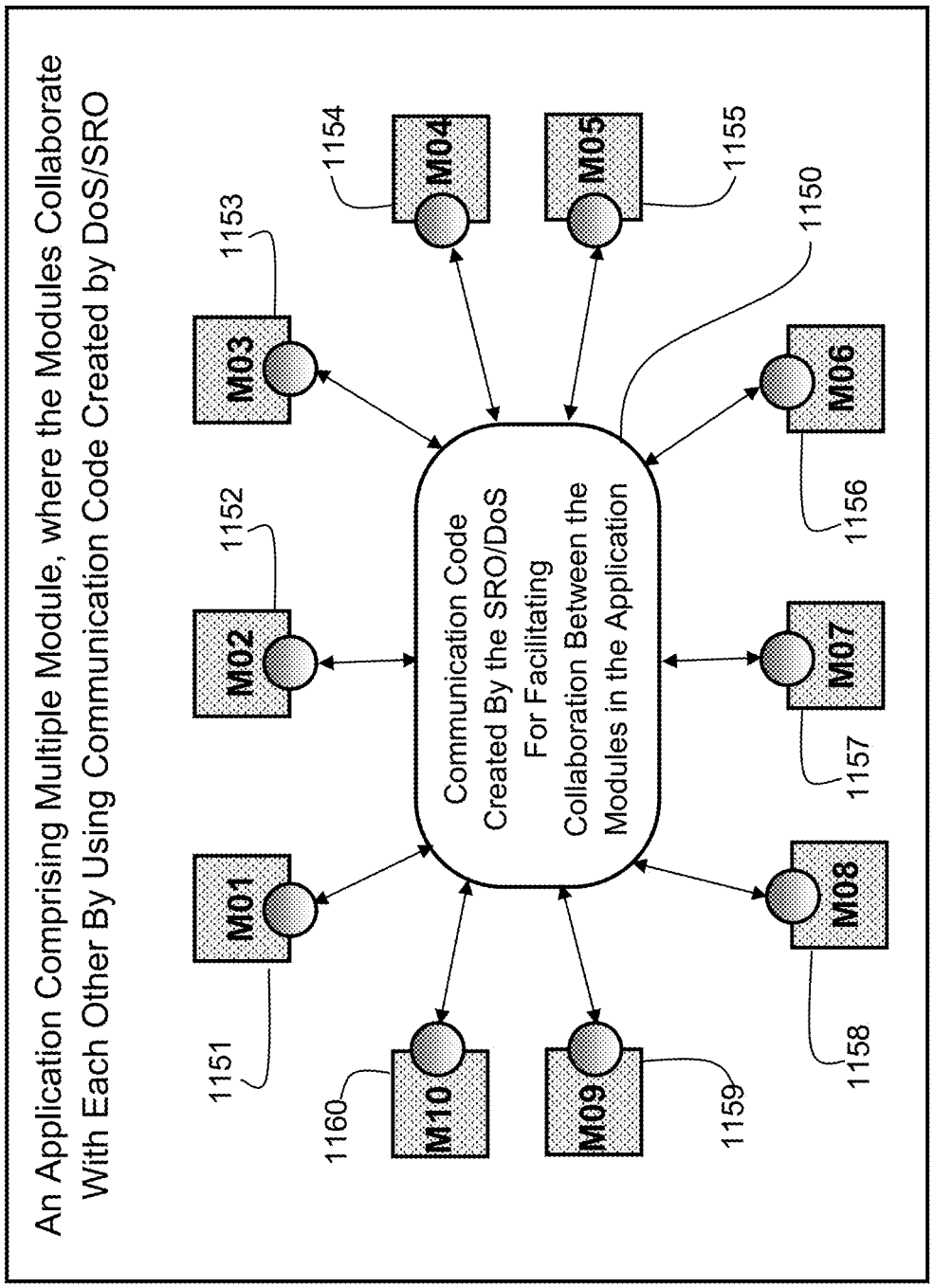
FIG. 11 illustrates a sample application comprising multiple modules, where the multiple modules are collaborating or communicating with each other by using communication code created by the DoS/SRO (not shown here but shown in FIG. 9), according to one embodiment.

FIG. 11 shows 10 modules (e.g. 1151, 1152, 1153, 1154, 1155, 1156, 1157, 1158, 1159, and 1160) in an application collaborating with each other by using communication code generated by SRO/DoS 1150, according to an embodiment. For example, a module (e.g. M09/1159) in an application may provide one or more services for other modules (e.g. M07/1157, M05/1155 and M03/1153) in the application and consume one or more service provided by other modules (e.g. M04/1154 and M01/1151). According to an embodiment, the module (e.g. M09/1159) registers each of the services (provided by the module M09/1159) with SRO/DoS 1100 along with necessary information for generating communication code. If module M07/1157 uses the service, then M07/1157 registers the required service with SRO/DoS 1100 along with necessary information for generating communication code. The SRO/DoS 1100 uses this information provided by the modules M09/1159 and M07/1157 to generate few lines of communication code or instructions to allow collaboration between the modules M07/1157 and M09/1159, according to an embodiment. That is, SRO/DoS 1100 is designed to generate few lines of communication code for creating each coupling link between a module that provides a service and another module that requires said service. For example, a module (e.g. M02/1152) in an application may provide one or more services for other modules (e.g. M06/1156, M08/1158, and M10/1160) in the application and consume one or more service provided by other modules (e.g. M04/1154 and M01/1151). According to an embodiment, the module (e.g. M02/1152) registers each of the services (provided by the module M02/1152) with SRO/DoS 1100 along with necessary information for generating communication code. According to an embodiment, the SRO/DoS (i.e. 800 in FIG. 8 or 1000 in FIG. 10) creates two lists as illustrated in FIG. 8, where one list 840 of data nodes is for all the required services and the other list 830 is of data nodes for available services. Each data node in the lists 830 and 840 comprises of necessary information for generating communication code. According to an embodiment, the SRO/DoS 800/1000 traverses the list of required service 840 and generates communication code between each module that requires a service and another module that provides the service. For example, if module SP2/862 registers 873 a service required 871 by SC2/864 and module SP2/862 can provide and registers the service 873, which is required by SC2/864. The SRO/DoS 1000 uses the information in nodes 871 and 873 for generating necessary communication code to allow collaboration between the modules SC2/864 and SP2/862. According to an embodiment, this communication code 1150 generated by SRO/DoS 800 is used for replacing SRO/DoS 1000 for allowing collaboration between the modules in the application.

One of the preferred embodiments include: If a module SP2/862 provides one or more services, then the module registers each of its services with the SRO 800 by using a unique lookup key and a reference of a function (or method), where the function (or method) may be called (e.g. by other modules) for getting/requesting the service. If another module SC2/864 requires the service, the other module uses the unique lookup key to find the function from the SRO 800 and calls the function (or method) for getting the service. For example, if module-M07/1007 provides a service, it registers a function (or method, which can be called to request the service) and a unique lookup key with the SRO 1000 (or 800) to find the service function (or method). If module-M03/1003 needs to request the service provided by the modules-M07/1007, then module-M03/1003 calls the SRO 1000 (or 800 in FIG. 8) using the lookup key to find and call the function for getting the service provided by the modules-M07/1007 (see FIG. 10).

Figure 13:
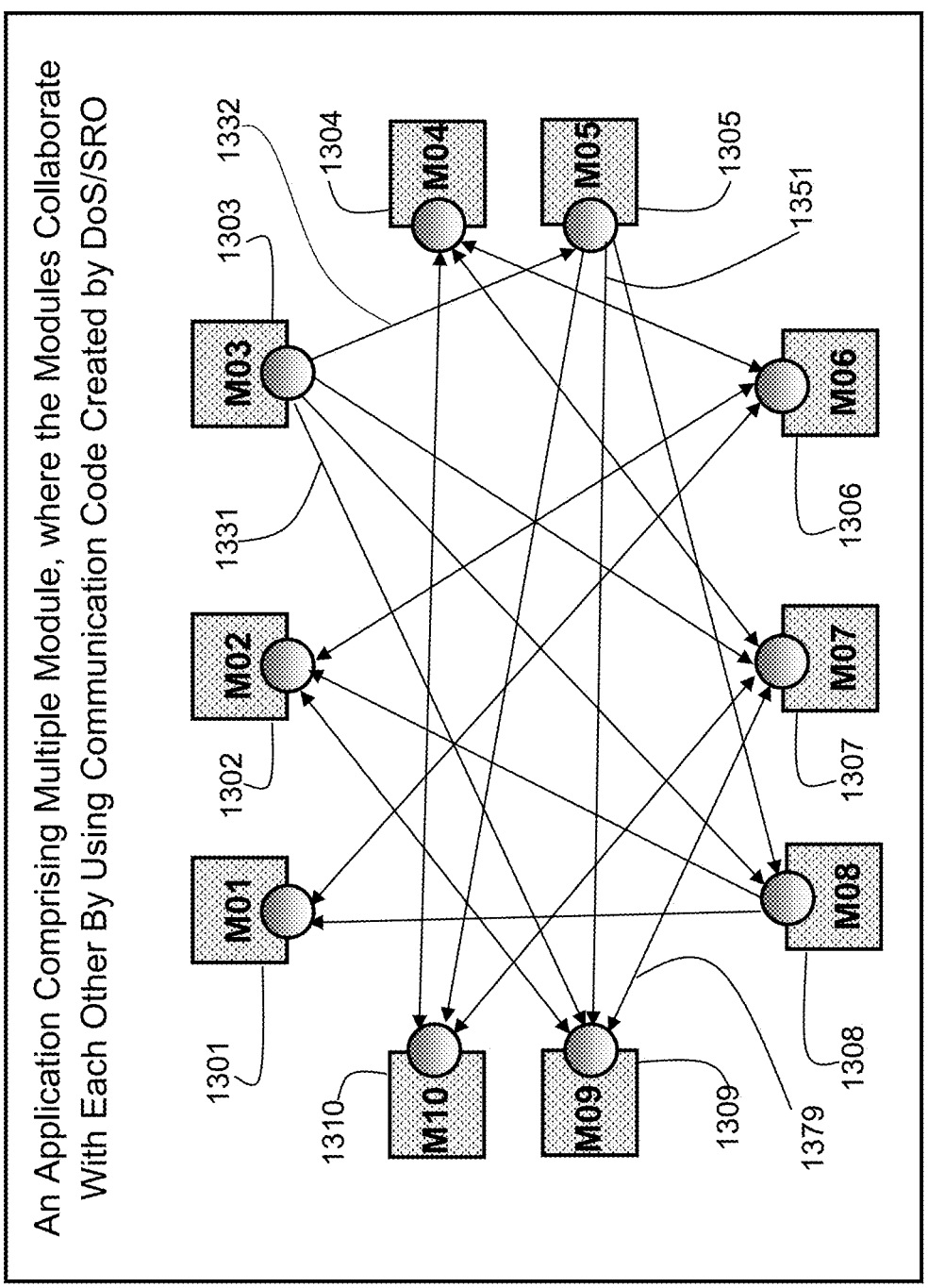
FIG. 13 shows multiple modules in an application and communication dependencies (or links) between the modules are shown using arrows between the modules, where the communication code/links (or dependencies) can be created either manually or by using the DoS/SRO (not shown here but shown in FIG. 9), according to an embodiment.

FIG. 13 shows communication links (or dependencies) between modules (M01/1301, M02/1302, M03/1303, M04/1304, M05/1305, M06/1306, M07/1307, M08/1308, M09/1309, and M10/1310) in an application, according to an exemplary embodiment. The arrows connecting modules in FIG. 13 represent the communication code 1150 for couplings generated by SRO/DoS 1000 in FIG. 10. If module-M03/1303 needs to request service of modules M05/1305 and M09/1309, then the SRO 1000 generates necessary communication code (i.e. link 1332) to allow collaboration between module-M03/1303 and module-M05/1305, and generates necessary communication code (i.e. link 1331) to allow collaboration between module-M03/1303 and module-M09/1309. If module-M05/1305 needs to request services of modules-M09/1309, then the SRO generates necessary communication code for coupling 1351 to allow collaboration between module-M05/1305 and module-M09/1309. If module-M08/1308 needs to request service of modules M01/1301 and M02/1302, then the SRO 1000 generates necessary communication code to allow collaboration between module module-M08/1308 and module-M01/1301, and generates necessary communication code to allow collaboration between modules-M8/1308 and M02/1302.

With reference to FIG. 13, if module-M05/1305 needs to call modules M10/1310 and M08/1308, then the SRO 1000 generates the necessary communication code to allow collaboration between module-M05/1305 and module-M08/1308, and also the necessary communication code to allow collaboration between module-M05/1305 and module-M10/1310. If module-M07/1307 needs to call module-M09/1309 and also registers a callback for module-M09/1309 to call back module module-M07/1307, then the SRO 1000 generates necessary communication code 1379 to allow two-way collaboration (shown by two-sided arrow) between module-M07/1307 and module-M09/1309. If module-M07/1307 needs to call modules-M09/1309, M10/1310, M04/1304 and also registers a callback for modules M09/1309, M10/1310, M04/1304 to call back module module-M07/1307, then the SRO 1000 generates necessary communication codes to allow two-way collaborations (shown by two-sided arrows) between module-M07/1307 and module-M09/1309, module-M07/1307 and module-M10/1310, M07/1307 and module-M04/1304. If module-M06/1306 needs to call modules-M01/1301, M02/1302, M04/1304 and also registers a callback for modules—M01/1301, M02/1302, M04/1304 to call back module module-M06/1306, then the SRO 1000 generates necessary communication codes to allow two-way collaborations (shown by two-sided arrows) between module-M06/1306 and module-M01/1301, module-M06/1306 and module-M02/1302, module-M06/1306 and module-M04/1304. If module-M05/1305 needs to request services of modules-M03/1303, then the SRO 1000 generates necessary communication or coupling code to allow collaboration between module-M05/1305 and module-M03/1303. If module-M05/1305 needs to call modules M03/1303 and M08/1308, then the SRO 1000 generates necessary communication to allow collaboration between module-M05/1305 and module-M03/1303, and generates necessary communication code to allow collaboration between module-M05/1305 and module-M08/1308.

If module-M03/1303 needs to request services of modules-M07/1307 and the DoS/SRO 1000 type mechanism is not used, then it is required to manually implement necessary communication code in the code of the application to allow collaboration between module-M03/1303 and module-M07/1307. If module-M03/1303 needs to request services of modules-M05/1305 and module-M09/1309 (and the SRO type mechanism is not used), then it is required to manually implement necessary communication code to allow collaboration between module-M03/1303 and module-M05/1305 (today, according to prior art), and it is also required to manually implement necessary communication code to allow collaboration between module-M03/1303 and module-M09/1309 (today, according to prior art). However, it is possible to eliminate the requirement of manually implementing the communication code in the application to allow collaboration between any two modules either (i) by using the SRO type mechanism or (ii) communication code generated by the SRO/Arjun type mechanism.

Today, in prior art, the communication code for each module (e.g. module-M03/1303) is manually included in the code of the applications. If it is required to remove module-M03/1303, then it is required to manually remove the communication code associated with module-M03/1303. An ideal pluggable module is defined as a module that doesn't require manually implementing communication code. The mechanism comprising SRO/DoS or Arjun aids and helps in managing or maintaining the dependencies of each pluggable module by reducing the effort required for redesigning or changing the module, according to an embodiment. For example, such tools (e.g. SRO/DoS or Arjun) provide better insights into each of the dependencies between any two modules and the dependencies between the pluggable modules in an application, according to an embodiment. In the context of the claims of this invention, a module that relies on mechanism comprising SRO/Arjun for communication code is considered a pluggable module, because it is virtually plugged into SRO/Arjun for coupling with other modules or parts in the application.

Figure 14:
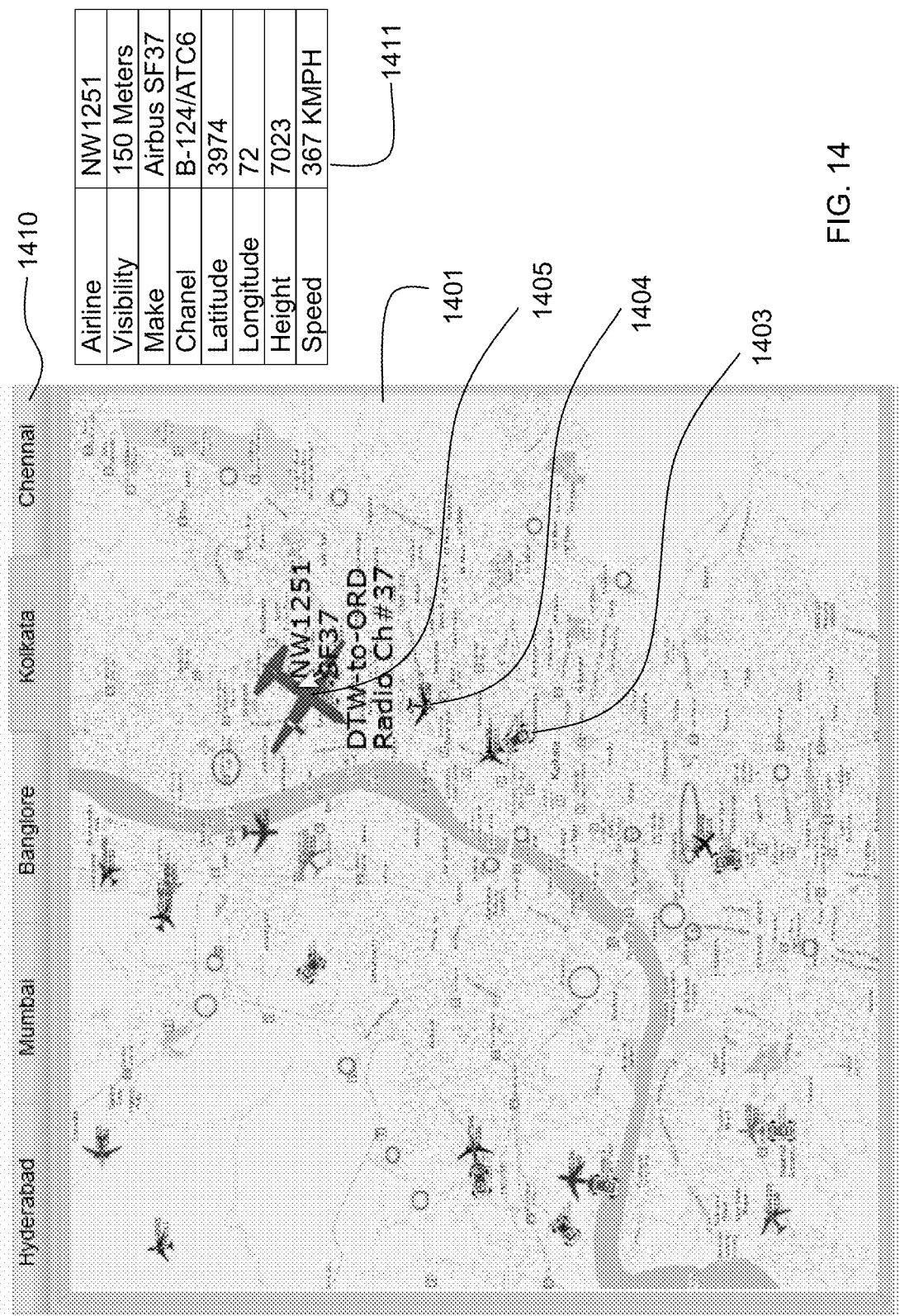
FIG. 14 shows an image of City GIS (Geographical Information Systems) application for multiple cities, where each city has sub-components (or sub-modules) such as ATC (Air Traffic Control System) and monitoring of Ambulances of ER (Emergency Response), according to one embodiment.

Section-H: Example for Building CityGIS Application by Using Pluggable Modules/Components FIG. 14 shows a Geographical Information System ('GIS') application 1410 for multiple cities in a TAB GUI-component, according to an exemplary embodiment. In the FIG. 14, tab for Kolkata is selected, so City-GIS for Kolkata 1401 (street map) is shown (while the City_GIS for other cities are being hidden). The GIS for each city (i.e. City-GIS) is built by using three pluggable components/modules (as illustrated in pseudo-code FIG. 15): (i) city map for streets 1401 comprising vector drawings such as streets and canals, (ii) emergency services that shows current locations and movement of Ambulances 1403, and (iii) Air Traffic Monitoring system that shows current locations and movement of Airplanes 1404. When mouse is moved over an Airplane, the image is enlarged as shown 1405. If mouse is clicked on an Airplane (or Ambulance), latest information for the Airplane 1405 is displayed in a table 1411.

FIG. 15 shows a sample pseudo-code 1510 for including three pluggable components (or modules) in an OOP, according to an embodiment. The lines 5 and 6 in dotted box 1511 includes a pluggable component for presenting a street map for a city 1401, whose zip-code is passed as a parameter. The lines 13 and 14 in dotted box 1513 include a pluggable GUI component for presenting emergency response system (i.e. location of Ambulances 1403) on the street map (which is included already), whose zip-code is passed as a parameter. The lines 17 and 18 in dotted box 1514 include a pluggable GUI component for presenting Air Traffic Monitoring system on the street map 1404 (which is included already), whose zip-code is passed as a parameter. This code also includes another pluggable module for CityLandmarks at line 9 and 10, but disabled by commenting out the code in lines 9 and 10 in dotted box 1512.

All three GUI components (i.e. Street Map, Ambulances, and Air Traffic) overlap each other so each component (and its subcomponents, if any) must be drawn on a canvas with a transparent background except the component CityMap 1401. If there is a need for adding new overlaying features, additional pluggable components are created and added to the application. For example, if later it is required to add landmarks (e.g. Hotels, Theaters, and Tourist Spots) to CityGIS, it is possible to create a class (e.g. CityLandmarks_Module) as a pluggable module to include at line 9 and 10 in 1512. If this module is placed at line 19, then the landmarks would be shown on top of the Airplanes (in most GUI-platforms).

Figure 27:
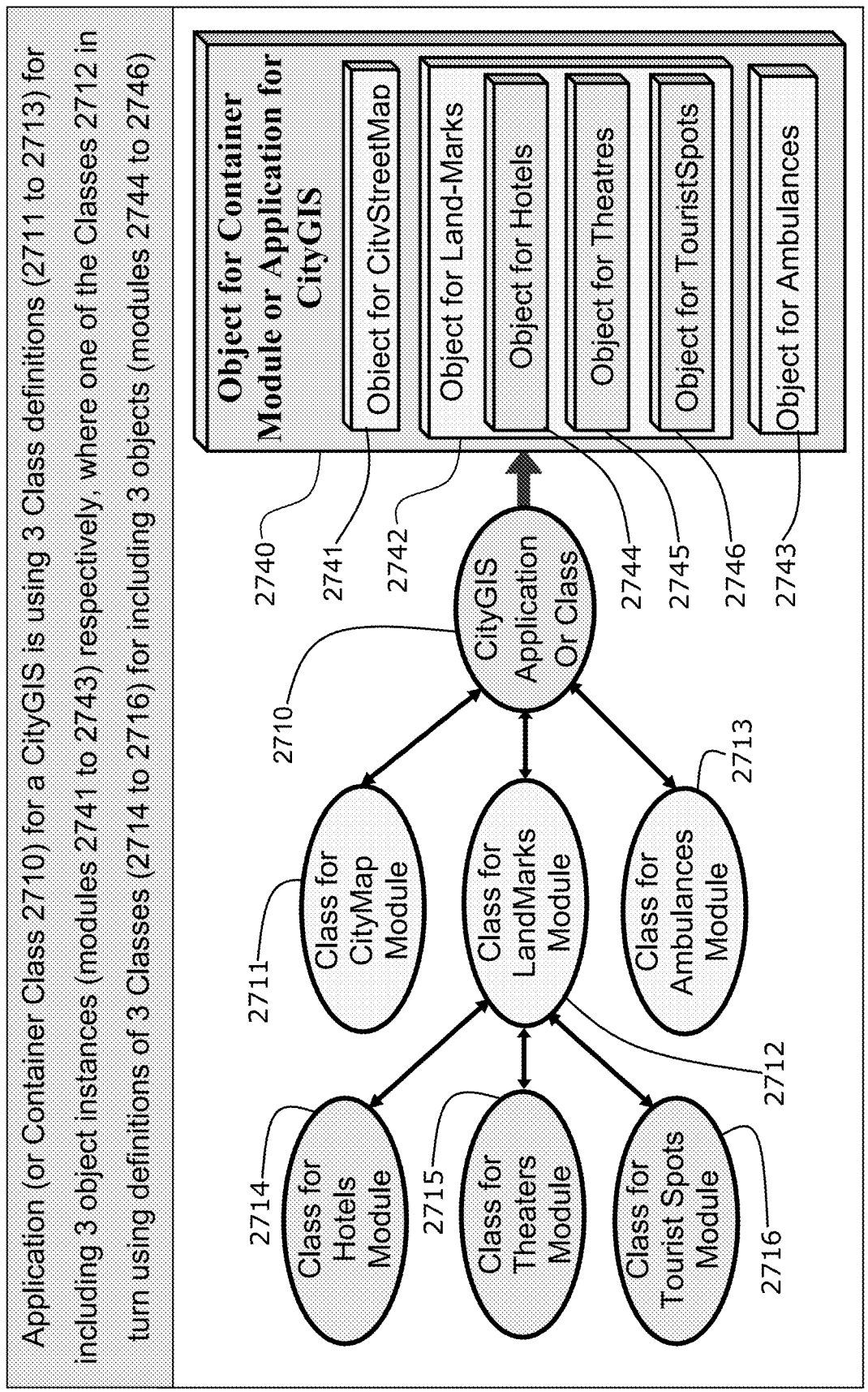
FIG. 27 shows an application (or Container Class 2710) for a CityGIS, which is using 3 Class definitions (2711 to 2713) for including 3 object instances (modules 2741 to 2743) respectively, where one of the Classes 2712 in turn uses the definitions of 3 Classes (2714 to 2716) for including 3 objects (modules 2744 to 2746), according to an embodiment.

FIG. 27 shows an application (or Container Class 2710) for a CityGIS, which is using 3 Class definitions (2711, 2712, and 2713) for including 3 object instances 2740 (modules 2741, 2742, and 2743) respectively. The module 2711 comprises class for Citymap module. The module 2712 comprises class for landmarks module. the module 2713 comprises class for ambulances module. The module 2741 comprises object for citystreet map. The module 2742 comprises object for land-marks. The module 2743 comprises object for ambulances. FIG. 15 shows code for including each of the modules (i.e. object instances) by using respective class definitions. If a component or module is too big, it is further subdivided into sub-modules, each of which can also be designed and built as a pluggable module/object (or pluggable component). For example, if the code for module 2712 is too big, the class implementation for such a large module can in turn be partitioned into 3 sub-modules by implementing definitions of 3 Classes (2714, 2715, and 2716) for including 3 objects (modules 2744, 2745, and 2746). For example, the component for city landmarks 1412 is divided into three pluggable modules for, (1) hotels and hospitals 2744 (2) theaters and auditorium 2745, and (3) tourist spots 2746. In one example embodiment, assuming pluggable modules for the subcomponents are designed, developed, and tested individually by three different developers nearly autonomously, it is assembled to build CityLandmarks_Module as follows:

1. Void PluginSubModules(ACi) {
2. // Include object instance for Hotel module by using class for Hotels
3. PluggableModule Hotels=new CityHotels (aci, ZipCode);
4. this.canvas.AddChild (Hotels, 0, 0, null);
5. // Include object for Theatres module by using class for Theatres
6. PluggableModule Theatres=new CityTheatres (aci, ZipCode);
7. this.canvas.AddChild (Theatres, 0, 0, null);
8. // Include object for Tourist Spots module by using its class
9. PluggableModule TouristSpots=new CityTouristSpots (aci, ZipCode);
10. this.canvas.AddChild (TouristSpotsO, 0, 0, null);
11. this.canvas.Display( );
12. }

The code statements in lines 3 and 4 instantiate and initialize an object instance for Hotels module by using class definition implemented for hotels. The code statements in lines 6 and 7 instantiate and initialize an object instance for Theatres module by using class definition implemented for Theatres. The code statements in lines 9 and 10 instantiate and initialize an object instance for TouristSpots module by using class definition implemented for TouristSpots.

If a module needs to communicate or exchange data with other modules, the module must be coupled by employing communication code. Each pluggable module comprises of necessary communication code for finding required services for collaborating with other modules/parts using a mechanism comprising things or tools such as SRO/DoS. The pluggable components (or modules) Theaters, Hotels, or LandMarks are easily removed or disassembled from the application. Each pluggable components (or modules) is disassembled and replaced by a newer or better component.

It may also be reassembled after it is redesigned, updated, and tested (individually outside of the application) to satisfy evolving business needs. Each of the pluggable components (or modules) such as LandMarks or TouristSpots is custom-designed to satisfy the unique needs of an intended single-application. The design objective is to achieve a high degree of autonomy (or modularization) as much as possible in order to minimize the effort required to remove, update, and test the component during future maintenance periods, according to an embodiment.

A module (e.g. component, object, or other kind of part form library/APIs) said to be plugged-in for an application implies adding the module to the application without any need for implementing communication code in the code for the application. For example, by including an object instance by implementing 1 to 3 lines of code. An example is illustrated FIG. 14 comprising three GUI components and FIG. 15 code for plugging in three pluggable components, according to an embodiment. For example, lines 12 to 14 in FIG. 15 includes a pluggable module for displaying Air Traffic Controls/Monitoring (ATC) Systems, where each Airplane requests the service of info-table 1411 using SRO/DoS to display latest information (upon clicking on the Airplane). This illustrates a sample mechanism for allowing collaboration with each other without implementing any communication code in the code for the application.

A partially pluggable module implies the module uses SRO/DoS or Arjun for a few couplings to allow collaboration with other parts in the application, while communication code is manually implemented in the code of the application to allow collaboration with a few other parts in the application. That is, a partially pluggable module uses both methods to collaborate with other parts in the application (i) communication code implemented in the application and (ii) communicates with other parts by using a mechanism such as illustrated in FIG. 10 or FIG. 11. In the context of the claims of this invention, any partially pluggable module that uses SRO/DoS or Arjun for facilitating collaboration between the partially pluggable module and other parts (including other modules) of the application is a pluggable module (even in case if communication code is implemented manually for creating few couplings for each module, for example, as a work around to defeat the claims).

For example, such an ideal pluggable module can be easily replaced by a new part. If the ideal pluggable module implements about 2500 lines of custom application code, then the 2500 lines of custom application code can be refined and tested individually (e.g. outside of the application, free from spaghetti code). If an application requires implementing 100,000 lines of custom application code and if over 75% of the 100,000 lines of code is in 25 pluggable parts of average size of 1800 to 3000 lines of custom application code, then over 75% of the custom application code (in the ideal pluggable modules) out of a total of 100,000 custom application code can be evolved by redesigning and testing each of the pluggable modules individually outside of the application, according to an embodiment. For example, each component that can be easily disassembled (and reassembled) can be redesigned and tested individually outside of the product (free from spaghetti code), hence providing a higher degree of service access.

Figure 16:
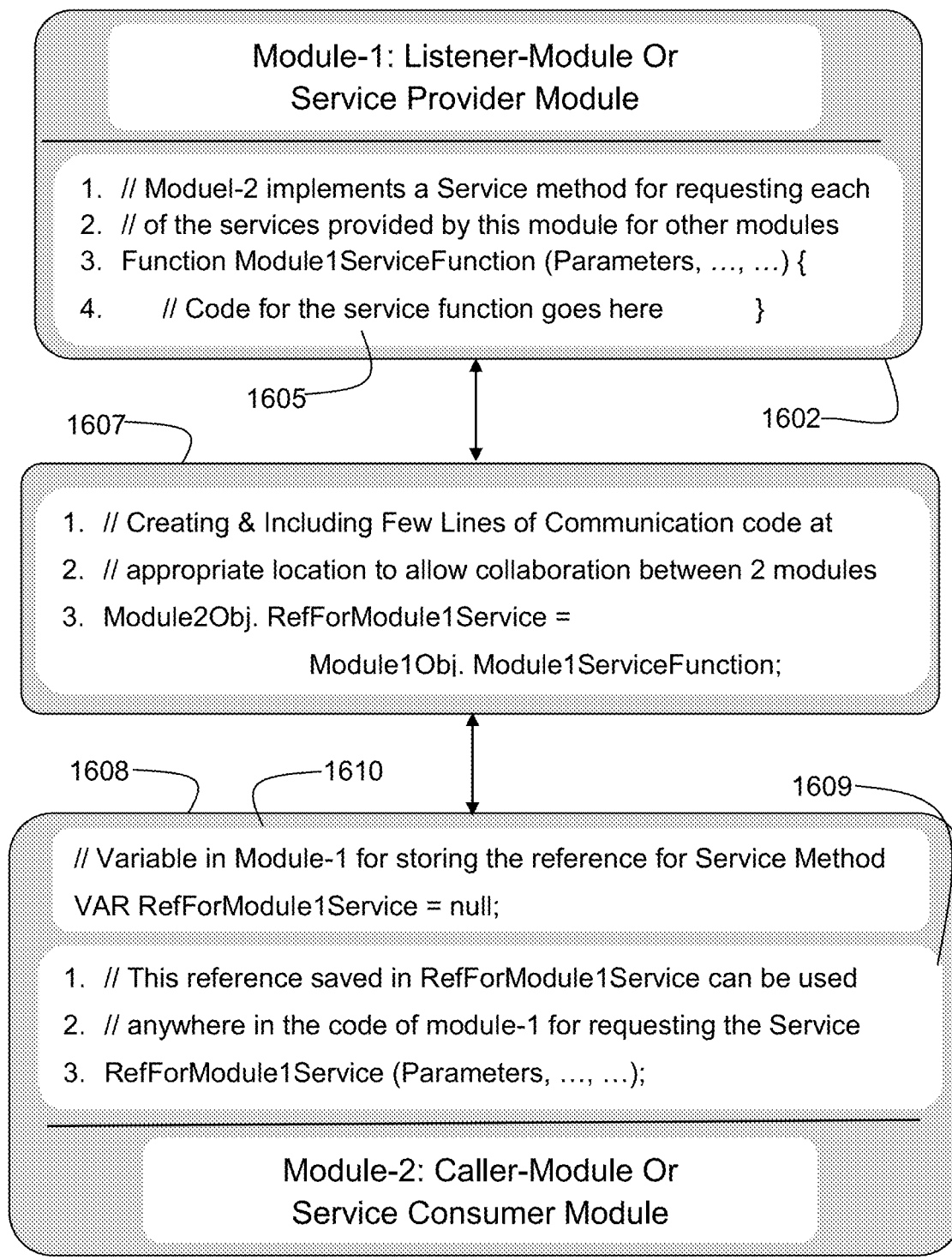
FIG. 16 shows pseudo-code for facilitating communication or collaboration between two modules in an application, according to one embodiment.

Section-I: Examples for Basic Communication Code (or Coupling Dependencies) Between Modules FIG. 16 illustrates a typical communication link between two typical modules, according to an embodiment. In general, a module (e.g. Module-2/1608) initiates communication (when required) by calling a function (or using an object) implemented in another module (e.g. Module-1/1602). The code-block 1609 calls service function implemented in code-block 1605 in module-1. To facilitate such communication between two modules, it is required to implement or include communication code 1607 to provide necessary information (e.g. reference to service function 1605) for module-1/1602 to call the right function of the first module 1602 when it requires a service of module-1/1602 (e.g. as shown at 1609 in module-2/1608) by initializing a reference variable 1610 to store reference of the service function 1605 in the communication code 1607. This kind of communication code (e.g. 1607) is manually implemented for connecting (or linking) any 2 modules that need to collaborate with each other, according to an embodiment.

Module-1/1602 of FIG. 16 comprises of implementation 1605 of service function, for example, Module1ServiceFunction. Module-2/1608 comprises of code 1609 or implements features that require calling the function 1605 Module1ServiceFunction. A variable 1610 RefForModule1Service is defined for saving the reference of function and uses the variable for calling the function 1605 Module1ServiceFunction, according to an embodiment. The communication code 1607 initializes the variable 1610 RefForModule1Service to store reference of function 1605 Module1ServiceFunction, according to an embodiment. The line 3 in 1609 calls the function 1605 Module1ServiceFunction, since variable 1610 RefForModule1Service has reference to function 1605 Module1ServiceFunction, according to an embodiment.

A communication interface between a first service-provider module (e.g. module-1 710 in FIG. 7, or 1602 in FIG. 16, or 2310 in FIG. 23) and a second service-consumer module (e.g. module-2 720 in FIG. 7, or 1608 in FIG. 16, or 2320 in FIG. 23) has two parts. For example, when a service-provider module-1 implements a service function Module1ServiceFunction (e.g. 1605 of FIG. 16), which requires 3 parameters of types String, Integer, and Integer respectively, where this part of the interface is referred to as a "service-provider interface" (i.e. a part of the interface implemented in the service provider). Any module (e.g. module-2) that requires this service must call this function Mod1ServiceFunction by passing the 3 parameters. According to an embodiment, this service function is called in module-2 (that requires the service) by using a reference stored in a variable RefForModule1Service and by passing three parameters of types String, Integer, and Integer respectively, where this part of interface is referred to as a "service-consumer interface", which is a complimentary part of the interface employed (e.g. at line-3 of code-block 1609) by the code service-consumer module for getting the service by calling the service function Mod1ServiceFunction.

The codes (or interfaces) in code blocks 1605 and 1609 are designed to complement each other to have proper communication for collaborating with each other. This kind of interfaces is further designed to effectively generate communication code block 1607. For example, by a software tool such as SRO/DoS from the data in the lists 830 and 840, according to an embodiment. The code blocks (i.e. 1605, 1607, and 1609) shown are just sample pseudo-code. Different programming languages provide different kinds of features for generating the equivalent communication code or instructions (i.e. for achieving pluggable modules) to allow communication between two modules for collaborating with each other properly. For example, it is not very hard for certain programming languages, but it requires improvisation for other languages. The compiler for a programming language (e.g. Java 8) is updated or redesigned (e.g. implement necessary features) for achieving pluggable modules more effectively, according to an embodiment. Tools, framework, and/or mechanisms are created and used for a programming language for achieving pluggable modules more effectively, according to an embodiment.

FIG. 17 shows a shopping-cart/Invoice application for a pet store comprising of shopping items 1701, 1702, and 1703 (where more items available can be seen by scrolling the scroll bar 1700) and a shopping-cart/Invoice 1710. Any shopping item (e.g. 1701/1702/1703) can be purchased by double-clicking on the item. When an item 1701/1702/1703 is selected by double-clicking, the item 1701/1702/1703 is added to the Invoice1710. According to an embodiment, the software module or component for Invoice 1710 implements a service function "add_item_to_invoice (Parameters, . . . , . . . )". When a shopping item is selected (by double-clicking), the shopping item calls the service function "add_item_to_invoice (Parameters, . . . , . . . )" by passing necessary information as per the pre-defined interface. It is necessary to implement communication code to allow such communications between any two modules in an application. Alternatively, SRO/DoS is used for allowing such collaboration between any two modules, according to an embodiment. Alternative embodiments involve generating the communication code by using the information in the lists 830 and 840 and including the communication code in the code of the applications.

FIG. 18 shows a pseudo-code of a wrapper module 1800 for transforming a legacy module (that is not a pluggable module) implemented as a "LegacyClass" into a pluggable module, according to an embodiment. For example, if a legacy module "Module-X" provides one or more services for other modules and Module-X depends on one or more services of other modules, today it is required to manually implement communication code when module-X is included in an application. The communication code allows module-X to access services required by module-X, and other modules/parts in the application to access services provided by module-X. According to an embodiment, the requirement to manually implement communication is eliminated by implementing a wrapper-module, where (1) the wrapper module registers each of the services provided by module-X with the SRO/DoS as illustrated in code block 1802, and the wrapper module looks up each of the services required by module-X with the SRO/DoS as illustrated in code block 1803. The code block 1801 comprises of necessary variables and code for constructor, according to an implementation in OOP. The line-3 in block 1802 registers a service provided by module-X with SRO/DoS object. The line-3 in block 1803 looks up a service required by module from SRO/DoS object.

Figure 19:
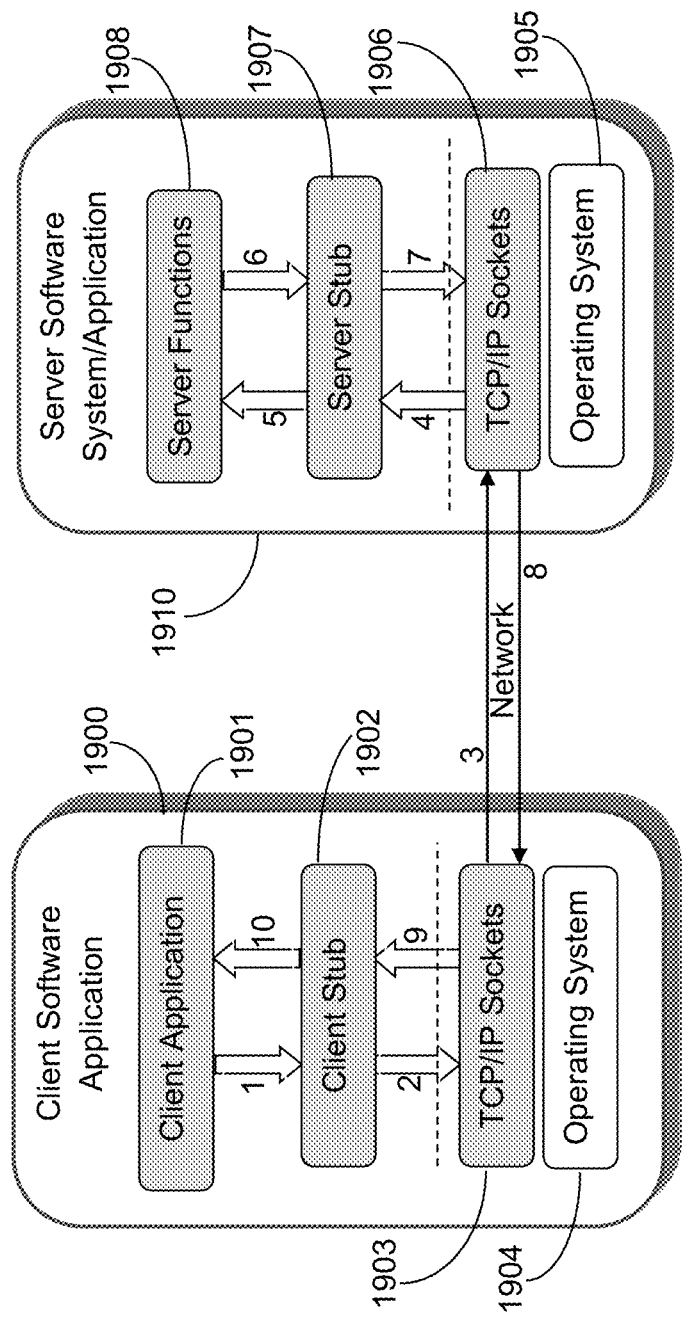
FIG. 19 shows communication stack including TCP/IP network communications between an application running on a client application and another application (e.g. providing one or more services) on a server application, according to one embodiment.

FIG. 19 shows method for an application 1900 communicating with a service module 1910 being executed on a remote computer (or server). If the server-module (or application) 1910 provides one or more services, the server-module 1910 implements server functions 1908 and server-stub 1907, where each function in server-stub provides access to a server-function 1908 implemented in server-module (or application) 1910. The server-module 1910 also provides a client-stub 1902, where each function in the client-stub 1902 communicates with corresponding function in server-stub 1907 over internet 1903 and 1904. If a client-module 1901 in client application 1900 requires a remote service, it calls the appropriate service function in client-stub 1902, and client-stub 1902 connects to corresponding function in server-stub 1907 over web/cloud or internet 1903/1906. The server-stub 1907 gets required service (e.g. data or data-exchange) from server functions 1908 and sends response over internet 1906/1903 to the client-stub 1902, which in turn passes on the result/data to client-module 1901.

The client-stub 1902 acts like an RPC (Remote Procedure Call), according to an embodiment, where RPC is well known in the art. According to an embodiment, the client-stub 1902 is implemented as a module (for example, as a class definition) comprising of service functions to provide a service, where each service function in the class for client-stub 1902 connects to the corresponding function in the server-stub 1907 for providing a service. It is required to implement communication code manually between the modules for client-stub 1902 and other modules in the application 1900 for allowing communication between modules for client-stub 1902 and other modules in the application 1910. The application 1900 comprises an operating system 1904 to allow communication between client-stub 1902 and other modules in the application 1910. The application 1910 comprises an operating system 1905 to allow communication between server-stub 1907 and other modules in the application 1900.

FIG. 20a shows an application 2001 comprising of client modules 2003 and a module for client-stub 2004, where the client-stub 2004 implementing one or more functions communicates over network (internet) 2007 with respective service-functions in server-stub 2005 for getting services from server module 2006 in server application 2002 (e.g. client-stub 2004 comprises a function for calling each of the service functions in server-stub 2005, where each function in server-stub 2005 accesses a service provided by server module 2006), according to an embodiment. If module for client-stub 2004 is not pluggable, it is required to manually implement communication code 2009 to allow collaboration between client-modules 2003 and module for client-stub 2004. That is, client-stub 2004 is a proxy module for server module 2006. The proxy module 2004 (or service functions) in client-stub 2004 can be transformed into a pluggable module by implementing a wrapper module as illustrated in FIG. 18, according to an embodiment. FIG. 20b shows an application 2010 comprising client modules 2012 and a wrapper module 2025 for client-stub 2016 (as illustrated if FIG. 18), where module for client-stub 2016 is proxy module for server module 2022 (through server stub 2023), where the client-stub 2016 implementing one or more functions communicates over internet with respective functions in server-stub 2023 (having a function corresponding to each of the functions in the client-stub 2016) for getting services from server modules 2022 in server application 2020, according to an embodiment.

Section-J: Other Methods for Generating Communication Code for Pluggable Modules The application 880 comprises of multiple modules 810 and 820. The SRO/DoS 800 is included in the code of the application 880 and the lists 840 and 830 are built at run time (i.e. when the application is being executed), when each of the modules registers or looks up for services, according to an embodiment. The information in each of the nodes in the lists is used for generating communication code to be included at proper locations in the code of the application 880, according to an embodiment. The communication code generated by the SRO/DoS 800 replaces the SRO/DoS 800 for allowing collaboration between the modules, according to an embodiment. There are other mechanisms and systems that can be employed for generating communication code or instructions for coupling modules. The following illustrates another method that comprises of systems and/or mechanisms that are implemented in the pre-pressor (e.g. of a compiler) for reading and processing the source code for the modules in the application, according to an embodiment. Communication between any two modules in an application can be facilitated at run-time using mechanism comprising DoS/SRO and lookup keys for registering and/or finding services. Alternatively, communication between any two modules in an application can be facilitated using communication code, where the communication code is created during or before compile/link time of the application by employing a mechanism comprising Arjun/SRO, and properly including the communication code in the code of the application.

Figure 21:
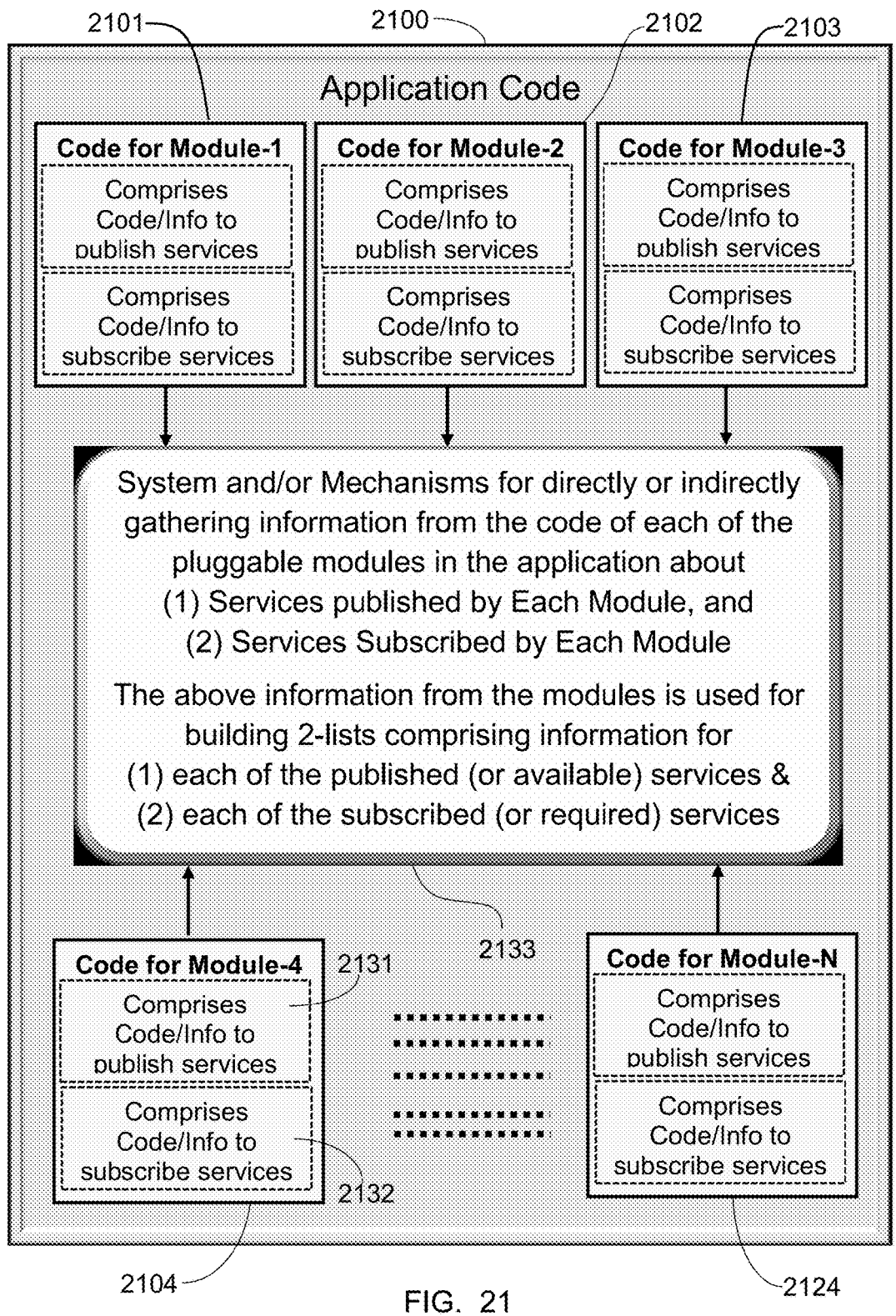
FIG. 21 shows multiple modules in an application, where each module comprises of information for each of the services published by the module and of information for each of the service subscribed by the module, and a mechanism for using the information from the modules for automating many tasks for creating communication code or for facilitating collaboration between the modules, according to one embodiment.

FIG. 21 shows an application 2100 comprising of multiple modules 2101, 2102, 2103, 2104 and 2124, where code of each of the modules comprises of (1) code and/or information for publishing each of the services provided (e.g. 2131) for other modules by the module (e.g. 2104) and (2) code and/or information for each of the services required or subscribed (e.g. 2132) by the module (e.g. 2104), where each required service is provided or published by another module, according to an embodiment. Some systems and/or mechanisms 2133 are used to directly or indirectly gather information from each of the modules 2101, 2102, 2103, 2104 and 2124 about (a) services published by the module 2101/2102/2103/2104/2124 and (b) services subscribed to by the module 2101/2102/2103/2104/2124. If a 2101 module provides one or more services for other modules 2102, and 2124, it employs a method to provide information for each of the services (e.g. publishing its service). For example, in order for an external system (e.g. 2133 referred to by given name Arjun) to access the information for each service provided. If a module 2101 requires one or more services from other modules (e.g. 2103 and 2104), it employs a method to provide information for each of the services required (e.g. subscribing the required service). For example, in order for an external system (e.g. 2133) to access the information for each service required.

Figure 22:
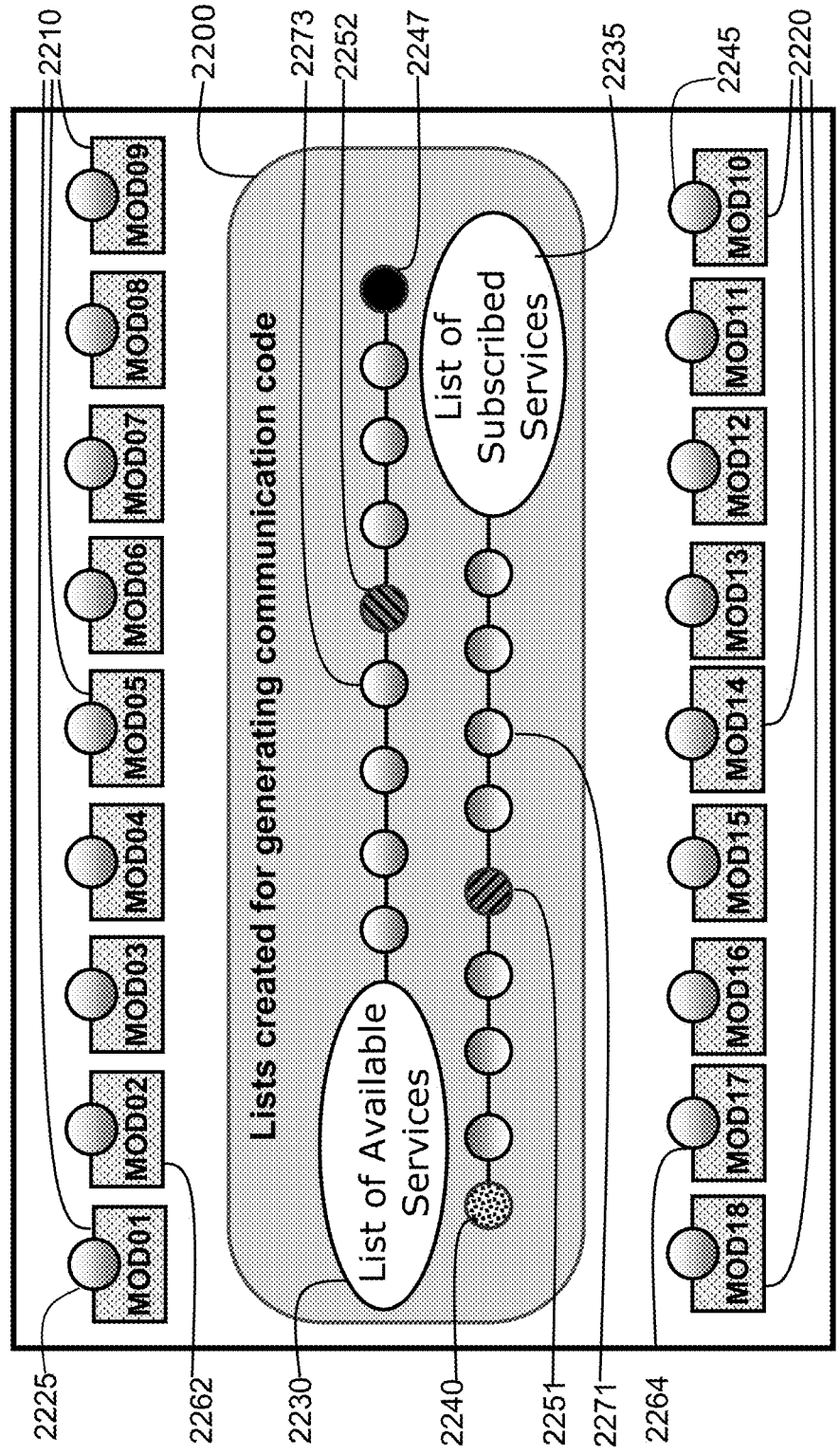
FIG. 22 shows multiple modules in an application, where each module comprises of information for each of the services published by the module and of information for each of the service subscribed by the module, and a mechanism for using the information for building two lists (1) information for available services, and (2) information for required services, according to one embodiment.

FIG. 22 shows two lists for two sets, one list 2230 for set of available services and another list 2240 for set of subscribed or required services, created by the systems and/or mechanisms 2133 (that is referred to by given name Arjun) of FIG. 21, according to an embodiment. The FIG. 22 is equivalent (e.g. by serving equivalent function) to FIG. 8, according to an embodiment. Plural Modules 2210 (MOD01, MOD02, MOD03, MOD04, MOD05, MOD06, MOD07, MOD08, and MOD09) offer one or more services for other modules, components, or parts. Likewise, plural modules 2220 (MOD10, MOD11, MOD12, MOD13, MOD14, MOD15, MOD16, MOD17, and MOD18) depend on one or more services offered by other modules (e.g. 2210). Each of the modules in the application uses lists created for generating communication code for collaborating with the other. The lists in FIG. 8 are created by the SRO/DoS included in an application at runtime of the application. But the lists in FIG. 22 are created by a pre-processor (e.g. part of compiler) and related tools or mechanisms (collectively referred to by given name Arjun), where Arjun builds the lists or sets by reading the information about published services and subscribed services in the source code of each of the modules in an application, according to an embodiment. Each node in the list 2230 comprises of information for an available service of a module, and each node in the list 2240 comprises of information for a service required by a module. The information in the nodes is used for managing and validating communication code and interfaces between the modules, according to an embodiment. The node comprises of many kinds of information such as a lookup-key, information for module, about service, service interface and version etc. The information in the nodes is used for generating communication code for each of the modules, according to an embodiment. The communication code can be included at appropriate locations in the code for the application. The information in the nodes is also useful for creating documentation (e.g. comprising of visual representation) for dependencies for each of the modules, according to an embodiment.

After constructing the lists by reading information from each of the modules, the Arjun compares the two lists, matches each of the subscribed services in the list 2240 with the available services in the list 2230, and creates a diagnostic report showing all mismatches. The Arjun also detects errors and/or possible errors or warnings such as (i) a service 2235 required by a module 2264 is not available, (ii) an available service 2245 provided by a module 2245 is not used, and (iii) an interface for available service 2252 and the interface used for requesting the service 2251 are not compatible (e.g. a mismatch in number of parameters or mismatch in the type of one or more parameters). Missing services and incompatible services are considered dependency or interface problems. Those problems may arise after one of the service-provider interfaces in a service-providing module 2262 is updated while service-consumer interfaces in one of the dependent modules is not updated accordingly. The unused services are removed during the cleanup (e.g. refactoring) of the application code, according to one embodiment. In general, unused services is not an error (so, may generate informational or warning messages), because a module (e.g. from a component vendor) may provide multiple services but only a subset of the services provided are needed in an application.

In any application comprising of multiple pluggable modules (or pluggable components), Inter module (or component) communications (or collaboration) imply communications (or collaboration) between the modules (or components) within the application. According to an embodiment, tools and mechanisms such as Arjun/SRO are employed for creating communication code and/or facilitating Inter module (or component) communication (or collaboration) between modules (or components) that are included into an application for building the application. For example, Inter module communications imply communication between pluggable modules such as 1514 CityATC or 1513 CityER (e.g. Ambulances for Emergency Response) and other such pluggable modules in the application. Each of the module (e.g. 1514 CityATC or 1513 CityER such as Ambulances for Emergency Response) can be designed and developed and tested as an independent application by using all the available shared objects and/or reusable libraries/API.

According to an embodiment, each pluggable module for an application is created by implementing many lines of custom code, where the custom code uses many global shared objects created for the application and also uses many reusable libraries/API. This custom code also implements communication code to allow collaboration between various parts within the module. This kind of intra-module communications between (i) various parts or objects used within the custom code implemented for building each module and/or (ii) communications between the parts implemented within the module and global shared objects or reusable libraries/API is not facilitated by using tools and mechanisms such as Arjun/SRO, according to an embodiment. The kind of communications between various parts or objects within the module and communications between the parts within the module and shared global objects or reusable libraries is not considered Inter module communications (or collaboration).

Figure 29:
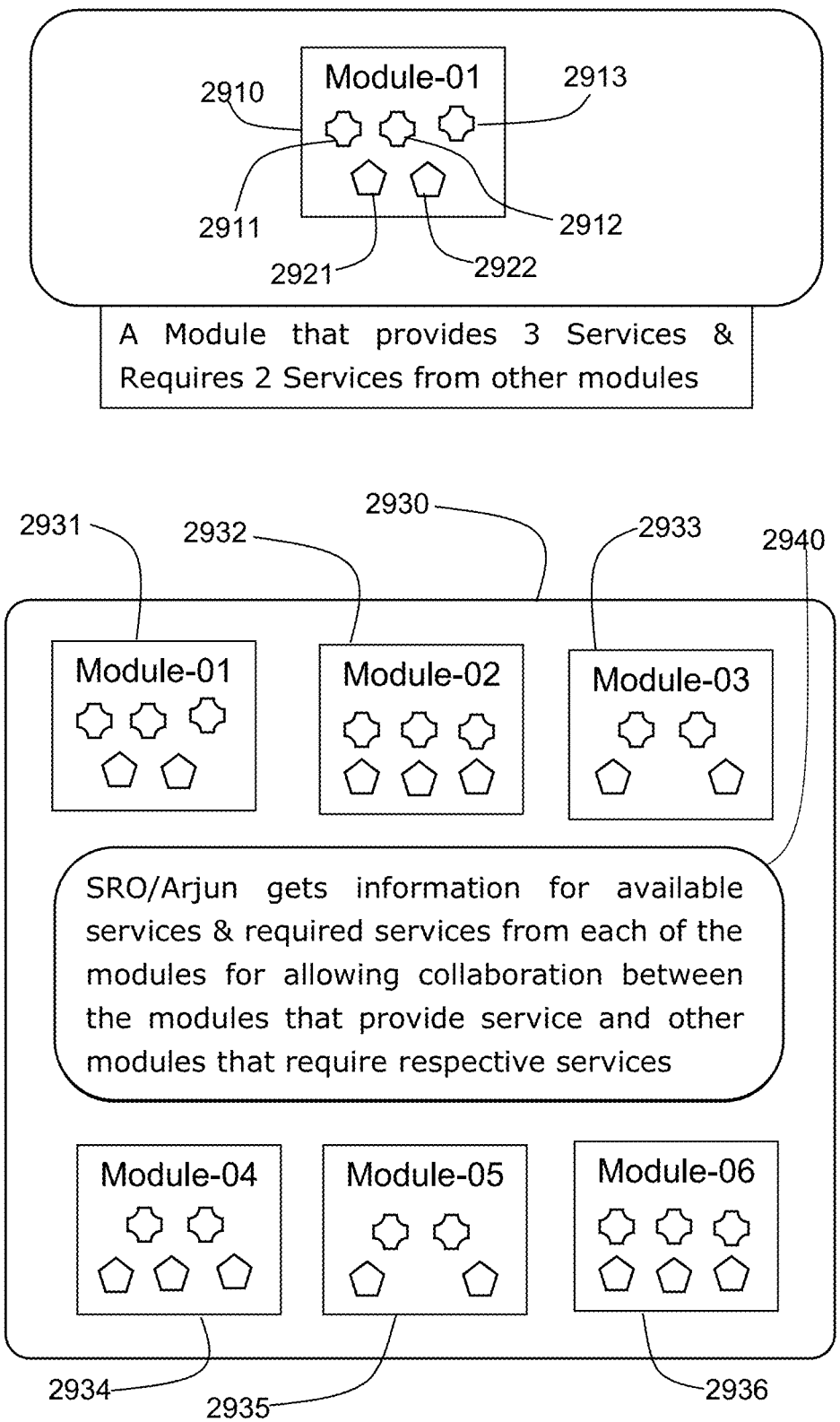
FIG. 29 shows a module that offers 3 services and requires 2 service, and an application comprising multiple modules and a mechanism such as SRO/Arjun for facilitating communications between the modules, according to an embodiment.

FIG. 29 shows a module 2910 that provides 3 services and requires 2 services from other modules, where module 2910 (i) comprises code sections (or instruction) 2911, 2912 and 2913 for registering (or publishing) each of the services that are provided by the module 2910, and (ii) comprises code sections (or instruction) 2921 and 2922 for finding (or publishing) each of the services required by the module 2910, where the pentagon shaped icons 2921, 2922 represents code (or instruction/information for) required services. If any application 2930 comprises of multiple modules (e.g. 2931, 2932, 2933, 2934, 2935, and 2936), a tool such as SRO (or Arjun) 2940 may be used for getting the information for available services and required services from each of the modules (e.g. 2931, 2932, 2933, 2934, 2935, and 2936) for facilitating collaboration between the modules (e.g. 2931, 2932, 2933, 2934, 2935, and 2936), according to an embodiment. Each of the modules (e.g. 2931, 2932, 2933, 2934, 2935, to and 2936) comprises code sections (or instruction) 2911, 2912 and 2913 for registering (or publishing) each of the services and code sections (or instruction) 2921 and 2922 for finding (or publishing) each of the services.

Any module in an application that offers one or more services for other modules in the application comprises of a code section (or instructions) to register (or publish information for) each of its services. Likewise, any module requires one or more services that are offered by other modules comprises of a code section (or instructions) to subscribe each of the required services, according to an embodiment. Any necessary communication and/or collaboration between the modules in the application may be facilitated by employing a tool (or mechanism), where the tool gets from each of the module information for each of the services provided by the module and information for each of the services required by the module for creating communication code that can be used for facilitating necessary communication and/or collaboration between the modules.

According to an embodiment that uses a Service Registration Object (or SRO) type mechanism for facilitating necessary collaboration between multiple modules (e.g. 2931, 2932, 2933, 2934, 2935, and 2936) in an application, if a module in the application provides one or more services, the module registers each of the services with the SRO 2940. If a module in an application requires one or more services, the module looks up for each of the services from the SRO 2940. The SRO (e.g. 2940) creates a list of available services of all the available services and creates a list of all the required services from all the modules (e.g. 2931, 2932, 2933, 2934, 2935, and 2936) and uses the two lists for facilitating necessary collaboration between the modules, according to an embodiment.

According to an embodiment that uses a Pre-processor (referred to as Arjun) type mechanism for facilitating necessary collaboration between multiple modules in an application, if a module in the application provides one or more services, the module publishes necessary information for each of the available services. If a module in the application requires one or more services, the module publishes necessary information for each of the required services. The pre-processor (e.g. that may be part of a compiler) 2940 gets the information for all the available services and required services from all the modules (e.g. 2931, 2932, 2933, 2934, 2935, and 2936) for facilitating necessary collaboration between the modules, for example by creating necessary communication code.

Any kind of module in a software application (or system) can be made pluggable, if it is practical to automate tasks for creating necessary communication couplings for the module to allow necessary collaboration between the module and the other parts of the application by implementing necessary parts of the communication code within the module (e.g. by publishing or subscribing each of the services for the module), for example, by leveraging external mechanisms such as Arjun or SRO. If the codebase for a pluggable module is implemented in a set of exclusive files, the exclusive codebase for each of the pluggable modules can be redesigned individually and the features, functionality and coupling interfaces of the module can be tested individually, for example, in a small test application after building the module by compiling the codebase and the test application, according to an embodiment.

Section-K: Communication Code and Dependencies Between Modules in an Application A large software application might comprise of many modules (e.g. components, objects, or parts), where each of the modules in the software application likely collaborates with one or more parts in the application. In other words, when developing the application, each of the modules is added to the application, and if this module requires collaborating with one or more other parts (e.g. modules or objects) of the application, necessary communication code is also implemented for allowing collaboration between this module and other parts in the application. This kind of communication code is harder to maintain (e.g. when redesigning the module or the other parts) and is often error-prone, so it is desirable to invent mechanisms and tools for reducing such error-prone tasks and complexity. This kind of communication code creates dependencies between each module and other modules or parts, where such dependencies are hard to track or comprehend, particularly to the newly-recruited software programmers. It is desirable to device mechanisms and tools for reducing the complexity of tracking and/or comprehending dependencies between the modules.

The widely used method for creating communication code for each module, when the module is added to an application and if the module needs to communicate or collaborate with one or more other parts or modules in the application is: Manually implementing few lines of communication code to allow the module to collaborate with each of the other parts. For example, if the module provides a useful function or a service which is needed by several dozens of parts in the application, it requires implementing few lines of error-prone communication code to allow necessary collaboration between the module and each of the other dozens of the parts.

To replace this module by another module (or an improved version having updated interfaces), it requires error-prone efforts for finding this communication code implemented for each of the parts and fixing the communication code. This kind of changes must be made in dozens of places, if dozens of parts are using the service. It is desirable to minimize this kind of error-prone activities or tasks by using tools or mechanisms for assisting effectively in automating as many error-prone tasks as possible for maintaining the communication code, for example. It is desirable to invent better ways for creating and managing the communication code.

For example, in a shopping-cart application (e.g. FIG. 17) that is displaying hundreds of shopping items and a shopping cart (e.g. an Invoice Table), each of the shopping item calls a method of the shopping cart when the user selects the item by passing information about the item as parameters. Hence, today it is required to explicitly implement communication code for each of the shopping items, so that the shopping item can call the method of the shopping cart whenever the shopping item is added to the shopping cart (e.g. by double-clicking on the shopping item). Also, it is required to implement necessary communication code when a new shopping item is added to this shopping application to allow communication between the new shopping item and the shopping-cart (e.g. an Invoice-Table). If the module for Invoice-table is replaced by another new Invoice-table module for another source, it is required to find the communication code for each shopping-item and update the communication code to properly use the interfaces of the new Invoice-table.

Many software experts agree that about 80% of the software engineering is changing existing code (e.g. for creating upgraded versions and maintenance). Substantial portion of this effort goes into manually performing various tasks for changing and maintaining the communication code in each of the software applications, where many of the tasks are hard and often error-prone. Today, most of these tasks are being done manually. It is desirable to automate as many of these tasks as possible by inventing and using tools and mechanisms, according to an embodiment.

Most large software applications (or products) are created by a team of software engineers. Each of the large software applications (or software projects) not only comprises of multiple custom modules (e.g. objects, components, or other kind of parts) but also use many reusable modules (e.g. objects, components or other kind of parts such as APIs or Libraries etc.) from open source or third-party vendors. Each of the engineers in the team create one or more modules and each module created by an engineer likely communicates with other modules created by other engineers in the team. Hence, it requires careful collaboration between the members of the team for creating and, particularly, redesigning the modules during future maintenance release cycles.

For example, the communication code between any two modules (that interact with each other) must be tested whenever one of the two modules is redesigned. For example, when creating an upgraded version or maintenance release of a software application (or product), each of the modules is being redesigned in parallel by different member in the team. If an upgrade release requires changing one or more communication interfaces of a module, such changes to each of the communication interfaces requires corresponding changes in other modules that are using the communication interface.

The pluggable modules in an application can employ alternative mechanisms to avoid manually implementing communication code for allowing collaboration between each module and other modules or parts in the application. For example, one of the methods is including a global object SRO/DoS in the code of the application, wherein (i) each module comprises of part of the communication code to register with the SRO/DoS each of the services provided for other modules, and (ii) each module comprises of part of the communication code to lookup from the SRO/DoS each of the required services. The goal for using SRO/DoS is to eliminate the need for manually implementing (or adding) communication code (in the code of the application) when each module is included (or plugged in) into the application.

Alternative methods or mechanisms may be employed to eliminate the need for manually implementing (or adding) communication code (in the code of the application) when each module is included (or plugged in) into the application. Each of the modules in an application employs methods (or protocol) and/or mechanisms for these two kinds of tasks, such as, (i) if a module provides one or more services (e.g. for other modules), the module publishes each of the services by including information necessary for creating communication code for other modules to request the service, and (ii) if a module requires one or more services (e.g. provided by other modules), the module subscribes to each of the required services by including information necessary for creating communication code to access the service provided by other modules.

In an alternative embodiment for SRO/DoS (that operates at runtime of the application), a pre-processor or compiler (referred to by a given name Arjun) reads source code of the modules in the application for available services in each of the modules and services required by each for the modules for building two lists (1) information for each of the published services, and (2) information for each of the subscribed services; and uses the information in the lists for generating communication code, which can be used for allowing collaboration between modules.

Section-L: A Pseudo-Code Example for Publishing a Service and Subscribing to a Service for Compiler or Pre-Processor In an embodiment, an intelligent Compiler or Pre-processor (referred to by a given name Arjun that also uses a mechanism comprising SRO/DoS) is created that reads the exported interfaces and imported interfaces for creating coupling instruction for allowing communication between a first module that exports an interface (for a service provided by the first module) and a second module that uses the interface (for a service required by the second module), for example, by (1) creating a list of all the exported interfaces (for available services), and (ii) creating a list of all the imported services (for required services). Today, no compiler or pre-processor is providing this kind of feature for getting information from each of the modules included in an application for creating necessary communication for the module. According to an embodiment, a pre-processor is used to read information from source code for each of the modules to build two kinds of lists, where one list is for all the available services and the other list is for all the required services.

1. // Implementation of a service function for providing a service for other modules/parts
2. Integer NameOfTheServiceFunction (Integer Int1, float flt1, String str1,
3. PS_CanvasClass PS1, CallBackClass CB1)
4. {
5. // Comprises of code for application or business logic for providing a service.
6. // This method is the entry point for requesting a service of a module.
7. // This may use other methods/function in the module and/or other modules.
8. }

The above pseudo-code listing shows a sample service function NameOfTheServiceFunction implemented in a module. FIG. 26 shows two code blocks, where the first code block 2610 comprises of pseudo-code listing for publishing a service function of a module, where the module provides the service, and the second code block 2620 comprises of pseudo-code listing for subscribing to a service by module, if the module requires or depends on the service. The information for describing interface is enclosed between delimiters "$[%" and "%]$" by using XML format, according to an embodiment. That is, the information for describing a service is clearly demarcated, for example, by including the information for each service between a unique pre-defined delimiters such as "$[%" and "%]$", where the information is sufficient for generating communication code.

The pseudo-code in listing-1 or instruction 2610 (in the module that implemented a service and is provided by publishing the service) illustrates an exemplary embodiment for publishing the above service function, according to an embodiment. A unique predefined name (e.g. ExportArjunInterface) is used for publishing each of the services provided, according to an embodiment. Likewise, the pseudo-code in listing-2 or instruction 2620 (in the module that requires a service) illustrates an exemplary embodiment for subscribing to the service function, according to an embodiment. A unique predefined name (e.g. ImportArjunInterface) is used for subscribing to each of the required services, according to an embodiment.

If a module provides one or more services for other modules, then the module comprises of necessary information for each of the services to uniquely identify the service to be able to find it. In an embodiment, each module publishes this information for each service provided by the module. In an embodiment, any other module (or part) in the application that requires the service is subscribed for the service. In an embodiment, pre-processor or compiler reads this information for each service (either required service or provided service) and uses this information for creating communication code after proper validation and testing of interfaces and versions, according to an embodiment.

For example, if a service-provider module is redesigned for a future release and a service function (e.g. Mod1ServiceFunction 1605) is updated by adding a new or 4th parameter for supporting additional capabilities, then the service-consumer interface (i.e. in each of the module that is using the service function) must be updated for using the new service-provider interface. If plural modules require the service, the service-consumer interface in each of the plural modules must be updated (e.g. to pass 4 parameters, instead of 3 parameters). If a service-consumer interface (e.g. 1609) is not updated inadvertently to match the new or updated service-provider interface, it results in an incompatible interface between the service-provider interface and service-consumer interface. It is desirable to detect this kind of inadvertent mistakes. Such mistakes likely committed when creating new version after a year from earlier release.

The incompatibility between service-provider interface (e.g. the declaration of the service function Module1ServiceFunction at line-3 of 1605) and service-consumer interface (e.g. calling the service function Module1ServiceFunction by using a reference RefForModule1Service at line-3 of 1609) is detected by comparing the number of parameters and type of each of the parameters, according to an embodiment. Just comparing the types of parameters can't detect certain kinds of errors. For example, the three parameters are of types String, Integer, and Integer respectively for Name, Weight (as integer in milligrams), and Height (as integer in millimeters), in the service-provider interface.

Calling the service-provider function by passing Name, Height (as integer in milligrams), and Weight (as integer in milligrams) passes testing by comparing types of parameters. It is an error, because the service-provider function (e.g. 1605) expects weight in the second parameter and service-consumer (e.g. 1609) is passing height in the second parameter. Additional information is provided in the descriptions (e.g. 2610 listing-1 and 2620 listing-2) for each part of the interface for this kind of errors, according to an embodiment. For example, 2610 listing-1 also provides information for data as "height" at line-6 in listing-1.

Section-M: Using Service-Consumer Interfaces (e.g. Functions or Objects) to Allow Certain Degree of Flexibility, Adaptability, or Interchangeability FIG. 23 shows communication between module-1 2310 and module-2 2320 using SRO/DoS mechanism, wherein module-2 2320 uses a service provided by module-1 2310, according to an embodiment. FIG. 23 is nearly equivalent to FIG. 7 but has minor differences. Module-1 2310 comprises of implementation of a service function 2311 (i.e. Module1FunctionForServiceX) and part of the communication code 2312 for registering the service function with SRO/DoS by using a lookup key (i.e. "Service-X of Module1"). Module-2 2320 comprises of part of the communication code 2321 for looking up the service by using the lookup key (i.e. "Service-X of Module1") and storing the reference of the service function in a local variable (i.e. RefForModule1ServiceX). Module-2 2320 implements a service-consumer interface function 2322 for calling the service function (i.e. Module1FunctionForServiceX) by using the reference (i.e. stored in variable RefForModule1ServiceX). Module-2 2320 uses the interface function 2323 wherever Module-2 2320 needs "Service-X of Module1 2310".

According to an embodiment, the service-consumer interface function 2322 InterfaceForExternalService1 handles any incompatible interface between service-provider module 2310 and service-consumer module 2320. This function is designed to act as an adapter for bridging differences of artificial dependencies between the two interfaces. For example, the service function Module1FunctionForServiceX is designed to accept 3 parameters, while the code in the consumer is designed to call interface-function InterfaceForExternalService1 by passing 4 parameters, according to an embodiment. If the information or data in 4 parameters can satisfy the real dependency but the issue is only in artificial dependency, it is possible to implement adapter code for bridging the gap between service-provider interface function (e.g. Module1FunctionForServiceX) and service-consumer interface function (e.g. InterfaceForExternalService1).

An exemplary embodiment for when this kind of situation arises: If module-2 2320 is designed to use service-provider module-1a created by a first vendor but is later replaced by another service-provider module-1b available from open source community. For example, both modules, module-1a and module-1b that is used for replacing module-1a need the same information and provide the same service but offer different service-provider interfaces. For example, assume module-1a requires 4 parameters while new module-1b requires 3 parameters to send or exchange essentially the same information or data. There is no problem in fulfilling real dependency but there is an incompatibility in the part of artificial dependency.

Summary for "Real Dependency" and "Artificial Dependency" using an example: When two modules require collaborating or communicating with each other for accomplishing a task, there is said to be a dependency between the two modules. Likewise, a first module depends on a second module for accomplishing its task, then first module is said to have a dependency on the second module. A dependency is divided into two parts (i) real dependency and (ii) artificial dependency. For example, household appliances such as AC, Refrigerators, PC, or Washing machine require electric power for performing each of their work. Since the power is essential to operate each of the appliances, the need for electric power is defined as real dependency.

The appliances in the USA are designed to run on 50 Hz AC 115 Volts power supply and pins in plugs are designed to be flat to fit in flat electric sockets having flat holes. On the other hand, the appliances in many Asian countries are designed to run on 50 Hz AC 230 Volts power supply and pins in plugs are designed to be round to fit in electric sockets having round holes. Hence, such appliances purchased in the USA can't be readily plugged-in in the hotel rooms in Asia or Europe, due to this incompatible coupling interfaces. This kind of dependency is defined as artificial dependency. Such artificial dependency may be overcome by designing and using appropriate adapter.

Likewise, if any two software modules must collaborate with each other, then they are said to have a dependency on each other. The data exchange is real dependency. On the other hand, the format of the data and order of parameters is artificial dependency. As long as the real dependency is met, often an adapter can be designed and used to connect incompatible interfaces to allow collaboration between them. Additional information and/or code is provided in the information for available services (e.g. pseudo-code 2610 in FIG. 26) and information for required service (e.g. pseudo-code 2620 in FIG. 26), where the information is used by SRO/DoS or Arjun for generating proper communication code comprising of adapter code to facilitate collaboration between two modules having incompatible interfaces, where the adapter code overcomes issues due to artificial dependency, according to an embodiment.

A certain function that provides utility services is called in many locations in the code of module-2. Even though such utility service function of module-1 is used at 100 locations in the code for module-2, the dependency between module-1 and module-2 is just one. An interface function (or object) is used if there is a mismatch between the parameters of service function implementation in module-1 and the way the services function is used in module-2, according to an embodiment. For example, if Module-1 is replaced by another better implementation Module-1a from another vendor, which also offers required service in better manner, the interface function can be redesigned to bridge the gaps between interfaces of service functions of module-1 and module-1 a, according to an embodiment.

Section-N: Wrapper Modules for Legacy Reusable Modules and Remote Modules Access Using Client-Stubs.

Figure 24:
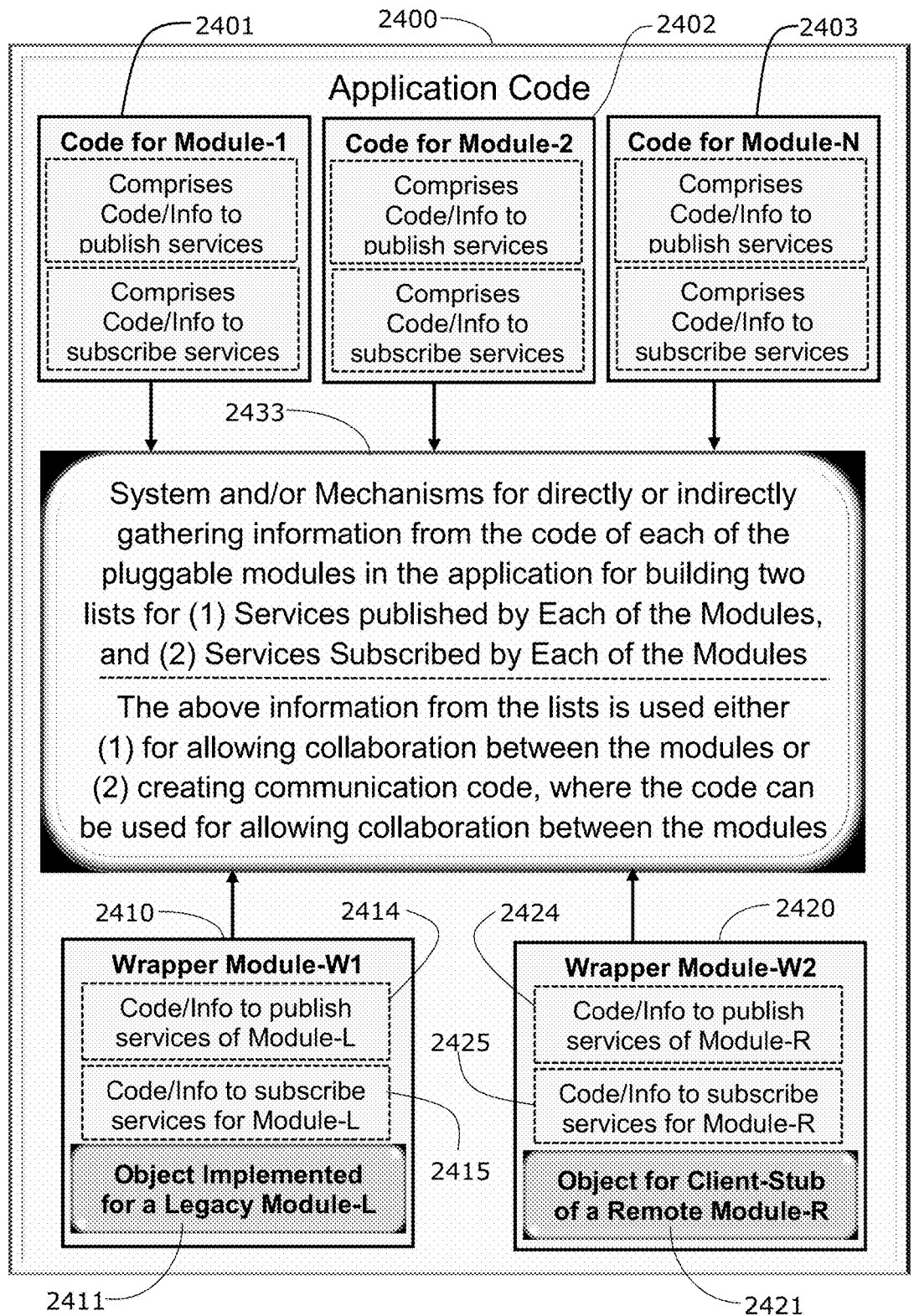
FIG. 24 shows multiple modules including two wrapper-modules (1) for a legacy module and (2) for client-stub for a remote module in an application, where each module comprises of information for each of the services published by the module and of information for each of the service subscribed by the module, and a mechanism for using the information from the modules for automating many tasks for facilitating collaboration between the modules, according to one embodiment.

FIG. 24 shows an application 2400 comprising of multiple modules 2401, 2402, 2403, 2410, and 2420, according to an embodiment. The module 2410 is a wrapper module for a legacy reusable module 2411 Module-L, where module-L 2411 is not designed to be a pluggable module. The wrapper module 2410 Module-W1 is designed to implement parts of the communication code (1) publishing services 2414 offered by Module-L 2411 (if Module-L offers one or more services for other modules), and (2) subscribing to one or more services 2415 required by Module-L 2411 (if Module-L requires one or more services from other modules). FIG. 18 illustrates a sample implementation of wrapper module using pseudo-code. Some systems and/or mechanisms 2433 are used to directly or indirectly gather information from the code of each of the pluggable modules in the application 2400 for building two lists for (1) services published by each of the modules 2401, 2402, 2403, 2410, and 2420, and (2) services subscribed by each of the modules 2401, 2402, 2403, 2410, and 2420. The information from the lists is used either (1) for allowing collaboration between the modules 2401, 2402, 2403, 2410, and 2420 or (2) creating communication code, where the code can be used for allowing collaboration between the modules 2401, 2402, 2403, 2410, and 2420.

The module 2420 is a wrapper module for a client-stub module 2421 Module-R, where Module-R is not designed to be a pluggable module. As illustrated in FIG. 19, each of the service functions in the module for client-stub 1902 communicates with server stub 1907 to access services implemented in server module 1908 in server computer 1910. The wrapper module 2420 Module-W2 is designed to implement parts of the communication code (1) publishing services 2425 offered by Module-R (if Module-R offers one or more services for other modules), and (2) subscribing to one or more services 2424 required by Module-R (if Module-R requires one or more services from other modules).

Each of the large software applications often uses multiple reusable modules (e.g. Objects, components, or other kind of parts such as libraries or APIs for microservices) from $3^{rd}$ party sources such as component vendors or open source. Substantial work for using a reusable module comprises of creating or implementing communication code for allowing collaboration between the reusable module and other parts of the application. Many of the tasks involved in creating and managing the communication code can be automated by using tools, processes, and/or mechanisms disclosed in this invention, according to an embodiment.

To use tools (e.g. Arjun or SRO/DoS), processes, and/or mechanisms disclosed in this invention, each reusable module must comprise of parts of the communication code such as registering (or publishing) each of its service methods (or functions) with Arjun (or SRO/DoS). However, reusable modules existing today don't comprise of such communication code or information for using Arjun (or SRO/DoS). In a preferred embodiment, a wrapper module (e.g. a class definition) is designed and developed for such reusable modules (e.g. from legacy libraries or APIs), where the wrapper class (e.g. Module-W1) uses reusable legacy module-L and implements the necessary parts of the communication code by using the reusable legacy module (e.g. module-L).

A pseudo-code example for a wrapper class is provided in FIG. 18, according to an embodiment. For example, in a preferred embodiment, a wrapper class (e.g. class for Module-W1) is designed and implemented for each module (e.g. module-L) where the wrapper class for "module-W1" implements parts of the communication code such as code for registering each of the service functions of module-L with Arjun. When properly designed and implemented, module-L can be included into the application (e.g. for using services of module-L) by including an object instance of the wrapper class "Module-W1".

Figure 3:
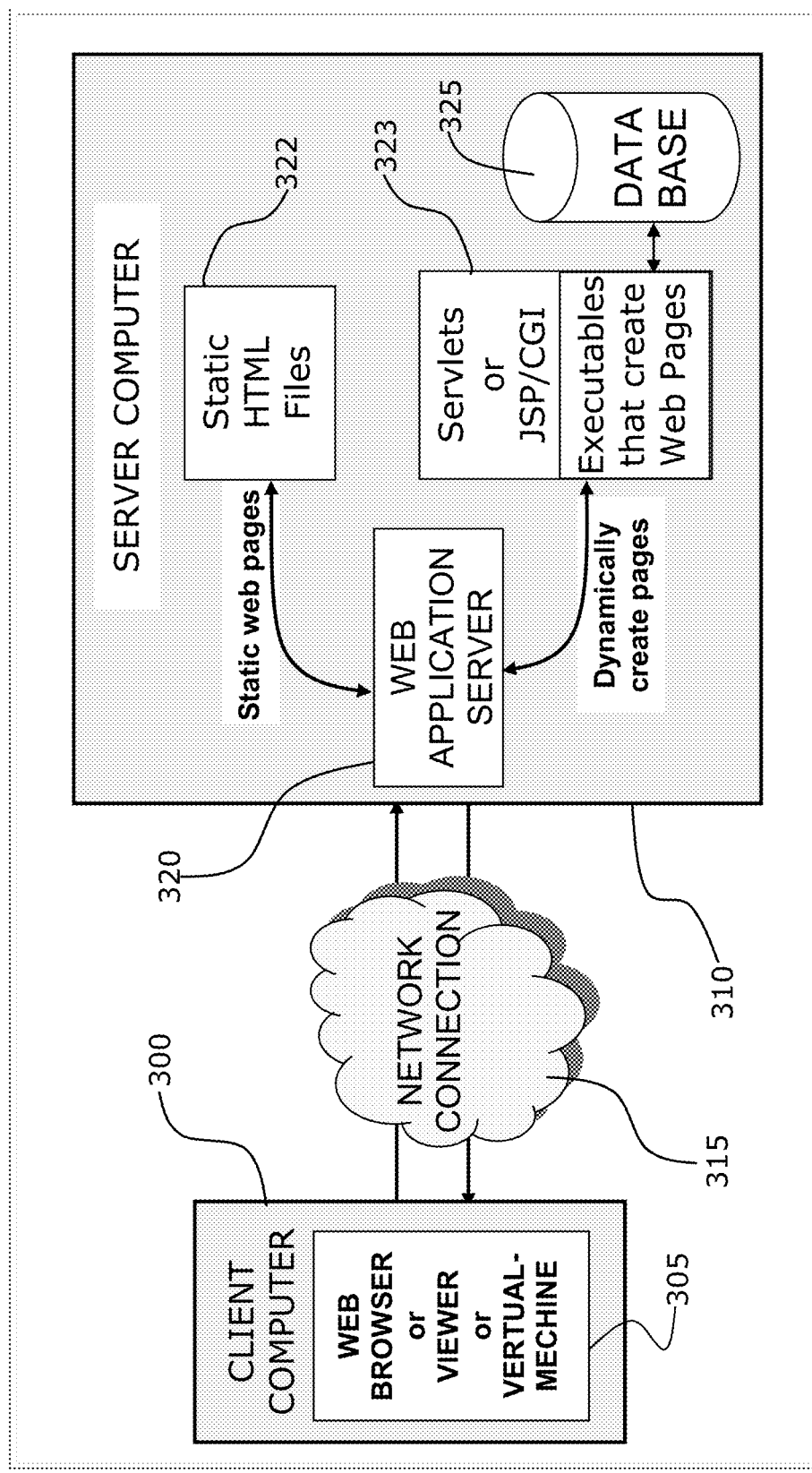
FIG. 3 shows an exemplary computing systems and devices for implementing the method of software development of web-applications according to the present invention, according to one embodiment.

Some of the software applications access services from remote modules that are being executed on different computers. FIG. 3 illustrates an example as a client and server architecture. The server provides one or more services and an application running on a client computer needs to get the services. In the above exemplary implementation, a client-stub along with server-stub is designed and implemented to allow communication between client application (i.e. an executable running on client computer) and server application (i.e. another executable running on client computer). An exemplary embodiment is illustrated in FIG. 19, FIG. 20*a*, and FIG. 20*b*. The client-stub implements various methods (of functions), where each method is designed to communicate over network (e.g. internet, intranet, LAN, or WAN) to access a given service through server-stub. Each of the methods (or functions) in client-stub is designed to access a service available on the remote server application. The methods (or functions) for all the required services in the client-stub can be implemented as a module such as a class definition in Object Oriented Programming.

To use tools (e.g. Arjun), processes and/or mechanisms disclosed in this invention, each class-stub (or wrapper module for the client-stub) can be designed to implement parts of the communication code such as registering each of its service methods (or functions) with Arjun. However, if a legacy client-stub is not designed to use Arjun, a wrapper class can be implemented. In a preferred embodiment, a wrapper module (e.g. a class definition) is designed and developed for such client-stub, where the wrapper class (i.e. module) designs and implements the necessary parts of the communication code by using the client-stub. For example, in a preferred embodiment, a wrapper class (e.g. module-W2) is designed and implemented for each client-stub (e.g. of a remote module Module-R), where the wrapper class "Module-W2" implements parts of the communication code such as code for registering each of the service functions. When properly designed and implemented, Module-R can be included into the application by including an object instance of the wrapper class "Module-W2".

The above is an exemplary implementation for employing wrapper class to make the module for each client-stub into a pluggable module. It is not necessary that both applications (i.e. executable for server-application and client-application) run on different computers. In some cases, the executable for both applications might be running on same computer and communicate with each other by employing methods such as Socket-based IPC (Inter-process communication), or other kinds of IPC such as metaphors and shared memory etc. The client-stub can employ any kind of method for IPC (Inter-process communication) to request each service from the server-application.

Figure 25:
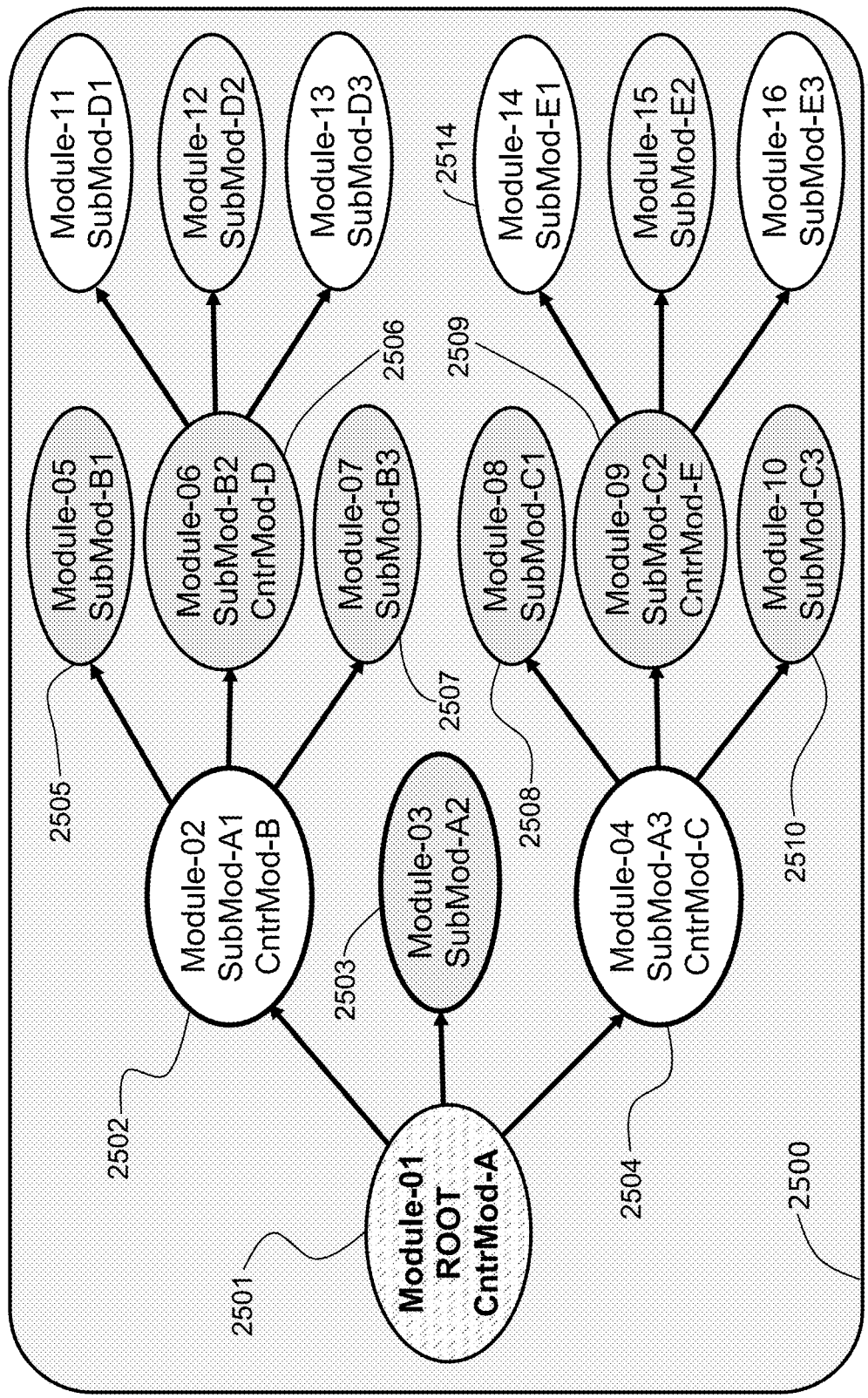
FIG. 25 shows an application built by assembling modules/object as a hierarchy of pluggable modules/objects, where two container-modules/objects are two different object instances of the same class definition, according to one embodiment of object-oriented programming.

Section-O: Applications Having Object (i.e. Module) Hierarchy and Having Multiple Instances of Objects of Same Class, in an Embodiment for OOP FIG. 25 shows an application 2500 comprising of container modules (e.g. Object instances) and sub-modules (e.g. Object instances), where each container module comprises (in short CntrMod) of sub-modules (in short SubMod), according to an embodiment that uses OOP (Object Oriented Programming). The objects instances for CntrMod-A 2501, CntrMod-B 2502, CntrMod-C 2504, CntrMod-D 2506, and CntrMod-E 2509 are container modules. The objects instances for SubMod-A1 2502, SubMod-A2 2503, and SubMod-A3 2504 are sub-modules of CntrMod-A 2501. The objects instances for SubMod-C1 2508, SubMod-C2 2509, and SubMod-C3 2510 are sub-modules of CntrMod-C 2504. The objects instances for SubMod-B1 2505, SubMod-B2 2506, and SubMod-B3 2507 are sub-modules of CntrMod-B 2502.

A module is a container module if it comprises of other modules where the other modules are referred to as sub-modules in the context of the container module. A sub-module can be a container-module (e.g. Module-6 2506) if it comprises of sub-modules (e.g. Module-11 2511, Module-12 2512 and Module-13 2513) and is referred to as a container-module in the context of its sub-modules (e.g. Module-11 2511, Module-12 2512 and Module-13 2513). Hence, a module can be both container-modules (in the context of its sub-modules) and sub-module (in the context of its container module) based on relative position. For example, Module-04 2504 is a sub-component in the context of module-01 2501, while being container-module in the context of its sub-modules 8, 9 and 10 or 2508, 2509, and 2510.

Each container-module is at the root of a branch in the hierarchical tree of modules. For example, module-2 2502 is root of a branch, where modules 5, 6, and 7 2505, 2506, and 2507 are children (i.e. sub-components) and modules 11, 12, and 13 2511, 2512, and 2513 are grandchildren (i.e. sub-modules of modules that are sub-modules of module-2 2502). Sub-branch for Module-2 2502 comprises of modules 5, 6, 7, 11, 12, and 13 (2505, 2506, and 2507) (where modules 11, 12, and 13 2511, 2512, and 2513 are sub-components of module-6 2506). Sub-branch for Module-4 2504 comprises of modules 8 2508, 9 2509, 10 2510, 14 SubMod-E1 2514, 15 2515, and 16 2516 (where modules 14, 15, and 16 2514, 2515, and 2516 are sub-components of module-9 2509).

For example, assume more than one object instance (e.g. CntrMod-B 2502 and CntrMod-C 2504) of a class for a container module is used in an application. Assume module-12 2512 requires a service provided by module-07 2507 and the lookup key is "SubModule3ServiceX". Hence, module-15 2515 uses lookup key "SubModule3ServiceX" to access service of module-10, since objects CntrMod-B 2502 and CntrMod-C 2504 are instances of same Class-definitions, and both contain and use same functions but operate on different data stored in local variable. Since the same lookup key "SubModule3ServiceX" is used for both modules module-12 2512 and module-15 2515, care must be taken so that module-07 2507 calls service function in module-12 2512 (by using lookup key "SubModule3ServiceX") and module-10 2510 calls service function in module-12 2512 respectively (by using lookup key "SubModule3ServiceX").

According to an embodiment, module-ID (e.g. static int instance_count=0) for container module (i.e. CntrMod-B or CntrMod-C) is also used along with lookup key for finding right service function in correct (or respective) branch Module-2 2502 or Module-4 2504. The instance count is incremented in the constructor, according to an embodiment. According to another embodiment, respective name is passed, for example, left_engine and right_engine (e.g. in case of simulation of twin engines of an Airplane). According to another embodiment, a local separate object instance of SRO/DoS is used in respective branches for modules module-2 2502 and module-4 2504, for example by having a variable for SRO/DoS instance in the class for module-2 2502 and initializes the variable in the constructor of respective object instances module-2 2502 and module-4 2504. If communication code is generated by using the SRO/DoS to allow collaboration between module-7 2507 and module-12 2512, the communication code is included in the code for the class definition (where the object instances CntrMod-B 2502 and CntrMod-C 2504 are included using the same class definition), according to an embodiment.

If module-6 2506 requires a service using lookup key "SubModuleA2ServiceY" (that is provided by module-3 2503), then module-9 2509 requires the service of module-3 2503 associated with lookup key "SubModuleA2ServiceY". According to an embodiment, module-6 2506 uses local SRO/DoS instance for finding service provided by modules in the branch of module-2 2502 and another SRO/DoS instance for finding global service provided by modules under the branch of root module-1 2501. As illustrated by this example, appropriate method is used for requesting the right service function by sub-modules if it is required to use more than one instance of container module class in an application, according to an embodiment.

It is necessary to take special care and caution for a certain kind of modules (e.g. an Object instances of a class) which are dynamically created during runtime (e.g. by using statement "new" in Java or C++). When an object instance is created by using "new" statement on a class-definition (e.g. in Java or C++), its constructor calls the function that registers its services and also calls the function that looks up required services. In an embodiment, an object instance of each of such classes is tested individually by creating a test application. After testing, the SRO/DoS can be used for creating necessary communication code. An application might include more than one Object instance of the class, where each object instance might be used by a different sub-system of the application. Each object instance is initialized by and/or comprises of data for the respective sub-system. For example, if Object-A is created for sub-system-A and Object-B is created for sub-system-B, then sub-system-A must only access service methods in Object-A while sub-system-B must only access service methods in Object-B.

In an embodiment, sub-system name (or number/index) along with unique lookup key is used for finding the reference for a service function in the right object instance. For example, a static variable (e.g. static int sub_system_count=0;) may be used to count the number of sub-systems created, where the count is incremented in the constructors. Any PHOSITA (person having ordinary skill in the art) must employ a suitable mechanism based on things such as capabilities of compiler for programming language and the way sub-modules are structured.

According to an embodiment, the code for each of the modules comprises of part of the communication code, for example, to communicate with global SRO-object (e.g. to register or lookup each service), where the global SRO-object acts as a network-switch to connect any two modules that needs to communicate with each other (e.g. a first component provides a service and a second module uses the service). For example, FIG. 10 illustrates a star-network, where each of the modules (i.e 1001, 1002, 1003, 1004, 1005, 1006, 1007, 1008, 1009 and 1010) is connected to the switch (i.e. SRO/DoS 1000). For example, a first module initiates a call to communicate or collaborate with a second module, wherein, for example, the first module uses a unique lookup-key (e.g. analogous to telephone number or URL) for finding the required function or service of the second module.

For example, consider an application having many modules where each module collaborates or communicates with one or more other modules in the application. If a module needs to communicate with one or more modules for performing its tasks (e.g. to provide functionality or features), the module must find (e.g. using lookup key) and connect with appropriate modules to request each of the necessary services (e.g. by calling each of the service functions) for fulfilling the tasks. Imagine a network analogous to a telephone network, where each service to fulfill a task is given a unique lookup key. To fulfill a task, each module calls the switch (e.g. SRO/DoS) by passing the unique lookup key of the task and the switch connects with the appropriate service function (or object) that can provide necessary service to fulfill the task.

It is an error if two mobile phones have the same telephone number, as the telephone number is a unique lookup key to connect to the right mobile phone. When a call is placed on a network, the network may connect to a wrong mobile phone if two different mobile phones have the same telephone number. Likewise, it is an error to register two different services (e.g. functions or objects) by using the same lookup key. If two service functions are registered by using the same lookup key (or have the same lookup key), the SRO/DoS detects and reports such errors, according to an embodiment. It is an error to register more than one service function (or object) for a given lookup key (or set of keys). The lookup key (or set of keys) must be unique. It is OK to have 2 phones having the same 7-digit number, provided area code or country code is different. For example, in the USA, one can dial 7 digits to make local calls, while one must use 10 digits to make long-distance calls (where the additional 3-digit number is area code).

According to an embodiment, if a module provides one or more services, then the module registers each of its services with the SRO by using a unique lookup key (and optionally adding additional sub-branches) and a reference of a function (or method), where the function (or method) may be called for getting/requesting the service. If another module requires the service, the other module uses the unique lookup key to find the function using SRO and calls the function (or method) for getting the service. For example, if module-M07/1007 provides a service, it registers a function (or method, which can be called to request the service) and a unique lookup key with the SRO to find the service function (or method). If module-M03/1003 needs to request the service provided by module-M07/1007, then module-M03/1003 calls the SRO using the lookup key to find and call the function for getting the service provided by module-M07/1007.

According to an embodiment, a linked-list or chain of SRO/DoS is created starting from root module-1 2501. In this case, module-02 2502 comprises of an object instance for SRO/DoS class, which points to another object instance of SRO/DoS in module-1 2501. When module-12 2512 looks up a service (e.g. by using a Lookup key) by calling the local or nearest SRO/DoS in module-4 2504, if SRO/DoS in module-4 2504 can't find the service, SRO/DoS in module-4 2504 calls the next nearest SRO/DoS in module-1 2501, and so on. The lookup continues by traversing the chain of SRO/DoS until it finds the lookup key (or failure), according to an embodiment. If each of the SRO/DoS is requested to generate communication code, the communication code is included in the respective module. That is, the communication code generated by the SRO/DoS in module-4 2504 is included in code for module-4 2504, according to an embodiment. Likewise, the communication code generated by the object instance of SRO/DoS in module-2 2502 is manually included in code for module-2 2502, according to an embodiment. The communication code generated by the object instance of SRO/DoS in module-1 2501 is manually included in code for module-1 2501, according to an embodiment.

Section-P: Other Means for Creating (or Generating), Validating Communication Interfaces, and Managing Communication Code and Interfaces According to an earlier embodiment that uses SRO/DoS, (a) each of the modules registers (or publishes) each of its services (i.e. provided by the module) with the SRO/DoS object and (b) each of the modules looks up (or subscribes to) all the services (required by the module) from the SRO/DoS object. The SRO/DoS creates two sets of nodes (each node for a service) in form of two lists (e.g. 830 and 840) by using this information (provided by each of the modules) for creating each node for each of the available and required services. The information available in the nodes in the two lists is used for generating communication code to allow communication between the modules (e.g. FIG. 10 and FIG. 11), according to an embodiment. This communication code is included in the code of the application at proper locations. The SRO/DoS acts as a virtual socket (e.g. software system-board or motherboard having virtual sockets) for each of the pluggable modules in an application by allowing collaboration between the modules in the application, according to an embodiment.

The SRO/DoS can eliminate the need for adding any more communication code in the application after including the instance of a pluggable module. Removing the pluggable module effectively removes all the code implemented for including the pluggable module and there is no need for removing any communication code (since there was no need for adding the communication code, when included the module). In an alternative embodiment, SRO/DoS is designed to automatically generate necessary communication code for the pluggable modules for allowing collaboration between the pluggable modules in the application. If the communication code can be generated automatically, there is no need to manually implementing the communication code for the modules, which in effect makes the modules pluggable modules (if the communication code can be included properly in the code of the application to allow communication between the modules).

According to an embodiment, the SRO/DoS creates two lists (e.g. 830 and 840) of nodes and uses the information in the nodes not only for validating communication interfaces but also for facilitating communication between the modules in the application. Furthermore, the SRO/DoS can be designed to use the information in each of the nodes in the two lists (e.g. 830 and 840) for not only validating communication interfaces but also generating communication code for the pluggable modules, provided the nodes in the lists have necessary additional pieces of data for generating the communication code. Hence, each module (a) must provide necessary pieces of data, when publishing each of its services and (b) must provide necessary pieces of data when subscribing to each of the required services. According to an embodiment, once the two lists (e.g. 830 and 840) are created, the communication code is generated by using the information in the two lists (e.g. 830 and 840).

The SRO/DoS is just one way for creating the two lists (e.g. 830 and 840). The two lists can be created in alternative ways. For example, according to an embodiment, there is necessary information for publishing each service in 2610 listing-1 of FIG. 26 and the necessary information for subscribing to each service in 2620 listing-2 of FIG. 26. Such information for each service is included in the code for each module and this information can be extracted from the source code and used for building the nodes for the 2 lists (e.g. 830 and 840), for example, at the time of compiling the source code by a preprocessor. The communication code for the modules can be generated by using the data and/or information in the 2 lists (by finding coupling dependencies between the modules), according to an embodiment.

Hence, the code to allow communication between modules in an application is created (or generated) by other means (or ways). For example, according to an embodiment, the source code for each of the modules comprises of (i) detailed information (including description of coupling interface) about each of the services it requires (e.g. from other modules) and (ii) detailed information (including description for coupling interface) about each of the services it provides (e.g. for other modules). If this information is sufficient, this information can be extracted and used for generating necessary communication code for each of the modules, according to an embodiment.

According to an embodiment, either a compiler or pre-processor for the compiler reads this kind of information for each of the modules (e.g. from the source code of each module) in the application for creating (or generating) necessary communication code for each of the modules after performing all possible error-checking and/or validation of coupling interfaces. Providing additional information, such as number of parameters and the type of each of the parameters, is useful for detecting inconsistent or incompatible interfaces in each communication link (or coupling) between any two modules. When requesting for a service, the requesting module needs to call the associated service function (implemented in a module that is providing the service) by passing the right number of parameters and the right type of the parameters. If there is a mismatch in the parameters, then there is a mismatch in the communication interface (or coupling) between the service-requesting module and the service-providing module.

Each communication link, coupling or interface to allow collaboration between any two parts or modules comprises of two parts (i) a first module provides a listener or service-provider interface to allow other modules to request a service or for accessing a service, and (ii) a second module that requires the service must use the interface defined by the listener or service-provider module. It is an incompatible communication interface or coupling between the first module and second module if the second module calls the service function of the first module by passing a wrong number of parameters or if there is a mismatch in the types of one or more parameters.

The pre-processor mechanism (referred to by a given name Arjun) or SRO/DoS needs certain information for generating communication code. For example, according to an embodiment, if a service-consumer Module-2/1215 requires calling a service function of a service-provider module-1/1201, then SRO/Arjun requires information such as reference to the service method (or reference to an object) of Module-1/1201 and name of a variable of Module-2/1205 to store the reference for creating communication code. Module-2/1205 calls the service function using the reference stored in the variable by passing appropriate parameters whenever Module-2 requires the service. FIG. 16 illustrates this by using pseudo-code. The 1607 code block comprises of sample communication code, according to an embodiment. The reference to service function of module-1/1602 is stored in a variable of module-2/1608 at line number of 1607 code block. Module-2/1608 uses the variable to call service function of module-1/1602 by using the variable as illustrated in 1609 code block at line number 3.

Likewise, the SRO (or pre-processor, referred to by a given name Arjun) needs additional information for making each kind of validation, for example, such as to detect broken communication link (e.g. due to incompatible coupling interfaces). For example, if Module-1/1201 provides the number of parameters and types of parameters required for service function of this communication link, and Module-2 1215 also provides the number of parameters and types of parameters being passed to call service function for requesting the service by using the reference stored in local variable, then SRO/Arjun can detect if the number of parameters are changed by Module-1 during the course of maintenance or for a release of a new upgraded version and if Module-2 is inadvertently not updated to use the new, changed communication interface of the service function in Module-1.

In an embodiment, each of the modules in the application comprises of information for each of the services required by the module. According to an embodiment, a mechanism is employed to extract the information for each of the required services of each module and use the information for creating necessary communication code for getting the service (by the module) if the service is provided by any other module or part in the application. According to an embodiment, the communication code is included at appropriate location in the code of the application (or code of the module). In another embodiment, the communication code is included in a file and the code is manually included at appropriate locations in the application code. The objective is to automate as many tasks as possible in creating and properly including in the code of the application. In maintaining the communication code, it is not necessary that the process is completely automated. Few tasks, such as including communication code for each module, may be performed manually. It is necessary to replace or update parts of the communication code, for example, in case when a communication interface of a module that provides a service is changed or a module that requires a service needs to use another version of the service.

The SRO/Arjun is designed to detect various kinds or errors, such as incompatible interfaces or missing services. However, not all kinds of things may be errors. For example, a reusable module used in an application may provide multiple services, but it is not necessary for other parts in the application to use all the services. So, it is not an error to have unused services. But it is likely an error if one or more services required by a custom component is not available. Alternatively, a reusable module can provide a means to input unique lookup key for only the services required by other parts in the application (so the reusable module only registers a subset of its services based on the number of lookup keys).

Section-Q: Tools Such as SRO/Arjun are Essential for Composing Pluggable Modules According to an embodiment, it is desirable to invent an engineering paradigm for software products comprising of methods: (1) Partitioning each large product into smaller self-contained modules or modules having higher degree of cohesion, where each module can be designed and developed individually and can also be tested individually at any time in the future (e.g. during the course of evolution or lifecycle of the of the software product such as maintenance or upgrade releases). If suitable reusable modules are available (e.g. for example from open source communities or from third-party vendors), the product is partitioned in order to maximize the reuse by leveraging the available reusable modules. (2) Once all of the modules are ready, it is desirable to have the simplest possible mechanisms and tools for combining or composing all the modules for building the working product (e.g. by automating most of the tasks or activities for combining or composing all the modules).

Figure 28:
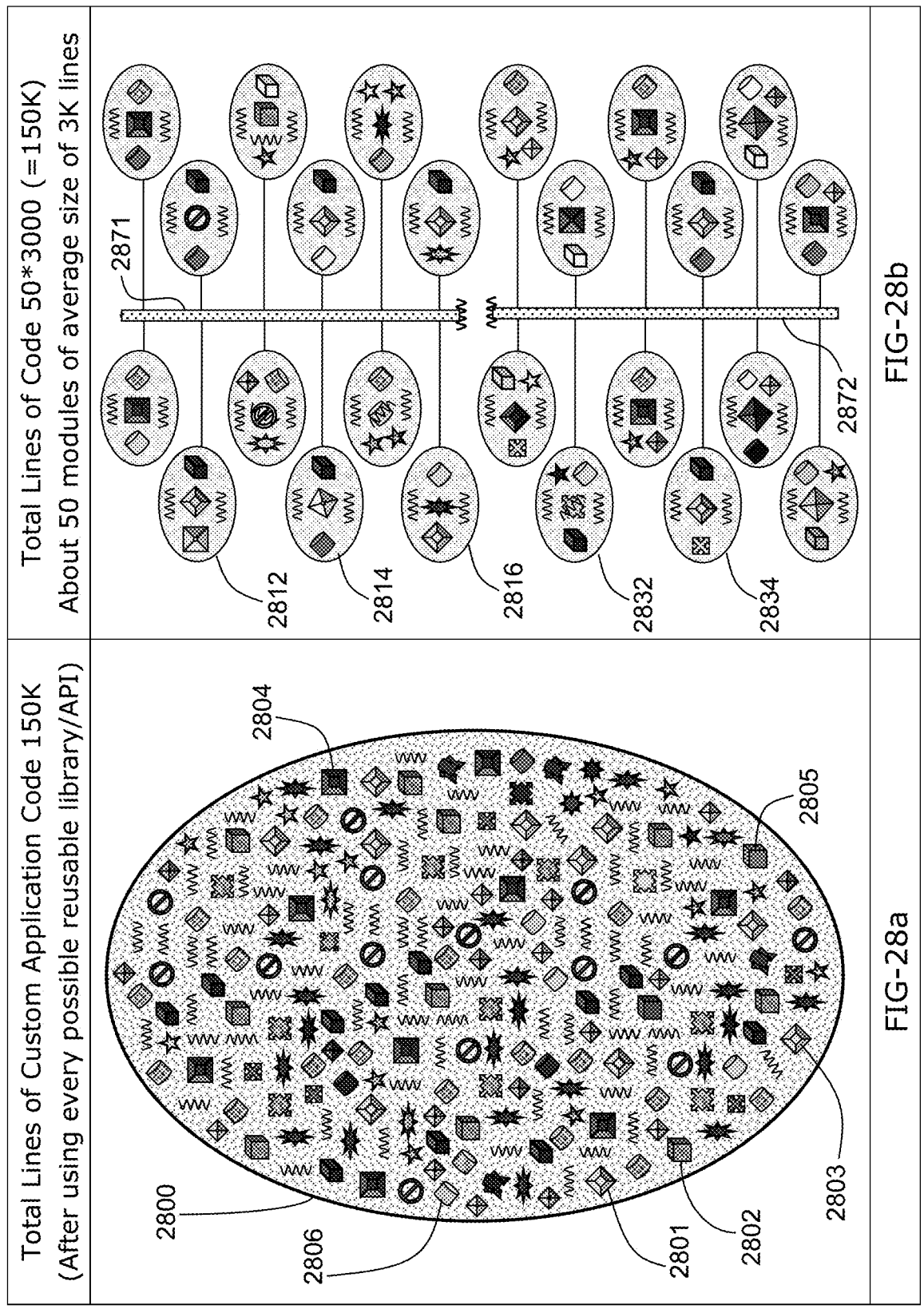
FIG. 28a & FIG. 28b shows on one side FIG. 28a a product built without partitioning into pluggable modules, and another side

These methods and mechanisms must also provide the simplest possible way for redesigning and testing each of the custom modules individually at any time in the future. The objective is to evolve each of the modules by redesigning and testing each individually, since the product is often evolved by evolving the modules, for example, to satisfy evolving needs. According to an embodiment, FIG. 28a depicts code base 2800 of a sample software product (or application) built without using pluggable modules. The application uses every possible reusable library and API for minimizing the size of the custom application code (i.e. size of the code base 2800), according to an embodiment. The codebase uses many reusable libraries, APIs, or parts, which are depicted by icons such as cylinders, cubes, or pyramids etc., such as icons 2801, 2802, 2803, 2804, 2805, and 2806.

In an embodiment, the product is partitioned into self-contained modules or modules that are highly cohesive. FIG. 28b depicts codebase (e.g. 2812, 2814, 2816, 2832, and 2834) for various self-contained modules or modules that are highly cohesive, where the codebase for each module is designed and implemented individually. Then the modules (e.g. 2812, 2814, 2816, 2832, and 2834) are composed or combined using mechanisms or methods 2871 and 2872 such as SRO or Arjun for building the product, according to an embodiment. In other words, FIG. 28a depicts structure of a software product while FIG. 28b depicts all the components required for a product, where components imply specific kind of parts that can be assembled. The product is built by employing a process (or method) called "assembly" for composing the components.

The basic steps required to compose a module into an application comprise of (i) including an instance of the module (e.g. an object instance if the module is implemented as a class-definition), and (ii) creating necessary communication code for the module (e.g. to facilitate necessary collaboration between the module and other parts of the application). In prior art, creating and managing communication code for each module (in an application having multiple modules) is done manually. For example, today it is required to manually implement communication code for each module when a module is included in the code of the application. It is desirable to automate various tasks necessary for creating and managing communication code for each module in an application.

Enabling inventions that made the invention of interchangeable components practical are things such as castings, dies, forgings, injection-molds, and jigs etc., without which it is impractical to mass-produce identical components manually (e.g. by handcrafting many components to be identical and interchangeable). Invention of such enabling things was an out-of-the-box invention when each of the components was handcrafted (e.g. before year 1810CE). An out-of-the-box idea is needed to automate various tasks for the creation and management of communication code that is being created and managed manually for each module in prior art. Likewise, enabling inventions, for transforming modules into pluggable modules, are tools such as SRO, DoS, or Arjun for automating tasks for creating and managing communication code for each of the modules. Without such tools (e.g. SRO, DoS or Arjun) it is impractical to transform modules into pluggable modules.

In prior art today, there is no such tool or CASE-tool (i.e. Tool for Computer Aided Software Engineering) or mechanisms for "automating" tedious error-prone tasks for creating and, particularly, maintaining communication code for each of the components (e.g. parts or modules) in an application (or software product) that comprises of multiple such components (or modules), where the communication code loosely couples (i.e. assembles or plugs in) each of the software components into the software product (or application) for allowing communication or collaboration between the component and other components or parts of the application.

This kind of CASE-tool for automating tasks for creating and maintaining communication code doesn't exist anywhere else in the world. Such a CASE-tool is an essential and complementary invention, where the CASE-tool allows engineers to plug in each of the components (where each component implements code for necessary mechanisms such as registering and/or looking up services). The CASE-Tool, along with the necessary mechanisms (e.g. implemented within the modules), minimizes the tasks for manually creating and maintaining communication code for each of the components in an application. Here, maintaining communication code for a module implies redesigning or changing the communication code when the modules' communication interfaces are changed. Hence, the CASE-tool makes such components pluggable by automatically loosely-coupling or assembling the component into the application.

This kind of components or modules cannot be made pluggable without such a CASE-tool, because this CASE-tool is an essential and complementary enabler for automating creation and maintenance of communication code for the components. For example, there can't be electric plugs (having pins) without sockets (having complimentary holes to fit shape and configuration of pins) to insert the pins—The plug and socket are complementary inventions, where one is useless without the other. Our CASE-tool functions as virtual sockets for the pluggable components (that implement necessary mechanisms such as registering and/or looking up services) having built-in pluggable coupling interfaces for plugging into virtual sockets.

In any large application comprising of multiple modules, it is desirable to include each of the modules in an application as illustrated in listings 1511, 1512, or 1513 of FIG. 15, where each such pluggable module doesn't require manually implementing any communication code. According to an embodiment, this is accomplished by Implementing necessary parts of the communication code in each of the modules; for example, (a) implementing code for registering or publishing each of the available services or services provided by the module and (b) implementing code for finding or subscribing to each of the services required by the module; and Implementing a CASE-tool that implements mechanisms for directly or indirectly getting the information about required and/or available services from each of the modules in the application and using the information for generating communication code or facilitating communication to allow collaboration between the modules (e.g. those that provide one or more services and those that require the services).

Section-R: The Basic Differences Between the Two Engineering Paradigms.

Today, there are two engineering paradigms for designing and building large or complex products. The first proven, mature, and successful engineering paradigm that is being used for designing and building countless known products we use everyday such as airplanes, computers, cars, cellphones, machinery, locomotive engines, and equipment for factory or medical etc. This engineering paradigm for such physical products uses components (that are referred in this application as real components), where the real components imply a very specific kind of parts that can be assembled and disassembled. In this engineering paradigm, no other kind of part is (or can be) referred to as a component if the part is not designed and/or conducive to be assembled as a unit and disassembled as a unit.

The basic and/or striking difference between specific kind of parts that are certainly components and the other kinds of parts that are certainly not components, in the context of engineering paradigm for designing and building of countless large products we know (e.g. cars, computers, cellphones, TVs, ACs, equipment such as printers, airplanes, machines or machinery for factory to name a few) is: Components are the only kind of parts that are composed into the product by a process (or method) known as "assembling" (or "plugging-in"). None of the other kinds of parts are either designed or conducive to be "assembled" (i.e. can be composed by using the method or mechanism known as assembling). The ideal form of assembling for a component is making the component easily pluggable. So, it is desirable to invent mechanisms for plugging in modules or components.

During the pre-science or pre-paradigmatic period of software engineering or computer science 50 to 60 years ago, software researchers made a tacit assumption that it was not possible to create such components (i.e. specific kind of parts that can be assembled as a unit) for software products (where the term "pre-paradigmatic" is described in seminal book "The Structure of Scientific Revolutions" by Dr. Thomas Kuhn). So, 50 years ago software thought leaders defined each kind of useful parts, such as parts that can be reusable or conform to a so-called component model, as a kind of components for software engineering paradigm. The term components (in software paradigm) refer to other kinds of parts (from the inception of software engineering 50 to 60 years ago and until today), where no known kind of so-called components existing today for software is designed to be assembled by any stretch of the imagination.

The engineering paradigm has been evolving for the past 45 years without having real components, where real components implies a specific kind of parts that can be assembled and disassembled as a unit. The lack of real components (i.e. specific kind of parts that can be assembled as a unit) and a process equivalent to the process of assembling the components resulted in a second very inefficient engineering paradigm for software products. This software engineering paradigm is equivalent to civil engineering paradigm for constructing buildings as per the Wikipedia page for "Software Architecture", where the civil engineering paradigm only uses reusable parts such as cement, steel, paint or wood ect., but each large building is not built by assembling components as in FIG. 28*a* (as products such as cars, airplanes or computers, where each product is built by assembling components as in FIG. 28*b*).

The engineering paradigm that builds products by assembling components (by using real components) is far better for software products, as it can build products several times more complex and having quality many times better, within less time and cost compared to the second engineering paradigm, which is equivalent to the civil engineering paradigm. It is desirable for software products, since about 80% of software engineering is changing existing code. The percentage of savings increases as the size of the product increases. That is, the present of savings would be more (or increases), if the product is more complex or larger.

The engineering paradigm for physical products comprises of two activities (i) partitioning each of the large products 2800 into self-contained modules (widely known as components or subcomponents), where each of the components and sub-components (e.g. 2812, 2814, 2816, 2832, or 2834) is designed and tested individually, and (ii) combining or composing the modules (that are known as components and subcomponents) to build the product by using a process (or method) called "assembly" of all the "components", after designing and building all the components for the product. In order to employ the process called "assembly" for composing components or modules, the components or modules must be conducive to being "assembled".

It is desirable to achieve an equivalent engineering paradigm for software products as well. The main differences (i.e. gaps) between the engineering paradigm for software products and the engineering paradigm for other kinds of product are (1) the ability to partition each product into equivalent self-contained modules or modules having higher degree of cohesion, (2) designing each of the modules as conducive to be composed (or assembled) automatically by employing minimal effort, and (3) the ability to employ ways equivalent to said "process of assembly" for composing the modules (referred to as real components, which are equivalent to the components) for building the product.

According to an embodiment for achieving such engineering paradigm for software products, the steps comprising of (1) partitioning each large software product into self-contained modules (or modules having higher degree of cohesion) so that each of the module can be designed and tested individually, (2) each of the self-contained modules is designed to be composed (or assembled) automatically by employing minimal effort and (3) employing a way (e.g. mechanisms, tools, and methods) to automatically combine or compose all the self-contained modules to build the product, once all the modules are designed, built, and tested individually. In these engineering paradigms, each of the self-contained modules may be redesigned and tested individually, for example, to satisfy evolving needs or to create upgraded versions for the product etc.

Applicant's applications for earlier patents (e.g. U.S. Pat. Nos. 8,392,877, 8,578,329, and 9,058,177) disclose methods for identifying, building, and using self-contained components. This application discloses ways (e.g. mechanisms, tools, and methods) for automatically combining or composing all the self-contained modules (or modules having higher degree of cohesion) quickly to build each product. The codebase for each self-contained module is free from spaghetti code (or design) if the module can be redesigned and tested individually. A substantial portion of the code (e.g. 66.67%) for any software product is free from spaghetti code (or design), if a substantial portion of the code (e.g. 66.67%) for the product is implemented in such self-contained modules.

Section-S: Overview and/or Summary of the Present Invention

Any large application comprises of multiple components (or modules), where each of the modules (e.g. components or other kinds of parts) in the application collaborates with other parts or modules in the application. The application code comprises of code for including each of the modules in the application, where the code for including each module comprises of two parts: (Part-1) implementing application code for using the module in the application by including and initializing the module (e.g. by including and initializing or constructing an object instance for the class that implemented the application code for the module) in the code of the application and (Part-2) implementing and/or including necessary communication code in the code of the application for allowing necessary collaboration between each module and the other modules or parts in the application.

To make a module pluggable, it is desirable to minimize the code required for initializing or constructing the module (e.g. a fully initialized and configured object instance of the class definition for the module). Also, it is desirable to automate most of the tasks necessary for creating and managing communication code for the module by implementing necessary mechanisms within each of the modules, where the communication code allows the module to collaborate with other parts or modules in the application. One of the embodiments for creating and managing communication for a pluggable module comprises of two parts that complement each other:

(Part-A): One of the embodiments describes code implemented within each of the modules that implements mechanisms required for creating communication code for the module such as (i) If the module provides one or more services, the code in the module comprises of a mechanism for publishing each service along with necessary information for creating and managing the communication code, and (ii) If the module requires one or more services, the code in the module comprises of a mechanism for subscribing to each service along with necessary information for creating and managing the communication code.

(Part-B): One of the embodiments for creating and managing communication code for allowing collaboration between the modules in an application further includes: Designing and Implementing a tool (e.g. a system like Arjun or object like SRO disclosed in this application) for creating and managing the communication code for each of the modules in the application by accessing necessary information from each module using the mechanisms implemented in each of the modules for publishing and/or subscribing to services.

The code for initializing and/or constructing an instance of a module (i.e. part-1 above) for use in an application includes implementing (i) code for initialization: application code implemented for inputting necessary data for initializing the module and (ii) code for configuration: application code implemented for customizing the module to satisfy specific needs of the target application. Custom-designed application-specific module (e.g. a Class definition for the component) can be implemented to comprise necessary application code for initializing and configuring the module within the code of the module (e.g. the class definition implemented for the module) so that it requires little or no code for initialization or customization of the module in the code of the application after including an instance of the module (e.g. by including an object instance of the class for the module) in the application.

A wrapper class may be implemented for each reusable module to make the module pluggable, where the wrapper class implements the necessary code for initialization and configuration of the reusable module (in addition to publishing or subscribing to services for the module). In general, code for each of the reusable modules (e.g. components or other kinds of parts) implements construction code that implements certain features and/or functionalities. Any application that needs said features and/or functionalities may use the module by implementing code to properly initialize (e.g. by inputting application data into an instance of the class definition for the module) and configure code. For example, to customize the instance of the module to suit the unique needs of the application.

According to an embodiment, each pluggable module would have two parts or stages (i) Construction stage or part: Code implemented for construction stage or part, which includes application code for accessing and processing data and using the data for initializing and configuring the component, and (ii) Runtime Operational or Functional stage or part: The component contributes one or more features and functionalities for the application that often includes communicating with other parts in the application for collaborating with other parts or modules in the application. In most cases, but not always, construction part is executed only once in the beginning during initialization.

In some cases, it is required for certain modules or components to reconstruct themselves periodically. For example, based on change of states such as underlying application data. In this case, construction code is designed to reconstruct the features and functionalities of the component, for example, by accessing new application data whenever it is required to reconstruct itself. Ability to get necessary data for reconstructing of component is one of the in-built featured or functionalities for such modules. Usually, a class-definition for a GUI component such as a chart, map or graph are designed to re-construct it-self by using new data.

According to a preferred embodiment, the construction code for each pluggable module is implemented within the code for the class defined for the pluggable module. The objective is to minimize the code needed for implementing initialization and configuration code outside of the class definition (i.e. code of the application) when the component is included in the application by including an object instance of the application. Applicant's earlier patents U.S. Pat. Nos. 8,392,877, 8,578,329, and 9,058,177 disclosed this method for creating a very specific kind of components referred to as Replaceable Self-Contained Components (or RSCC).

It is desirable to create a GUI Studio/Editor for Arjun or SRO, where the GUI Editor or Studio would allow performing many tasks such as (i) adding each new pluggable module to an application, for example, by dragging and dropping an icon for the pluggable module, (ii) allowing manual connection (e.g. by creating communication code) between each required service for the pluggable module and an available service, and (ii) allowing manual connection between each available service for the pluggable module and one or more other parts/modules that require the service. The GUI Studio/Editor can be implemented for allowing many tasks such as creating, editing, or manipulating communication code and/or dependencies between modules.

Such a GUI Studio/Editor can provide many other features such as allowing documentation and/or visual representation for inspecting connections (i.e. communication code) or dependencies created for each of the pluggable modules in the application. For example, multiple modules may require each of the services provided by the pluggable module. Also, such a GUI Studio/Editor would allow manual editing of communication code by implementing adapter code (this kind of editing of communication code should be discouraged, except in special cases). The GUI Studio/Editor can allow many such tasks such as selecting the right service-provider manually if multiple modules are providing the required service or the same module is providing multiple flavors of services for a required service.

Section-T: Finding Each Required Service for a Module Using Lookup Mechanism from Set of Available Services Provided by Other Modules It is required to facilitate communication between each of the pluggable modules in an application that requires a service and another module in the application that provides the service, for example, by employing a mechanism for creating communication code or instruction and including the communication code or instructions properly in the code of the application. It is desirable (but not necessary) to automate all the activities for creating of communication code and including the communication code in the code of the application. The communication code or instructions for allowing communication between each pair of modules (comprising a module that provides a service and another module that requires the service) in the application may be included manually at appropriate location in the code of the application. The two tasks (i) creating communication code for each of the modules and (ii) including the communication code can be separated. Including the communication code can be done manually for each pair of modules, for example, aided by GUI (Graphical User Interface) tools. Such GUI tools also allow visually representing, editing and/or modification of communication code or dependencies etc.

If each module in a set of modules provides one or more services, each module publishes information (e.g. 2610) for each of the services provided by the module (e.g. using a lookup key). If a module (e.g. Module-A) requires a service, it publishes information (e.g. 2620) for the required service (e.g. using a lookup key). If another module (e.g. Module-B) provides the service (i.e. required by Module-A), the mechanism such as Arjun creates necessary communication code for Module-A to request the required service provided by Module-B, for example, by matching the lookup keys associated with the service required by Module-A and service provided by Module-B. According to an embodiment, Arjun finds a required service for a module by comparing and/or matching (i) lookup key associated with the required service and (ii) the lookup key associated with each of the available services provided by other modules in the application.

The lookup key for finding required services can be many forms. According to an embodiment, a combination of one or more keys (e.g. string, name or numbers etc.) can be used for publishing each available or required service. According to another embodiment, the names of the service functions (or objects that can provide service) are formed using a combination of one or more lookup keys. Various means can be employed for publishing each of the available services. It is required to employ appropriate method to find a required service (e.g. by Module-A) from list in an array of available services (e.g. 830 or 2230) for creating necessary communication code for allowing communication between Module-A for accessing the required service and another module (e.g. Module-B) that provides the service. According to an embodiment, the mechanism such as Arjun creates communication code for each required service by traversing the list or array of required services (e.g. 840 or 2240).

An application may comprise of multiple modules, where each module provides one or more services for other modules that require the services and/or requires one or more services that are provided by other modules in the application. According to an embodiment, a mechanism such as Arjun/SRO creates a set (e.g. Set-A) of all the available services, where each of the available services is provided by a module. The available services in the set (i.e. Set-A) may be organized as a sorted list (e.g. 830) or hash-table for searching quickly to find each required service using a means such as lookup key.

If a module in the application requires one or more services, the mechanism such as Arjun creates necessary communication code or instructions for the module for accessing each required service by looking-up for the required service in the set (i.e. Set-A). A lookup key associated with each required service is used for matching (i.e. by comparing with lookup key associated with each available service) to find the required service from the set (i.e. Set-A) of available services, according to an embodiment.

According to another embodiment, a mechanism such as Arjun/SRO creates two sets: (i) a set (e.g. Set-R) for all the services required 840 by all the modules in the application, and (ii) another set (e.g. Set-A) for all the available services 830 that are provided by all the modules in the application. Each set (i.e. Set-R or Set-A) may be as a sorted list (e.g. 840 or 830) or hash-table. Each node in each list comprises of necessary information for a service such as a lookup-key, a reference for the service and reference to the Module that requires or provides the service, according to an embodiment. This information in each of the nodes is used for creating necessary communication code or instructions for allowing communication between a module that requires a service and another module that provides the required service, according to an embodiment. This communication code for each such communication link (between two modules comprising a module that require a service and another module that provides the service) may be included at proper location in the code of the application.

The information for services available in the nodes in sets Set-A (e.g. nodes in list 830) and Set-R (e.g. nodes in list 840) is useful for creating documentation about dependencies between modules. This includes many kinds of information such as kinds of communication dependency and/or interface between each module or a given module and other modules in the application. A GUI (Graphical User Interface) application or a GUI tool can be implemented for visually representing or showing this information about dependencies for each of the modules or dependencies between a given module and other modules. Furthermore, a GUI application or Tool can be implemented to graphically create, edit or manage each of the dependencies and/or interfaces between a given module and other modules in the application.

Section-U: Use of the Method and System of the Present Invention

Most of the large software applications comprise of multiple modules (e.g. objects, components, or parts), where a set of modules in an application collaborate with each other or with other parts of the application. It is desirable to use pluggable modules instead of manually implementing and maintaining the communication code in each large software application. According to an embodiment, one or more modules in an application are redesigned into a pluggable module by including necessary information (i) for publishing (or registering) each of the services provided by the module, and (ii) for subscribing to (or finding and requesting) each of the services required by the module. One or more mechanisms, methods, or tools are employed to directly or indirectly access this information in the modules and use this information for generating communication code. The communication code is included in the code for the application for facilitating collaboration between the modules in the application.

An overview of the main methods disclosed in this invention includes (1) using the pluggable modules in an application and (2) mechanisms for automating tasks for allowing collaboration between the modules (e.g. by avoiding the need for manually implementing communication code). Today, any large, existing software application comprises of many modules. But the modules are not designed to be pluggable modules, for example, by using mechanism and protocols such as software motherboards. Invention of physical pluggable components (or modules) requires complimentary invention of physical sockets. For example, in the context of computers, pluggable components (or modules) require complimentary invention of motherboard having sockets for plugging-in the components such as CPU, DRAM, Hard-drive, CD-player, or power supply. For example, in the context of cars, a platform such as chassis is used for assembling the components such as engine, gearbox, or wheels.

The mechanism comprising the SRO/DoS acts as the equivalent platform (e.g. software motherboard) for assembling or plugging in software modules, according to an embodiment. Each module comprises of implementation of few lines of communication code for connecting with the SRO/DoS for (i) publishing (i.e. registering) each of its service (for other components that require the services for finding and requesting the services) and (ii) finding and requesting each of the services (provided by other modules) that are required by the module. Although the mechanism comprising the SRO/DoS requires less effort in software development, it is less efficient when high performance is critical or for an application that must execute optimally. For example, there is an overhead of looking up required services using lookup key (or combination of set of keys) whenever the application is being executed.

It would add even more overhead if the interfaces are validated for each communication link between each pair of modules (comprising a module that requires a service and another module that provides the service). The interface validation can be turned off once the interfaces are properly validated during testing phase. There is no need for interface validation, if there is no change to the code of the modules in the application. An incompatible interface could be injected only when code for a pluggable module or any other part that communicates with the pluggable modules is changed. So, validation of coupling interfaces and communication code can be turned off after testing (i.e. in the software ready for release).

This overhead of finding services using lookup keys (or combination of set of keys) can be avoided by designing SRO or Arjun for generating communication code, where the Arjun is a given name and/or broadly refers to a preprocessor (e.g. for a compiler) that is designed to get information about service-provider interfaces and service-consumer interfaces. Of course, Arjun uses lookup keys (or combination of set of lookup keys) for matching required services and available services. But this exercise of getting information for services from modules can be completed at development time and once this exercise is completed, Arjun is designed to use the information and is intelligent enough to generate communication code, where the communication code can be used for allowing collaboration between the modules, according to an embodiment. By including the communication code (generated by mechanisms comprising the SRO/DoS or pre-processor Arjun) in the code of the application, this included communication code replaces the overhead associated with using lookup keys (or combination of set of keys) for finding and requesting each of the required services every time the application is being executed at run-time (or one time when the application starts running).

This invention discloses a new kind of software components (or modules) called pluggable modules and also discloses methods for creating and using the pluggable modules for building software applications. These methods and processes disclosed are useful for identifying multiple large modules in an application and for implementing each of the modules as a pluggable module (or to transform existing modules into pluggable modules). A novel set of mechanisms, processes, and/or intelligent tools are employed for eliminating the need for manually implementing communication code for pluggable modules in an application, when said pluggable modules are included in the application. Three different ways are listed below:

One way or one mechanism is using the SRO/DoS for allowing collaboration between the modules, where (i) each of the modules registers each of the services it provides (for other modules) with the SRO/DoS, and (ii) each of the modules looks up each of the required services from the SRO/DoS and requests the service, if the required service is found. Each of the pluggable modules are designed to provide necessary information for each of the services provided by the module and each of the services required by the module, and the SRO/DoS is designed to collect said necessary information from the pluggable modules and use said information for facilitating communication for the pluggable modules. This information is used for validating communication interfaces and/or to detect errors such as an incompatible interface between a module that is providing a service (or service-provider interface) and another module that is requesting the service (or service-consumer interface).

Each of the pluggable modules are designed to provide necessary information for each of the services provided by the module and each of the services required by the module. The SRO/DoS is designed to collect said necessary information from the pluggable modules and use said information for creating communication code for the pluggable modules. According to an embodiment, the SRO/DoS creates 2 lists for two sets (i) a first list for set of available services, which are registered (or published) by each of the module that is providing one or more services (e.g. for other modules or parts in the application), and (ii) a second list for set of required services, which are subscribed to (or looked up) by each of the modules that requires one or more services (e.g. provided by other modules or parts in the application). This information in the lists is used for validating communication interfaces and to generating necessary communication code for the modules. The communication code is included in the code of the application to facilitate communication between each of the pluggable modules that is requiring one or more services and other modules that are providing each of the required services.

According to yet another embodiment, each of the pluggable modules are designed to comprise of necessary information for (i) each of the services provided by the module (if the module provides one or more services) and (ii) each of the services required by the module (if the module requires one or more services). A pre-processor or compiler (referred to by given name Arjun) is designed to access and collect this information directly or indirectly from the modules in an application and use said information for creating 2 lists of nodes (i) a first list of nodes for available services, which are published (or registered) by each of the modules that is providing one or more services (e.g. for other modules or parts in the application), and (ii) a second list of nodes for required services, which are subscribed to (or looked up) by each of the modules that requires one or more services, according to an embodiment. Each of the nodes for each of the services may comprise of necessary information for accomplishing required tasks: This information in the nodes is used for validating communication interfaces and to generate necessary communication code for the modules. The communication code is included in the code of the application to facilitate communication between each of the pluggable modules that is requiring one or more service and other modules that are providing each of the required services.

This information in the nodes (for the services) in the lists for available services and required services is used for validating communication interfaces and for generating necessary communication code for the modules, where the communication code can be included in the code of the application to facilitate communication between each of the pluggable modules that is requiring one or more services and other modules that are providing each of the services. The embodiments outlined above generate communication code for facilitating collaboration between each of the modules and other parts (that include other modules) in the application. This code can be included in the code of the applications to facilitate communication between the modules. In prior art today, this kind of communication code is manually implemented in the code of the application and managed manually. In the embodiments outlined, many of the tasks for creating and managing the communication code is automated.

The key for converting a module into a pluggable module is (i) if the module provides one or more services for other modules, including information (or code) to directly or indirectly publish (or register) each of the services, and (ii) if the module requires one or more services of other modules, including information (or code) to directly or indirectly subscribe to (or find and request) each of the services of other modules. Then, employ a mechanism and process such as SRO/DoS or pre-processor like Arjun for directly and indirectly collecting this information from pluggable modules about the services (required and provided by each of the pluggable modules) and use the information for generating necessary communication code, where the communication code can facilitate collaboration between the modules when the communication code is properly included in the code for the application.

In an embodiment of the present invention for building non-web applications, any object-oriented programming language such as C++, Java, or C #, may be used for implementing definitions for classes for modules in an application. Also, object-based languages such as Basic, Adobe's ActionScript, or JavaScript can also be used, where the applications can also run on a viewer or virtual machine on local computer for non-web applications. While many examples for pluggable modules in the examples are presented in the Object-Oriented language, it is not limited to any one language. In case of a non-web GUI application, the pluggable modules for an application can be created using non-object-oriented or object-based programming languages. Understanding the specifications of programming languages/technologies used on a platform, any person skilled in the programming art may design modules to achieve equivalent results for the platform according to the teachings of this disclosure.

Any person skilled in the programming art may practice the invention by using any object-oriented, object-based, or structured programming language, and on any platform (e.g. Computers, VM/Viewers, Cell-phones, PDAs, Tablets, or platforms/devices embedded in systems such as airplanes or network-routers etc.). Many of the examples and embodiments are intended to teach our invention and so must be taken in the spirit of learning and in the given context. Each embodiment must be taken in the given context and spirit in which it is intended but must not be interpreted as limiting the scope or intended to impose any unnecessary restrictions on the modules, SRO/DoS, or Arjun (e.g. preprocessors or compilers). Anyone skilled in the art may always make other obvious educated choices, for example, to implement alternative embodiments that choose other options based on cost-benefit analysis, preferences, or experience and knowledge.

Section-V: An Example System for Running Applications Comprising of Modules and Code or Systems for Allowing Communication Between the Modules.

FIG. 2 is a diagrammatic system view 200 of a computing system in which any of the embodiments disclosed herein may be performed, according to one embodiment. Particularly, the diagrammatic system view of FIG. 2 illustrates a processor 202, a main memory 204, a static memory 206, a bus 208, an output such as video display 210, an alpha-numeric input device 212, a cursor control device 214, a drive unit 216, a signal generation device 218, a network interface device 220, a machine-readable medium 222, instructions 224, and a network 226. The diagrammatic system view 200 may indicate a personal computer, computing device (e.g. smart-phone, tablet or server), and/or a data processing system in which one or more operations disclosed herein are performed. Also, it is not necessary for server devices, for example, in server farms to be connected to monitor or input devices such as keyboard or mouse. The processor 202 may be a microprocessor, a state machine, an application-specific integrated circuit, a field-programmable gate array, etc.

The main memory 204 may be a dynamic random-access memory and/or primary memory of a computer system. Further, the main memory 204 also includes a software application code 228 including multiple large pluggable modules. The static memory 206 may be non-volatile memory such as a hard drive, a flash drive, and/or other memory information associated with the data-processing system. Also, an application comprising of pluggable modules can be stored on a non-transitory computer-readable medium connected to computer using appropriate protocols such as NFS (Network File Server) or SAN (Storage Area Networks). The bus 208 may be an interconnection between various circuits and/or structures of the data processing system. The video display 210 may provide graphical representation of information on the data processing system. The alpha-numeric input device 212 may be a keypad, touch-screen, keyboard, and/or any other input device of text (e.g., a special device to aid the physically handicapped). The cursor control device 214 may be a pointing device such as a mouse or touch-pad. The drive unit 216 may be a hard drive, a storage system, and/or other longer-term storage subsystem.

The signal generation device 218 may be a BIOS and/or a functional operating system of the data-processing system. The network interface device 220 may perform interface functions (e.g., code conversion, protocol conversion, and/or buffering) required for communications to and from the network 226 between a number of independent devices (e.g., of varying protocols). The machine-readable medium 222 may provide instructions on which any of the methods disclosed herein may be stored and loaded into main memory. The instructions 224 may provide source code and/or data code to the processor 202 to enable any one or more of the operations disclosed herein.

In accordance with the above described embodiments with respect to FIG. 2, the system includes a processor 202 and memory 204 operatively coupled to the processor 202, wherein the memory includes a software application code 228 comprising of at least one SRO/DoS and multiple pluggable modules having instructions capable of (i) Each module comprising instruction for registering each of its services with the SRO/DoS, if said module provides one or more services, and (ii) Each module comprising code for looking up each of the required services and requesting the service, if said module requires one or more services, wherein a mechanism comprising the SRO/DoS facilitates communication between each of the modules that require services and the modules that provide the respective required services.

In accordance with the above described embodiments with respect to FIG. 2, the system includes a processor 202 and memory 204 operatively coupled to the processor 202, wherein the memory includes a software application code 228 comprising multiple pluggable modules and communication code generated by Arjun mechanism by using information in the code of the modules: (i) Each module uses a generated communication code for requesting each of the required services, if said module requires one or more services, and (ii) Each module uses the generated communication code for providing each of its services, if said module provides one or more services, wherein the generated communication code facilitates communication between each of the modules that require services and the modules that provide the respective required services, wherein the communication code that allows communication between the modules is generated by mechanisms and tools that access and use information included in the source code (or code) for each of the modules, where the information is about each of the services provided by said module and each of the services required by said module.

An article comprising of a computer-readable storage medium having instructions thereon which, when executed by a computing platform (e.g. FIG. 1, FIG. 2 or FIG. 3), result in execution of the method described above. The method described in the foregoing may be in the form of a machine-readable medium embodying a set of instructions that, when executed by a machine (e.g. FIG. 1, FIG. 2 or FIG. 3), causes the machine to perform any method disclosed herein. The non-transitory computer-readable medium includes any kind of computer hardware to store data such as hard-drive, memory, processor cache, and RAM, while excluding transitory medium such as propagating signal. It will be appreciated that the various embodiments discussed herein may not be the same embodiment and may be grouped into various other embodiments not explicitly disclosed herein. Few examples include:

An article comprising of a computer-readable storage medium having instructions thereon which when executed by a computing platform (e.g. FIG. 1, FIG. 2 or FIG. 3) result in execution of an application comprising of multiple modules and communication code created for allowing the modules to collaborate or interact with each other, wherein (a) each module in a first set of modules provides one or more services and comprises of information for communication interface for each available service provided by the module in the first set of modules, (b) each module in a second set of modules requires one or more available services provided by the first set of modules and comprises of information for each required service, and (c) the communication code is generated by a computer-implemented mechanism that uses the information for available services from the first set of modules and information for required services by the second set of modules.

An article comprising of a computer-readable storage medium having instructions thereon which when executed by a computing platform (e.g. FIG. 1, FIG. 2 or FIG. 3) results in execution of a mechanism for creating or generating communication code for allowing collaboration or interaction between modules in an application wherein (i) the code for a first set of modules in said application provides one or more services and each module comprises of information for each of the available services provided by said module, and (ii) the code for a second set of modules in said application requires one or more services and each module comprises of information for each of the required services, wherein the said mechanism directly or indirectly gets the information for said available services and said required services for creating or generating said communication code wherein, when the application is executed by a computing platform results in collaboration between the first set of modules that provide multiple services and the second set of modules that require a set of services from the multiple services by using the communication code generated by the computer-implemented mechanism.

A "Computer Readable Medium" or "Computer Readable Storage Medium" includes Non-transitory computer readable storage and/or medium includes both volatile memory such as DRAM, SRAM or cache-memory of processor/CPU, and "non-volatile" memory such as Flash memory, CD-ROM, ROM or Hard-drive. Furthermore, computer readable storage medium includes such non-volatile physical storage and/or medium connected to the computer over the web, Internet or wireless networks, for example, for accessing or reading from such non-volatile physical storage and/or medium by computing devices. For example, software code for an application or software product usually stored on non-volatile memory such as Flash memory, CD-ROM or Hard-drive.

To execute an application on a computer, the computer accesses the software code (e.g. comprising instructions) for the application from non-volatile memory and loads into a volatile memory for executing each of the instructions in the software code by a CPU or processor. Accessing a software code (or "code" in short) or instructions for an application from non-volatile storage medium or memory includes getting the software code (or code comprising of instructions) over Internet, Web or wireless networks. The code or instructions (accessed from non-volatile storage medium) is loaded into a volatile memory of a computing device for executing each of the instructions in the code, according to an embodiment.

Using any such variations is obvious and within the scope of the basic invention and inventive steps: The basic invention requires: (1) each of the pluggable modules (a) comprising of information for publishing each of the services provided by the module (if the module provides one or more services), and (b) comprising of information for subscribing to each of the services required by the module (if the module requires one or more services). (2) a mechanism for generating communication code for the pluggable modules comprising of a means for obtaining the information from the pluggable modules and using the information for generating necessary communication code, where the communication code allows collaboration between the pluggable modules in the application when the communication code is properly included in the code of the application and the application is executed, according to an embodiment.

A few languages such as JavaScript or VB are interpreted, and so require no compilation step for executing applications that are implemented in such languages. But usually, source code for an application is implemented in high-level programming languages (e.g. C, C++, Cobol, C # or Java). The source code is compiled into byte code, assembly or machine instruction for creating an executable for the application. The code for the executable of the application is stored in machine-readable medium. The code is loaded into volatile memory (e.g. DRAM or SRAM) for running (or executing) the application on a computer and the CPU of the computer reads the code for executing the instructions in the code of the application.

The application code comprising of the modules and the communication code for the modules is compiled (e.g. into assembly or byte code) for creating an executable for running (or executing) the application on a computer if the code of the application is implemented in programming languages such as C++, C #, C, or Java. This disclosure uses pseudo-code for illustrating general steps such as (i) registering each service with the SRO/DoS, (ii) finding or requesting each service with the SRO/DoS, or (iii) communication code or instructions created (e.g. by the SRO/DoS) to allow communication between any two modules, so precise implementation will vary from one language to the other such as Java, C #, VB, JavaScript, Python, or C/C++ etc.

In those exemplary embodiments of present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. Accordingly, it should be understood that the methods, examples, and references described herein are illustrative only and are not limiting upon the scope.

Thus, modifications and variations may be made in the techniques, processes, and structures described and illustrated herein without departing from the spirit and scope of the new discoveries about components for CBD/CBE that are foundation for the vision of present invention. It is intended that the present invention includes all other embodiments that are within the scope of the claims and their equivalents.

What is claimed is:

1. A computer-implemented method running or executing on a computing device comprising of at least one processor, at least one memory, and having access to a non-transitory computer-readable storage medium comprising of code or instructions for a software product or application, comprising:

accessing from the non-transitory storage medium the code or instructions for the application that includes or uses a plurality of pluggable modules in the application, and executing or running the application by executing the code or instructions on the computing device, wherein the code or instructions for the application (a) comprising of code for including or using the plurality of pluggable modules in the application, and (b) comprising of code for a mechanism that comprises of Service Registration Object (SRO) or Directory of Services (DoS) (i) registering listener interfaces as services that are implemented by each of the pluggable modules in a first set of modules that implements code for one or more listener interfaces for allowing communications with other modules, and (ii) implementing code for caller interfaces for looking up to find and connect to corresponding or respective listener interfaces for communication by each of the pluggable modules in a second set of modules that implements code for one or more caller interfaces for allowing communications with one or more pluggable modules in the first set of modules;

including or using the plurality of pluggable modules that comprises of the first set of modules and the second set of modules during the course of running or executing the application; and allowing each of the pluggable modules in the second set of modules that implements code for one or more caller interfaces to communicate with one or more pluggable modules in the first set of modules that implements code for one or more listener interfaces by directly or indirectly using the mechanism comprising of the SRO/DoS, (i) for registering available listener interfaces as services that are implemented by the pluggable modules in the first set of modules, and (ii) for finding corresponding or respective listener interfaces to communicate by the pluggable modules in the second set of modules, during the course of running or executing the application.

2. The computer-implemented method of claim 1, wherein the mechanism facilitates communication between each of the pluggable modules in the second set of modules that implements code for at least one caller interface and another pluggable module in the first set of modules that provides implements code for the listener interface by comparing or matching a combination of one or more lookup keys used for registering or publishing the listener interface, and a combination of one or more lookup keys used for finding the corresponding or respective listener interface.

3. The computer-implemented method of claim 2, wherein the first set of modules and the second set of modules are mutually exclusive sets, and the second set of modules comprises of at least five pluggable modules and each of the pluggable modules in the second set of modules comprises of code for finding the listener interface implemented by a pluggable module in the first set of modules.

4. The computer-implemented method of claim 1, wherein the first set of modules comprises of at least nine pluggable modules, and each of the pluggable modules implements code for at least one listener interface, and the second set of modules comprises of at least nine pluggable modules, and each of the pluggable modules in the second set of modules finds a listener interface implemented by a pluggable module in the first set of modules, and wherein the mechanism facilitates the communication between each of the pluggable modules in the second set of modules and another pluggable module in the first set of modules.

5. The computer-implemented method of claim 1, wherein the mechanism that facilitates communication between each pluggable module in the first set of modules and another pluggable module in the second set of modules, detects one or more software bugs, errors or warnings from the following list comprising: (i) unable to find a listener interface required by a pluggable module in the second set of modules, (ii) an incompatible communication interface such as mismatch of interface version or type of object resumed by a method called for finding a listener interface, or (iii) mismatch in number of parameters, or type of parameters used in a communication interface, wherein each communication interface facilitates communication between the pluggable module in the second set of modules that requires a listener interface and another pluggable module in the first set of modules that implements code for the required listener interface.

6. The computer-implemented method of claim 2, wherein the first set of modules and the second set of modules in the application comprise of three or more wrapper modules, where the code for each wrapper module comprises of code for using or including one or more modules as inner-modules or sub-modules, and the sub-modules are used for implementing code for one or more listener interfaces, or require one or more listener interfaces, and wherein each of the wrapper modules comprises of code or instructions for registering the one or more listener interfaces implemented by the sub-modules, and comprises of the code or instructions for finding one or more listener interfaces implemented by the sub-modules.

7. The computer-implemented method of claim 2, creating visual representation or documentation for communication interfaces or dependencies between (a) at least one pluggable module from the first set of modules or from the second set of modules and (b) one or more pluggable modules from the first set of modules or from the second set of modules, by using the lookup keys used for registering or publishing each of the listener interfaces implemented by the module and the lookup keys used for finding the listener interfaces implemented by the module.

8. A computer-implemented method running or executing on a first computing device comprising of at least one processor, at least one memory, and having access to a non-transitory computer-readable storage medium comprising of code or instructions for a software product or application, comprising:
   accessing from the non-transitory storage medium the code or instructions for the application that includes or uses a plurality of modules in the application, and executing or running the application by executing the code or instructions for the application on the first computing device, wherein the code or instructions for the application (a) comprises of code for including, or using each of the plurality of modules in the application, and (b) comprises of communication code for allowing the communication between a first set of modules that provides one or more services, and a second set of modules that requires one or more services;
   including or using in the application the plurality of modules comprising of the first set of modules and the second set of modules, during the course of running the application; and
   allowing each of the modules in the second set of modules that requires one or more services to communicate with one or more modules in the first set of modules that provide the one or more required services during the course of miming the application by using the communication code in the code of the application;
   wherein multiple parts of the communication code for allowing communication between the first set of modules and second set of the modules is created automatically for including in the code of the application by a second computing device comprising of at least one processor and at least one memory executing a mechanism comprising of a combination of one or more from the following list comprising of a pre-processor, compiler, Service Registration Object (SRO), or Directory of Service (DoS), and wherein the mechanism directly or indirectly obtains or uses (i) instructions or information for registering or publishing available services comprised in the code of each of the modules in the first set of modules and (ii) instructions or information published for finding required services comprised in the code of each of the modules in the second set of modules.

9. The computer-implemented method of claim 8, allowing communication between each of the modules in the second set of modules that requires a service and another module in the first set of modules that provides the service by using the communication code created by the mechanism for use in the application, wherein the mechanism creates the communication code for allowing communication between two modules by comparing or matching a combination of one or more lookup keys used for publishing or registering a service provided, and a combination of one or more lookup keys used for publishing to find or obtain a required service.

10. The computer-implemented method of claim 9, wherein the first set of modules and the second set of modules are mutually exclusive sets, and the second set of modules comprises of at least five modules and each of the modules in the second set of modules obtains a service provided by a module in the first set of modules.

11. The computer-implemented method of claim 8, wherein the first set of modules comprises of at least nine modules, where each of the modules provides at least one service, and the second set of modules comprises of at least twelve modules, where each of the modules in the second set of modules obtains a service provided by a module in the first set of modules, and wherein the communication between each of the modules in the first set of modules and another module in the second set of modules is facilitated by parts of the communication code created using the mechanism for inclusion in the application.

12. The computer-implemented method of claim 8, wherein the mechanism that creates communication code for facilitating communication between each module in the first set of modules and another module in the second set of modules, detects one or more software bugs, errors, or warnings from the following list comprising: (i) unable to find a service required by a module in the second set of modules, (ii) an incompatible communication interface such as mismatch of interface version or type of object returned by a method called for obtaining a service, or (iii) mismatch in number of parameters, or type of parameters used in a communication interface, wherein each communication interface facilitates communication between the module in the second set of modules that requires a service and another module in the first set of modules that provides the required service.

13. The computer-implemented method of claim 9, wherein the first set of modules and the second set of modules in the application comprise of three or more wrapper modules, where code for each wrapper module comprises of code for using or including one or more modules as inner-modules or sub-modules, and the sub-modules are used for providing one or more services, or require one or more services, and wherein each of the wrapper modules comprises of code or instructions for publishing or registering the one or more services provided by die sub-modules, and/or comprises of code or instructions for publishing to find or obtain one or more services required by the sub-modules, for creating the communication code by the mechanism.

14. The computer-implemented method of claim 10, wherein the communication code, created by the mechanism and included in the code of the application for facilitating communication between each of the modules in the second set of modules that requires a service and another module in the first set of modules that provides the required service, and wherein the code for each of the modules in the first set of modules comprises of instructions or information for publishing each provided service or available service using a combination of one or more lookup keys, and the code for each of the modules in the second set of modules publishes each required service using a combination of one or more lookup keys, where the mechanism uses lookup keys for finding each service required by a module in the second set of modules, from the available services that are provided by the plurality of modules in the first set of modules.

15. The computer-implemented method of claim 9, creating visual representation or documentation for communication interfaces or dependencies between (a) at least one module from the first set of modules or from the second set of modules and (b) one or more modules from the first set of modules or from the second set of modules, by using the lookup keys to register or publish each of the available services provided by the module and the lookup keys used for finding services required by the module.

16. A computing system comprising of at least one processor, at least one memory, and connected to a non-transitory computer-readable storage medium comprising of code or instructions for a software product or application, capable of performing the following steps comprising:
  accesses from the non-transitory storage medium the code or instructions for the application that includes or uses a plurality of pluggable modules in the application, and executes or runs the application by executing the code or instructions on the computing system, wherein the code or instructions for the application (a) comprises of code for including or using the plurality of pluggable modules in the application, and (b) comprises of code for a mechanism that comprises of Service Registration Object (SRO) or Directory of Services (DoS) for (i) registering listener interfaces as services that are implemented by each of the pluggable modules in a first set of modules that implements code for one or more listener interfaces for allowing communications with other modules, and (ii) implementing code for caller interfaces for looking up to find and connect to corresponding or respective listener interfaces for communication by each of the pluggable modules in a second set of modules that implements code for one or more caller interfaces for allowing communications with one or more pluggable modules in the first set of modules;
  includes or uses the plurality of pluggable modules that comprise of the first set of modules and the second set of modules during the course of running, or executing the application; and
  allows each of the pluggable modules in the second set of modules that implements code for one or more caller interfaces to communicate with one or more pluggable modules in the first set of modules that implements code for one or more listener interfaces by directly or indirectly using the mechanism comprising of the SRO/DoS, (i) for registering available listener interfaces as services that are implemented by the pluggable modules in the first set of modules, and (ii) for finding corresponding or respective listener interfaces to communicate by the pluggable modules in the second set of modules, during the course of running or executing the application.

17. The computing system of claim 16, wherein the mechanism allows communication between each of the pluggable modules in the second set of modules that implements code for a caller interface and another pluggable module in the first set of modules that implements code for a listener interface by comparing or matching a combination of one or more lookup keys used to register or publish the listener interface, and a combination of one or more lookup keys provided to find the corresponding or respective listener interface.

18. The computing system of claim 17, wherein the first set of modules and the second set of modules are mutually exclusive sets, and the second set of modules comprises of at least three pluggable modules and each of the pluggable modules in the second set of modules finds the listener interface implemented by a pluggable module in the first set of modules.

19. The computing system of claim 17, wherein the first set of modules comprises of at least nine pluggable modules, where each of the pluggable modules implements code for at least one listener interface, and the second set of modules comprises of at least nine pluggable modules, where each of the pluggable modules in the second set of modules comprises code for finding the listener interface implemented by a pluggable module in the first set of modules, and wherein the mechanism facilitates the communication between each of the pluggable modules in the second set of modules and another pluggable module in the first set of modules.

20. The computing system of claim 17, wherein the mechanism that facilitates communication between each pluggable module in the first set of modules and another pluggable module in the second set of modules detects one or more software bugs, errors, or warnings from die following list comprising of: (i) unable to find a listener interface required by a pluggable module in the second set of modules, (ii) an incompatible communication interface such as mismatch of interface version or type of object returned by method called for finding a listener interface, or (iii) mismatch in number of parameters, or type of parameters used in a communication interface, wherein each communication interface allows communication between the pluggable module in the second set of modules that implements code for finding and calling the listener interface and another pluggable module in the first set of modules that implements code for the listener interface.

21. The computing system of claim 18, wherein the first set of modules and the second set of modules in the application comprise of three or more wrapper modules, and each wrapper module comprises of code for using or including one or more modules as timer-modules or sub-modules, where the sub-modules are used for implementing code for one or more listener interfaces, or require one or more listener interfaces, and wherein each of the wrapper modules comprises of code or instructions for registering the one or more listener interfaces implemented by the sub-modules, and comprises of code or instructions to find and call one or more listener interfaces implemented by the sub-modules.

22. A first computing system comprising of at least one processor, and at least one memory connected to a non-transitory computer-readable storage medium comprising of code or instructions for a software product or application, capable of performing the following steps comprising:
   accesses from the non-transitory medium the code or instructions for the application that includes or uses a plurality of modules in the application, and executes or runs the application by executing the code or instructions for the application on the first computing system, wherein the code or instructions for the application (a) comprises of code for including or using each of the plurality of modules in the application, and (b) comprises of communication code for allowing communication between a first set of modules that provides one or more services, and a second set of modules that requires one or more services;
   includes or uses in the application the plurality of modules comprising of the first set of modules and the second set of modules, during the course of running the application; and
   allows each of the modules in the second set of modules that requires one or more services to communicate with one or more modules in the first set of modules that provides the one or more required services during the course of running the application by using the communication code in the code of the application;
   wherein multiple parts of the communication code for allowing communication between the first set of modules and second set of the modules is created automatically for inclusion in the code of the application by a second computing system comprising of at least one processor and at least one memory executing a mechanism comprising of a combination of one or more from the following list comprising of a pre-processor, compiler, Service Registration Object (SRO), or Directory of Service (DoS), and wherein the mechanism directly or indirectly obtains or uses (i) instructions or information for registering or publishing available services comprised in the code of each of the modules in the first set of modules and (ii) instructions or information published for finding required services comprised in the code of each of the modules in the second set of modules.

23. The first computing system of claim 22, wherein allowing communication between each of the modules in the second set of modules that requires a service and another module in the first set of modules that provides the service by using the communication code created by the mechanism for using in the application, and wherein the mechanism creates the communication code to allow communication between two modules by matching a combination of one or more lookup keys used to publish or register a service provided, and a combination of one or more lookup keys used for publishing to find or obtain a required service.

24. The first computing system of claim 23, wherein the first set of modules and the second set of modules are mutually exclusive sets, and the second set of modules comprises of at least five modules and each of the modules in the second set of modules obtains a service provided by a module in the first set of modules.

25. The first computing system of claim 23, wherein the first set of modules comprises of at least twelve modules, where each of the modules provides at least one service, and the second set of modules comprises of at least twelve modules, where each of the modules in the second set of modules obtains a service provided by the module in the first set of modules, and wherein the communication between each of the modules in the first set of modules and another module in the second set of modules is facilitated by parts of the communication code created using the mechanism for inclusion or including in the application.

26. The second computing system of claim 22, wherein the mechanism that creates the communication code or the communication code for facilitating communication between each module in the first set of modules and another module in the second set of modules, detects one or more software bugs, errors, or warnings from the following, list comprising: (i) unable to fund a service required by a module in the second set of modules, (ii) an incompatible communication interface such as mismatch of interface version or type of object returned by method called for obtaining a service, or (iii) mismatch in number of parameters, or type of parameters used in a communication interface, Wherein each communication interface facilitates communication between the module in the second set of modules that requires a service and another module in the first set of modules that provides the required service.

27. The first computing system of claim 24, wherein the communication comprises of code, created by the mechanism and included in the code of the application, that facilitates communication between each of the modules in the second set of modules that requires a service and another module in the first set of modules that provides the required service, and wherein the code for each of the modules in the first set of modules comprises of instructions or information for publishing each provided service or available service using a combination of one or more lookup keys, and the code for each of the modules in the second set of modules publishes each required service using a combination of one or more lookup keys, where the mechanism uses lookup keys for finding each service required by the module in the second set of modules, from the available services that are provided by the plurality of modules in the first set of modules.

28. A computer-implemented method running or executing on a first computing device comprising of at least one processor and at least one memory for creating communication code for allowing communication between each of the modules in a second set of modules that requires one or more services, and one or more modules in a first set of modules that provides services in a software product or application, comprising:

accessing from a non-transitory computer-readable storage medium and using, (i) code or instructions for the application comprising of code or instructions for including or using a plurality of modules comprising of the first set of modules and the second set of modules, or (ii) accessing instructions or information comprised in each of the modules in the first set of modules for publishing one or more available services or services provided by each of the modules in the first set of modules, and instructions or information comprised in each of the modules in the second set of modules for publishing one or more services required by each of the modules in the second set of modules, and automatically creating multiple parts of the communication code for allowing communication between the first set of modules and second set of the modules, by a mechanism that uses one or more from the following list comprising of a pre-processor, compiler, Service Registration Object (SRO), or Directory of Service (DoS), using the information or instructions for available services accessed or obtained from the first set of modules, and the information or instructions for required services accessed or obtained from the second set of modules;

wherein properly including or using various parts or sections of the communication code created by the mechanism in the code of the application allows each of the modules in the second set of modules to communicate with one or more modules in the first set of modules during the course of execution of the application on a second computing device having at least one processor and at least one memory.

29. The computer-implemented method of claim 28, wherein the mechanism creates the communication code for facilitating communication between each of the modules in the second set of modules that requires a service and another module in the first set of modules that provides the service by comparing or matching a combination of one or more lookup keys used for publishing the required service and a combination of one or more lookup keys used for publishing each of the available services that are provided by the modules in the first set of modules.

30. The computer-implemented method of claim 29, wherein the first set of modules and the second set of modules are mutually exclusive sets, and the second set of modules comprises of at least five modules and each of the modules in the second set of modules obtains a service provided by a module in the first set of modules.

31. The computer-implemented method of claim 28, wherein the first set of modules comprises of at least nine modules, where each of the modules in the first set of modules provides at least one service, and the second set of modules comprises of at least nine modules, where each of the modules in the second set of modules requires a service provided by a module in the first set of modules, and wherein parts of the communication code created by the mechanism facilitate communication between each of the modules in the second set of modules and another module in the first set of modules.

32. The computer-implemented method of claim 28, wherein the mechanism that creates the communication code for allowing communication between the first set of modules and the second set of modules detects one or more bugs, errors, or warnings from the following list comprising: (i) unable to find a service required by a module in the second set of modules, (ii) an incompatible communication interface such as mismatch of interface version or type of object returned by function called for obtaining a service, or (iii) mismatch in number of parameters, or types of parameters in a communication interface, where each communication interface allows communication between a module in the second set of modules that requires a service and another module in the first set of modules that provides the service.

33. The computer-implemented method of claim 30, creating visual representation or documentation for communication interfaces or dependencies between (a) at least one module from the first set of modules or from the second set of modules and (b) one or more modules from the first set of modules Or from the second set of modules, by using the lookup keys to register or publish each of the available services provided by the module and the lookup keys used for finding services required by the module.

* * * * *